(12) United States Patent
Gul et al.

(10) Patent No.: US 11,546,614 B1
(45) Date of Patent: Jan. 3, 2023

(54) ENCODER AND DECODER FOR ENCODING AND DECODING IMAGES

(71) Applicant: Fraunhofer-Gesellschaft zur Förderung der angewandten Forschung e.V., Munich (DE)

(72) Inventors: Muhammad Shahzeb Khan Gul, Erlangen (DE); Michel Bätz, Erlangen (DE); Joachim Keinert, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/509,825

(22) Filed: Oct. 25, 2021

(51) Int. Cl.
| | |
|---|---|
| *H04N 19/176* | (2014.01) |
| *H04N 19/30* | (2014.01) |
| *H04N 19/124* | (2014.01) |
| *H04N 19/513* | (2014.01) |
| *G06N 3/04* | (2006.01) |
| *G06N 3/063* | (2006.01) |
| *G06N 3/08* | (2006.01) |

(52) U.S. Cl.
CPC ............ *H04N 19/176* (2014.11); *G06N 3/04* (2013.01); *G06N 3/063* (2013.01); *G06N 3/08* (2013.01); *H04N 19/124* (2014.11); *H04N 19/30* (2014.11); *H04N 19/513* (2014.11)

(58) Field of Classification Search
CPC .... H04N 19/176; H04N 19/124; H04N 19/30; H04N 19/513; G06N 3/04; G06N 3/063; G06N 3/08
See application file for complete search history.

(56) References Cited

U.S. PATENT DOCUMENTS

| | | |
|---|---|---|
| 10,192,327 B1 | 1/2019 | Toderici et al. |
| 10,713,818 B1 * | 7/2020 | Toderici ........... G06V 30/19173 |
| 2020/0111238 A1 | 4/2020 | Covell et al. |

(Continued)

OTHER PUBLICATIONS

Ball'E, J., et al.; "End-to-end optimized image compression;" 2016; pp. 1-24.

(Continued)

*Primary Examiner* — Joseph Suh
(74) *Attorney, Agent, or Firm* — McClure, Qualey & Rodack, LLP

(57) ABSTRACT

There are disclosed techniques for encoding and/or decoding multiple image information, e.g. through recurrent neural network based stereo compression.

In an image encoder (1), a primary block (100) encodes a primary image information, and a secondary block (300) encodes a secondary image information. States for the primary block are transformed onto states for the secondary block at a transformation block (200), which keeps into account correspondence information (e.g. disparity information) between the first image information and the second image information.

In an image decoder (1*b*), a primary block (100) decodes an encoded version of a primary image information, and a secondary block (300) encodes an encoded version of a secondary image information. States for the primary block are transformed onto states for the secondary block at a transformation block (200), which keeps into account correspondence information (e.g. disparity information) between the first image information and the second image information.

36 Claims, 30 Drawing Sheets

(56) References Cited

U.S. PATENT DOCUMENTS

2020/0267199 A1* 8/2020 Zisman ............... H04L 65/70
2021/0281867 A1* 9/2021 Golinski ............. G06N 3/0445
2021/0329306 A1* 10/2021 Liu .................... G06V 10/764

OTHER PUBLICATIONS

Ball'E, J., et al.; "Variational image compression with a scale hyperprior;" 2018; pp. 1-23.
Deng, X., et al.; "Deep homography for efficient stereo image compression;" In Proc. of the IEEE Int. Conf. on Computer Vision and Pattern Recognition; 2021; pp. 1492-1501.
Gao, J., et al.; "Constructing image panoramas using dual-homography warping;" In Proc. of the IEEE Int. Conf. on Computer Vision and Pattern Recognition; 2011; pp. 49-56.
Jiang, X., et al.; "Light field compression with homography-based low-rank approximation;" IEEE J. of Selected Topics in Signal Processing, 11(7); pp. 2017; pp. 1132-1145.
Ashok, A.K., et al.; "Autoencoders with variable sized latent vector for image compression;" In Proc. of the IEEE Int. Conf. on Computer Vision and Pattern Recognition Workshops; 2018; pp. 2547-2550.
Liu, J., et al.; "Deep stereo image compression;" In Proc. of the IEEE Int. Conference on Computer Vision; 2019; pp. 3136-3145.
Taubman, D.S., et al.; Image compression fundamentals, standards and practice. J. of Electronic Imaging, 11 (2):2002; pp. 286-287.
Toderici, G., et al.; "Full resolution image compression with recurrent neural networks;" In Proc. of the IEEE Int. Conf. on Computer Vision and Pattern Recognition; 2017; pp. 5306-5314.

\* cited by examiner

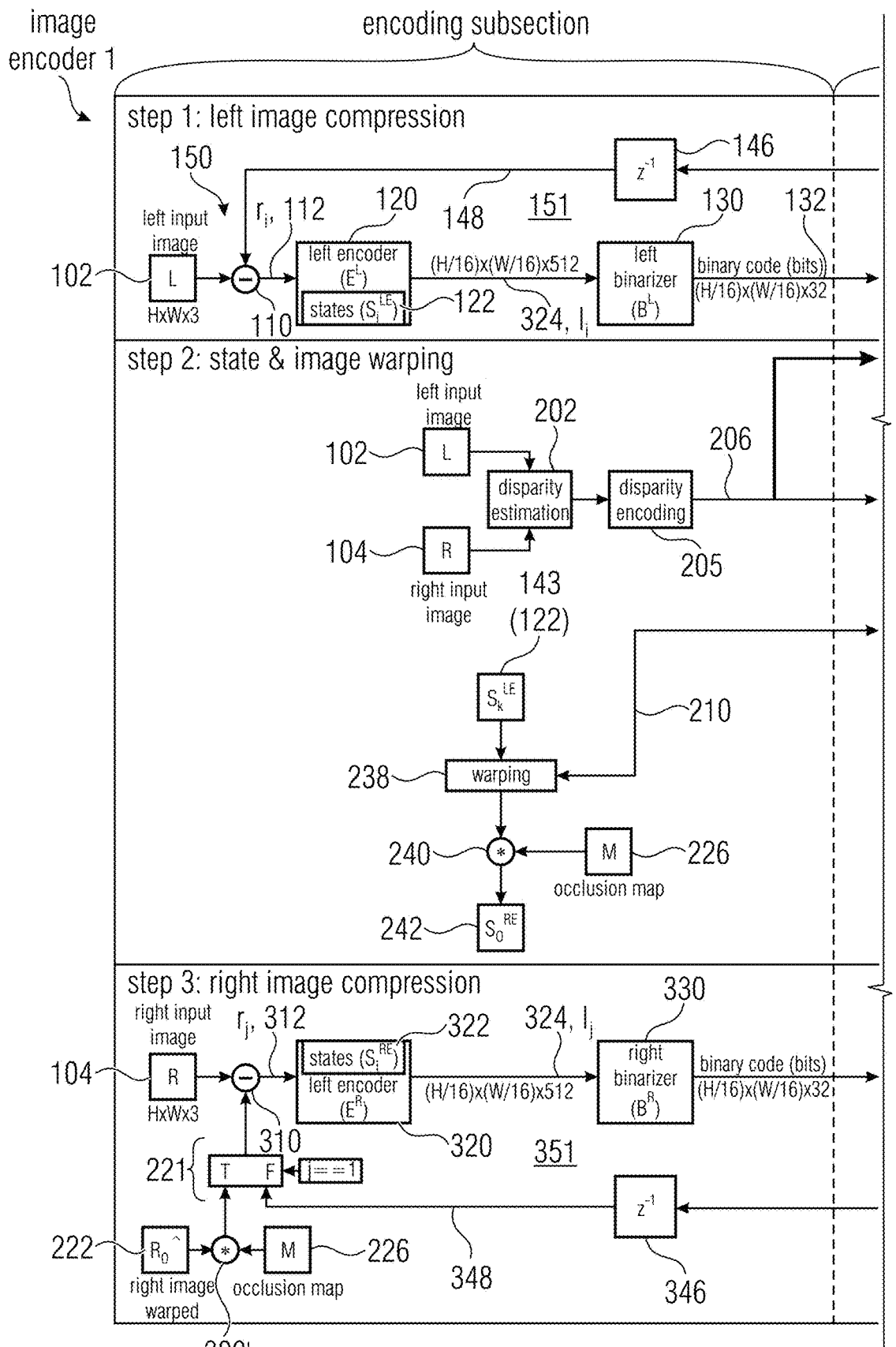
Fig. 1a (Part 1)

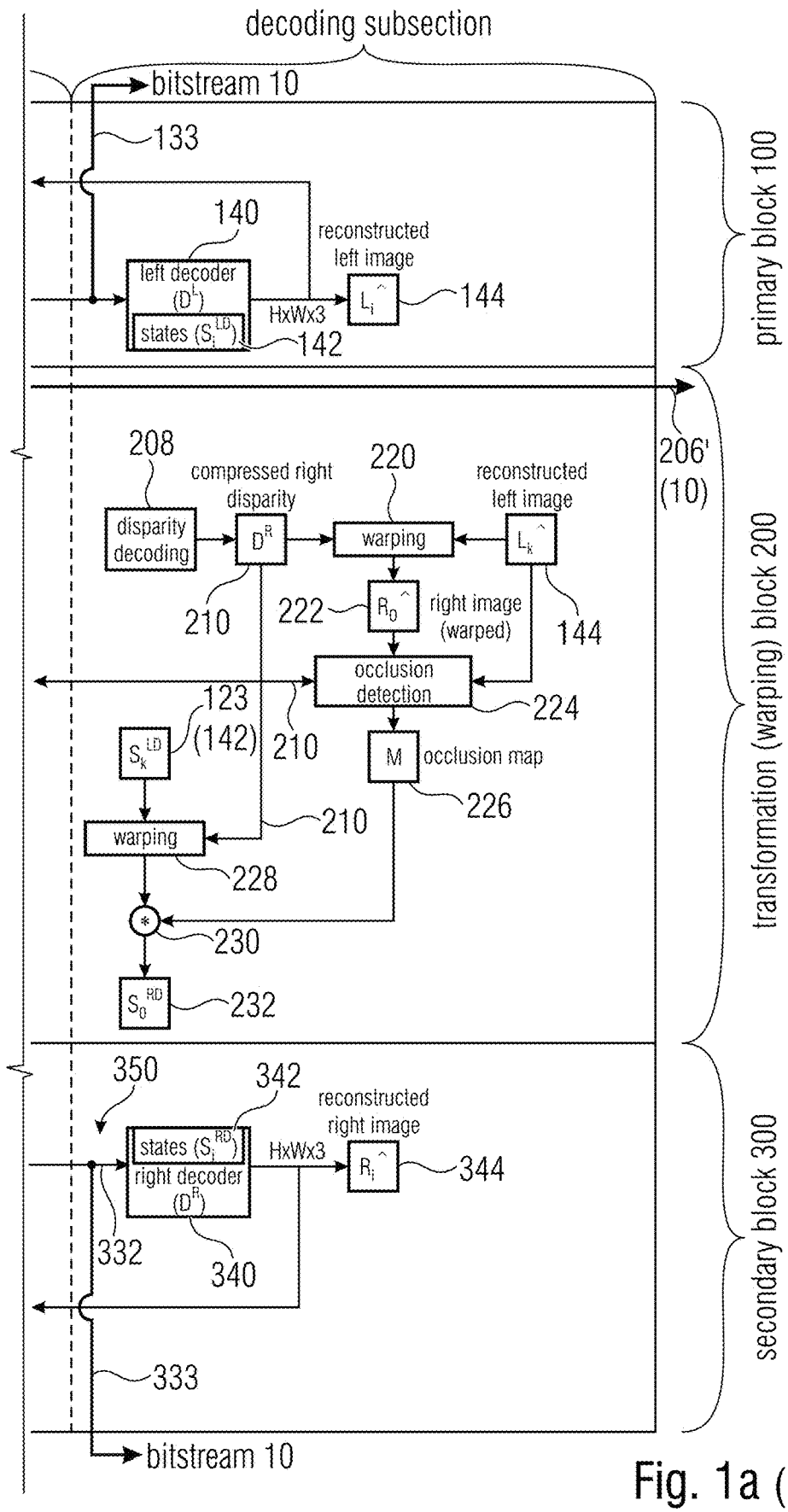
Fig. 1a (Part 2)

Data: L: Left image, R: Right image
Result: $\hat{L_i}$ and $\hat{R_i}$: Reconstructed left and right image k = total number of iteration for left image;
m = total number of iteration for right image;
Initialize: $\hat{L_0} = 0$; $S_0^{LE} = 0$; $S_0^{LD} = 0$;
Compressed right image disparity $D_R$: Estimate $\Rightarrow$ Encode $\Rightarrow$ Decode;

While i = 1, 2, ..., k do
    Residual error: $r_i = \hat{L_{i-1}}$;
    Encoding: ei, $S_i^{LE} = E^L(r_i, S_{i-1}^{LE})$
    Binarizer: $b_i = B^L(e_i)$;
    Decoding: $\hat{L_i}, S_i^{LD} = D^L(b_i, S_{i-1}^{LD})$ $\Big\}$ 100
End $\hat{R_0}$ = Warping ($\hat{L_k}$, $D_R$);
Occlusion map: M = Occlusion Detection ($\hat{L_k}$, $\hat{R_0}$, $D_R$);
$\hat{R_0} = \hat{R_0} \times M$;
Encoder state warping: $S_0^{RE}$ = Warping($S_k^{LE}$, $D_R$) x M;
Decoder state warping: $S_0^{RD}$ = Warping ($S_k^{LD}$, $D_R$) x M; $\Big\}$ 200

While j = 1, 2, ..., m do
    Residual error: $r_j = R - \hat{R_{j-1}}$;
    Encoding: $e_j, S_j^{RE} = E^R(r_j, S_{j-1}^{RE})$
    Binarizer: $b_j = B^R(e_j)$;
    Decoding: $\hat{R_j}, S_j^{RD} = D^R(b_j, S_{j-1}^{RD})$ $\Big\}$ 300
End

Fig. 2

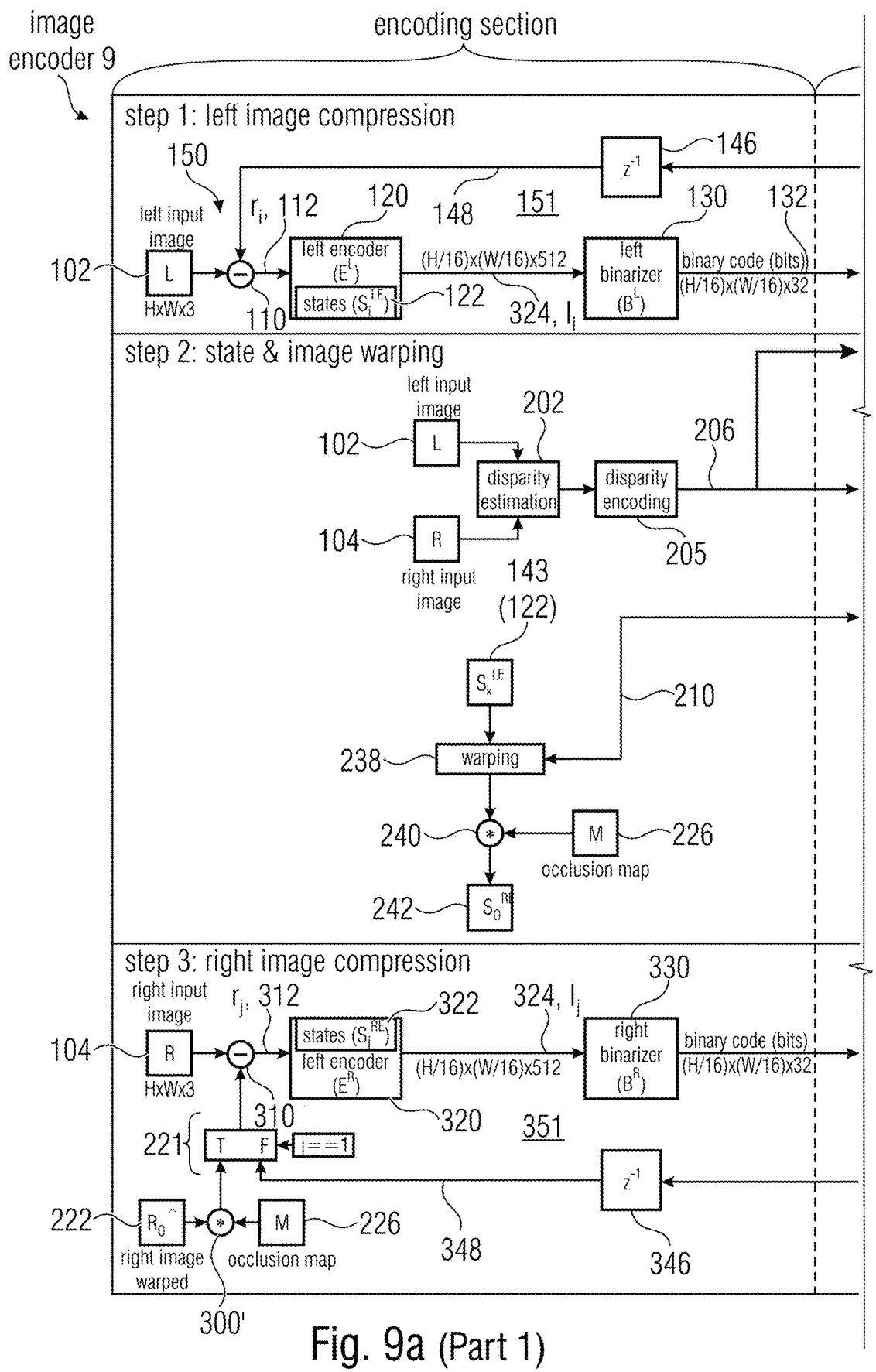
Fig. 9a (Part 1)

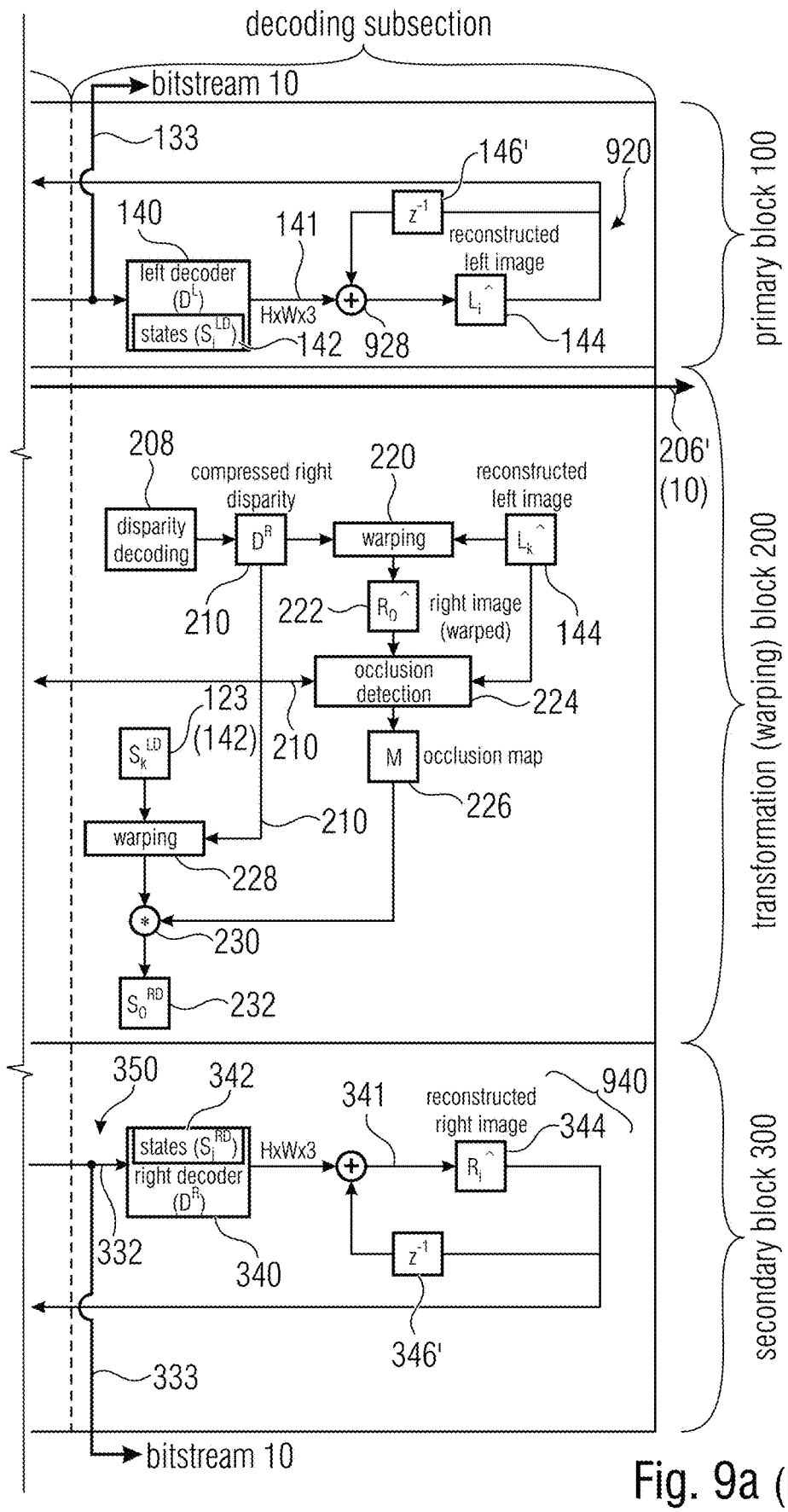
Fig. 9a (Part 2)

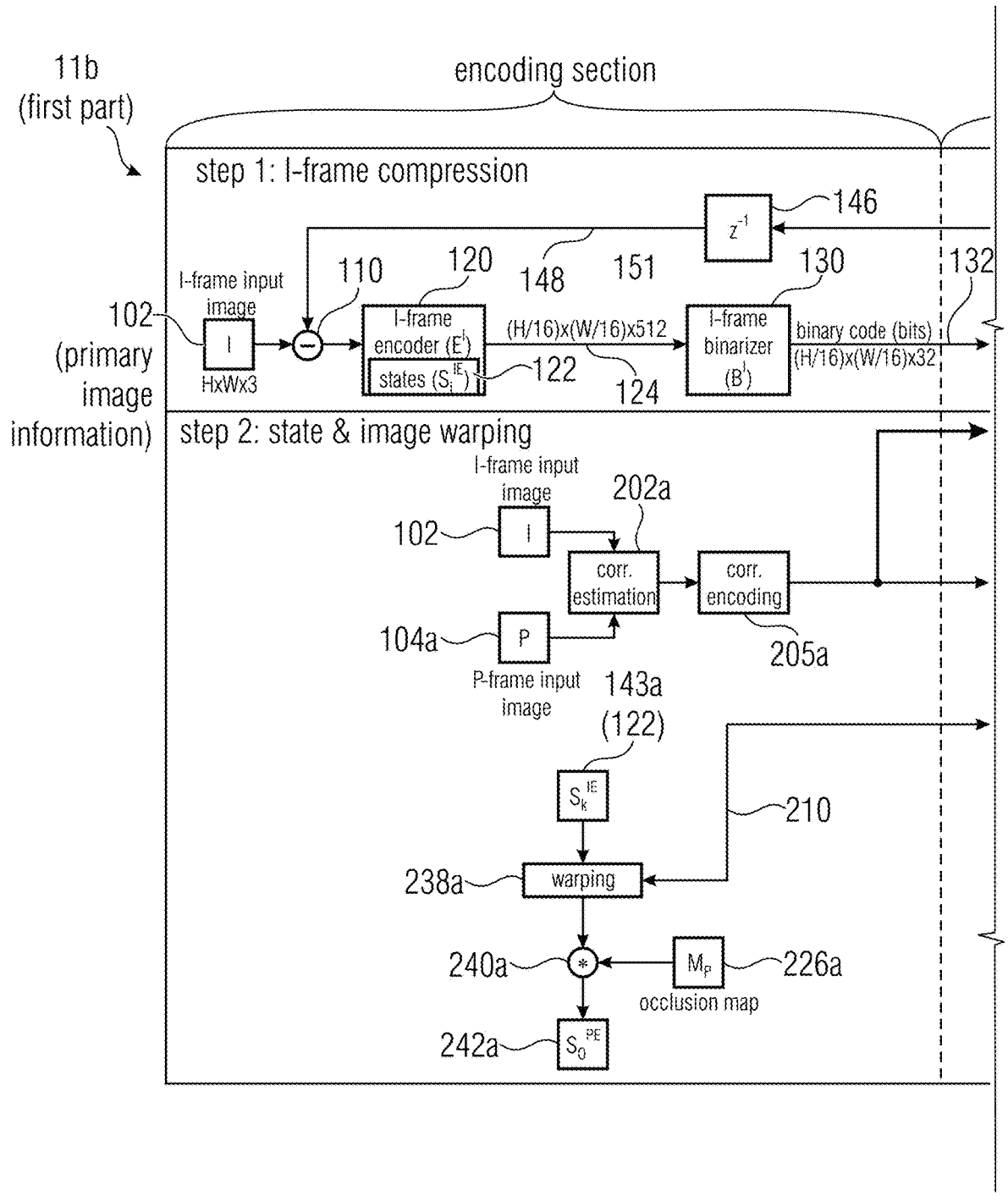
Fig. 11a (Part 1)

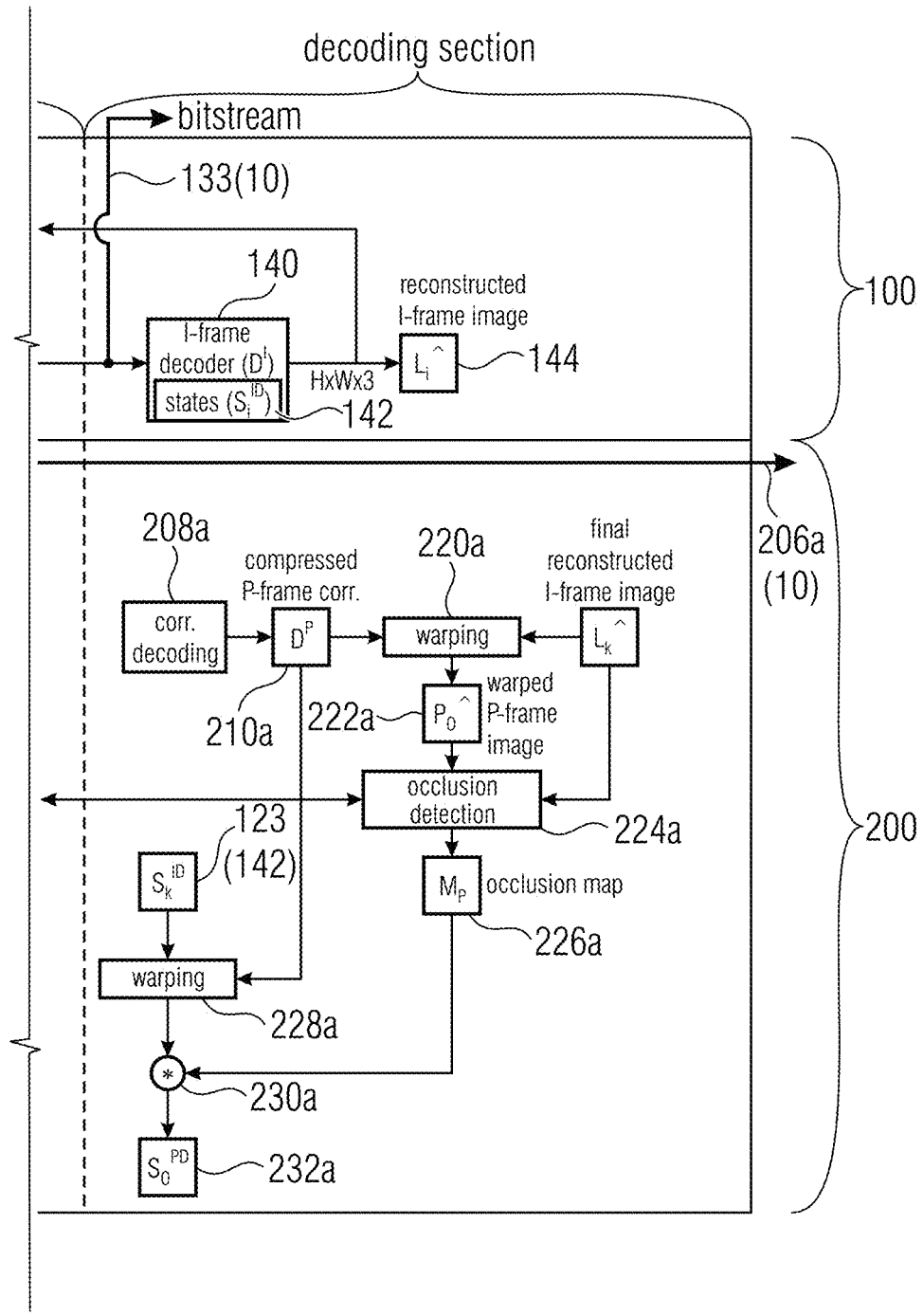
Fig. 11a (Part 2)

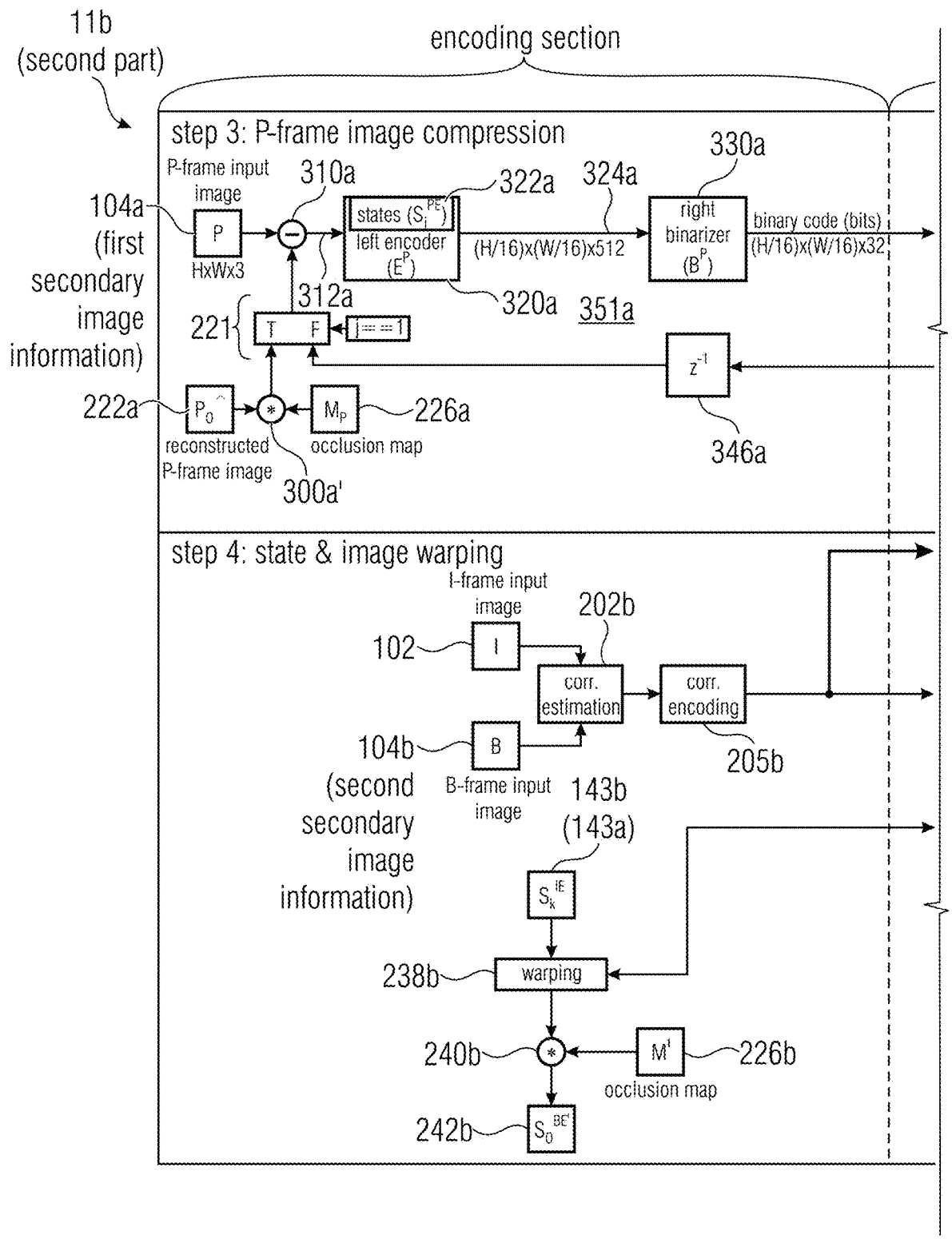
Fig. 11b (Part 1)

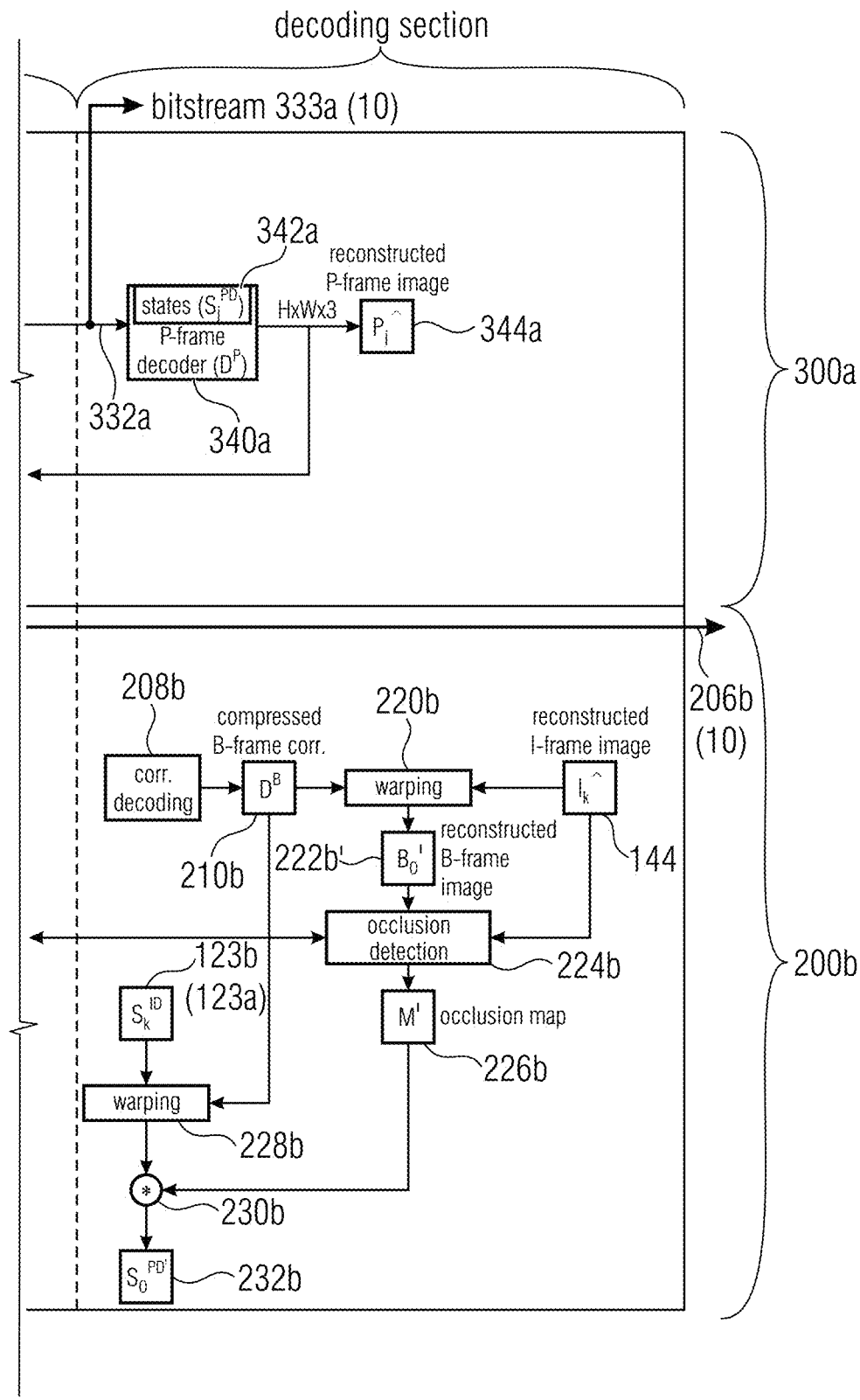
Fig. 11b (Part 2)

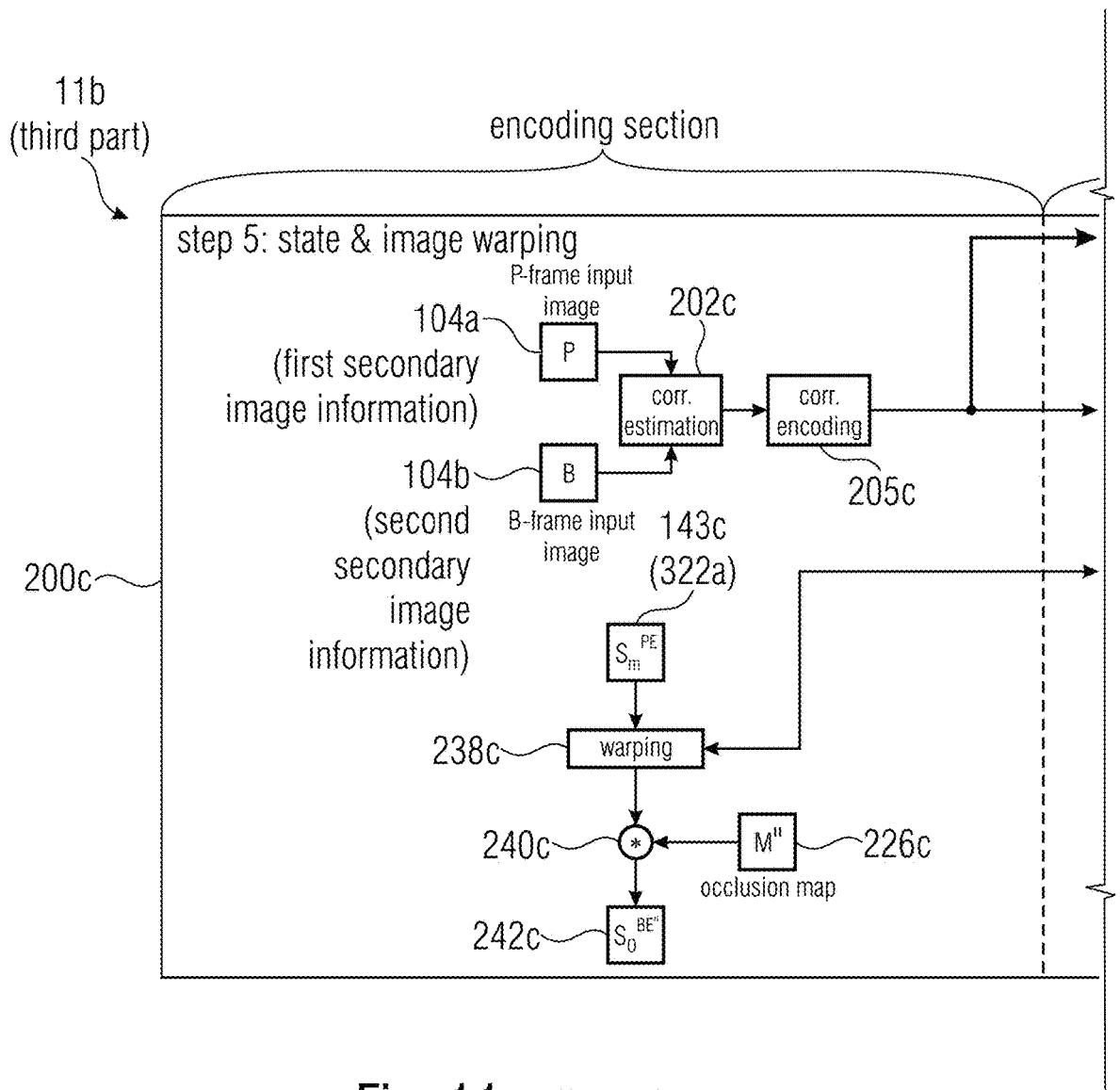
Fig. 11c (Part 1)

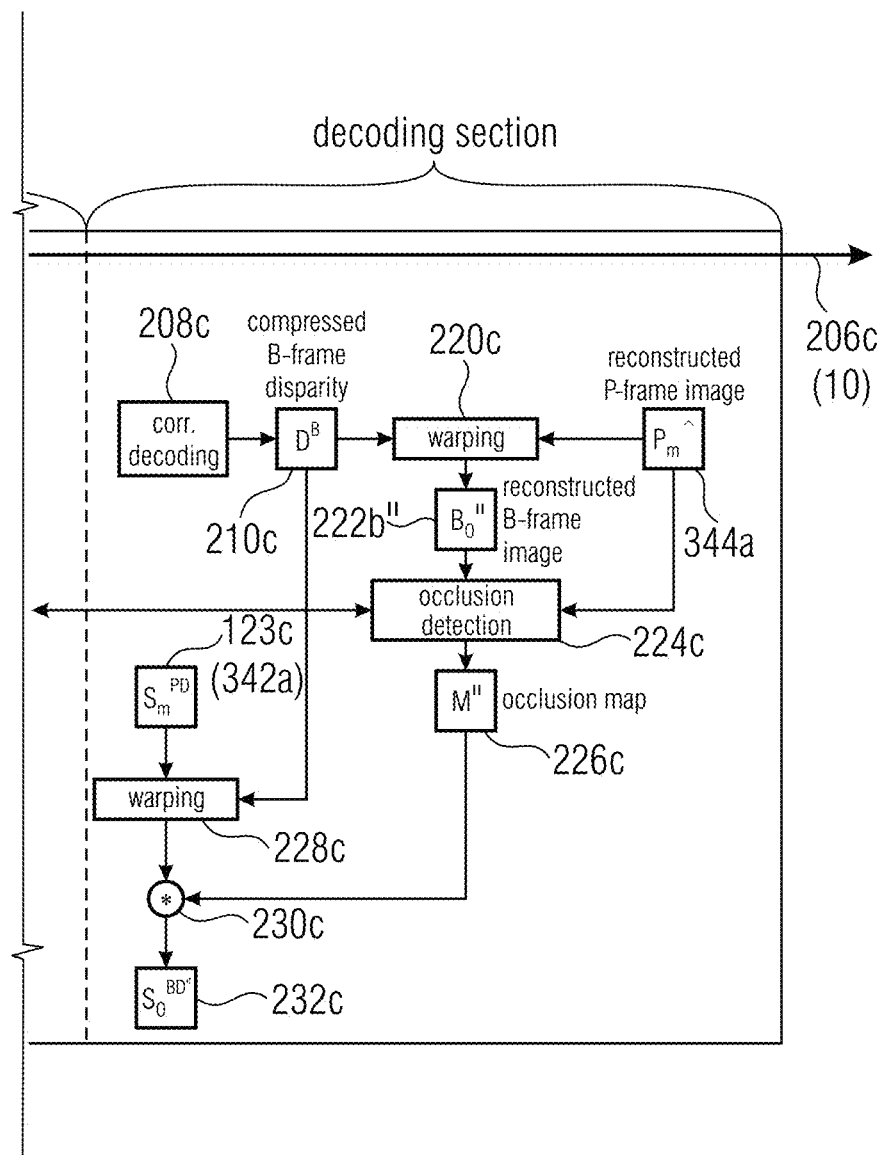
Fig. 11c (Part 2)

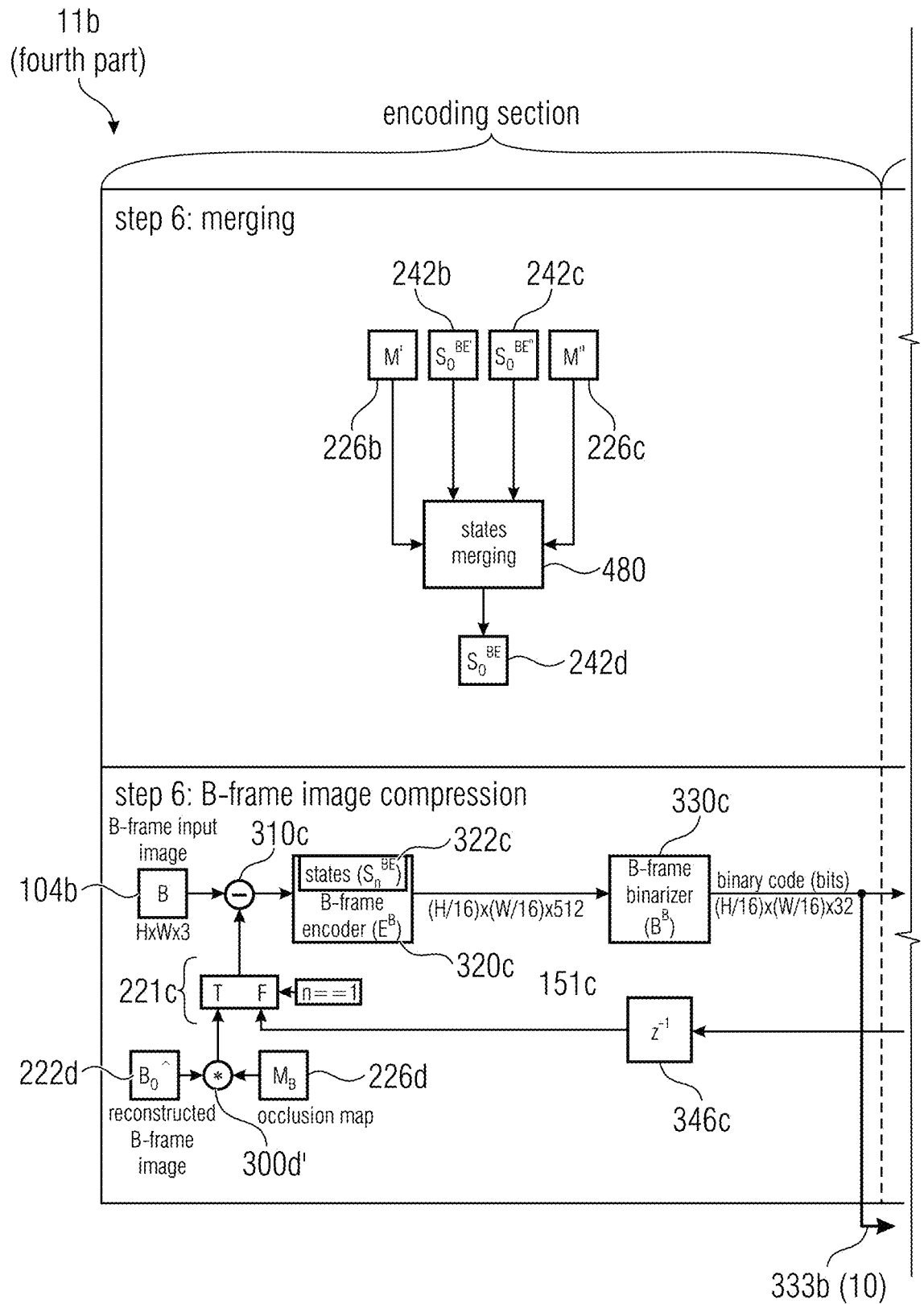
Fig. 11d (Part 1)

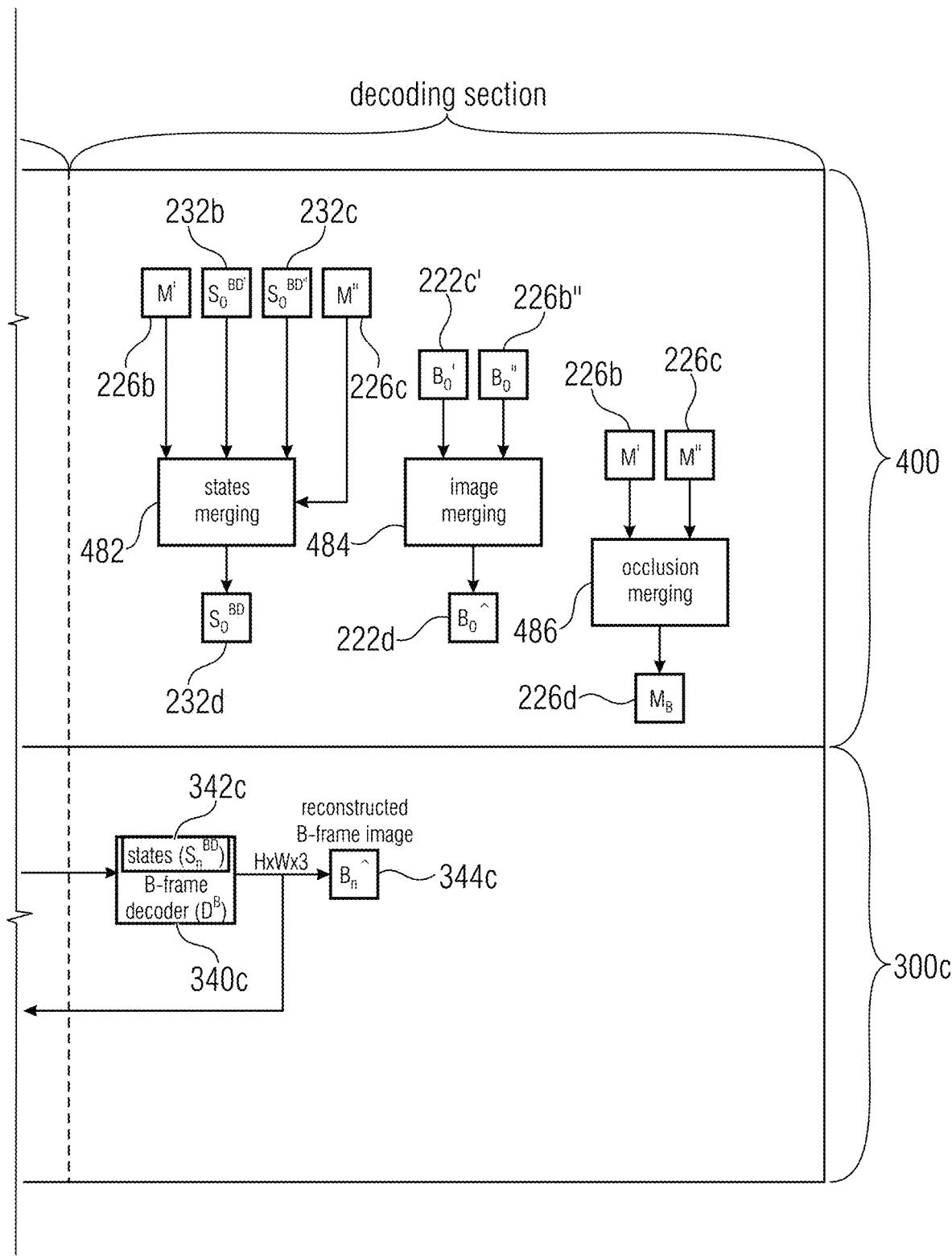
Fig. 11d (Part 2)

ENCODER AND DECODER FOR ENCODING AND DECODING IMAGES

BACKGROUND

The present invention refers to techniques for encoding and/or decoding multiple image information. The techniques may also implement, for example, recurrent neural network based stereo image compression using image and state warping.

In recent years, researchers have proposed deep learning-based single-image compression methods [1], [2], [9], [6]. These methods use a non-linear mapping in form of a neural network, to generate a latent code representation of the input image, which is then quantized into discrete symbols and losslessly coded using a learned entropy model. Some of these methods consist of an encoder-decoder network architecture. The encoder aims to encode the input into latent representation, and the decoder reconstructs the image from the latent code.

Following advancements in the single-image compression domain, researchers also proposed a few deep learning-based stereo image compression (SIC) methods. In [7], the authors proposed a parametric skip function and conditional entropy model to take advantage of the overlapping region between the stereo pairs leading to a significant bitrate saving. The purpose of the parametric skip connection is to warp the features of the left image network to generate the feature maps for the right image network, allowing to pass the information from one feature map accurately to the corresponding spatial position of the other. Similarly, information sharing between the stereo image networks using a homography matrix is presented in [3]. Following the success of homography transformations for tasks like image stitching [4] and light-field compression [5], this is the first attempt to use it for SIC. Moreover, they also introduced two different conditional entropy models, namely a Gaussian mixture model based entropy and a context-based entropy model, to jointly encode the stereo images. A cross-quality enhancement module at the decoder side to further enhance the quality of the reconstructed stereo pair is another added feature of the proposed method. However, both the methods use a variational autoencoder network [2] trained by minimizing the Lagrangian function (Rate+λ*Distorion). Therefore, the main drawback of both compression methods is the retraining of the networks for different values or different points on the rate-distortion curve (RD-curve). Additionally, [7] is computationally very complex, i.e., training and testing are very time-consuming.

The Prior Art Includes:

1—Johannes Ball'e, Valero Laparra, and Eero P Simoncelli. End-to-end optimized image compression. arXiv preprint arXiv:1611.01704, 2016.
2—Johannes Ball'e, David Minnen, Saurabh Singh, Sung Jin Hwang, and Nick Johnston. Variational image compression with a scale hyperprior. arXiv preprint arXiv: 1802.01436, 2018.
3—Xin Deng, Wenzhe Yang, Ren Yang, Mai Xu, Enpeng Liu, Qianhan Feng, and Radu Timofte. Deep homography for efficient stereo image compression. In Proc. of the IEEE Int. Conf. on Computer Vision and Pattern Recognition, pages 1492-1501, 2021.
4—Junhong Gao, Seon Joo Kim, and Michael S Brown. Constructing image panoramas using dual-homography warping. In Proc. of the IEEE Int. Conf. on Computer Vision and Pattern Recognition, pages 49-56, 2011.
5—Xiaoran Jiang, Mikael Le Pendu, Reuben A Farrugia, and Christine Guillemot. Light field compression with homography-based low-rank approximation. IEEE J. of Selected Topics in Signal Processing, 11(7):1132-1145, 2017.
6—Alekh Karkada Ashok and Nagaraju Palani. Autoencoders with variable sized latent vector for image compression. In Proc. of the IEEE Int. Conf. on Computer Vision and Pattern Recognition Workshops, pages 2547-2550, 2018.
7—Jerry Liu, Shenlong Wang, and Raquel Urtasun. Dsic: Deep stereo image compression. In Proc. of the IEEE Int. Conference on Computer Vision, pages 3136-3145, 2019.
8—Majid Rabbani. Jpeg2000: Image compression fundamentals, standards and practice. J. of Electronic Imaging, 11(2):286, 2002.
9—George Toderici, Damien Vincent, Nick Johnston, Sung Jin Hwang, David Minnen, Joel Shor, and Michele Covell. Full resolution image compression with recurrent neural networks. In Proc. of the IEEE Int. Conf. on Computer Vision and Pattern Recognition, pages 5306-5314, 2017.
10—Toderici, G. D., O'malley, S., Sukthankar, R., Hwang, S. J., Vincent, D., Johnston, N., . . . & Covell, M. (2019). U.S. Pat. No. 10,192,327. Washington, D.C.: U.S. Patent and Trademark Office.
11—Covell, M., Vincent, D., Minnen, D. C., Singh, S., Hwang, S. J., Johnston, N., . . . & Toderici, G. D. (2020). U.S. patent application Ser. No. 16/617,484.]

THE PRESENT INVENTION

In accordance to an aspect, there is provided An image decoder for decoding, from a bitstream, a plurality of images represented by at least:

encoded primary image information on a subject along a first dimension, a second dimension, and a number of channels equal to or greater than 1, secondary image information on the same subject along a first dimension, a second dimension, and a number of channels equal to or greater than 1, wherein the secondary image information and the primary image information are associated with each other through correspondence information, wherein the image decoder comprises a bitstream reader configured to read, from the bitstream, the encoded primary image information and the encoded secondary image information, the image decoder further comprising:

a primary block configured to obtain a decoded version of the primary image information by iteratively applying, to the encoded primary image information, a primary layer which includes at least one primary sublayer;

a secondary block configured to obtain a decoded version of the secondary image information by iteratively applying, to the encoded secondary image, a secondary layer which includes at least one secondary sublayer, wherein at each iteration each of at least one primary sublayer and at least one secondary sublayer has an input, an output 144) and a state, so that at the initial iteration each of the at least one primary sublayer and of the at least one secondary sublayer generates the state based on at least the initialization state, and at each iteration subsequent to the initial iteration, each of the at least one primary sublayer and at least one secondary sublayer provides the current output based on at least the current state or the preceding state, and updates the current state based on at least the preceding state and on the current input, wherein the initialization state of the at least one primary sublayer is a default state, wherein the image decoder further comprises a transformation block for transforming, through a transformation based on the correspondence information, a state of at least one primary sublayer onto an estimate of a state (e.g. an initialization state) of the at least one secondary sublayer, so as to provide the state of the at least one secondary sublayer.

Accordingly, the state (e.g. an initialization state) of the secondary block starts already having valuable information obtained at the primary block.

The at least one primary sublayer may include:
at least one primary decoding sublayer, iteratively outputting intermediate decoded versions of the encoded versions of the primary image information, or processed or quantized versions thereof, wherein the at least one secondary sublayer includes:
at least one secondary decoding sublayer, iteratively outputting intermediate decoded versions of the encoded versions of the secondary image information, or processed and/or quantized versions thereof.

In accordance to an aspect, at least one primary decoding sublayer and/or at least one secondary decoding sublayer may be configured to generate the current output which has the first and second dimensions upsampled, but with a smaller number of channels, with respect to the current input, or is connected to at least one upsample sublayer configured to perform an upsampling which increases the extension of the first and second dimensions but decreases the number of channels.

In accordance to an aspect, each of the decoded version of the primary image information at the output of the at least one primary decoding sublayer and the decoded version of the secondary image information at the output of the at least one secondary decoding sublayer may represent at least one image, the at least one primary sublayer and the at least secondary sublayer being applied to iteratively reconstruct the at least one image.

In accordance to an aspect, the decoded versions of the first and second primary image information at the output of the at least one primary and secondary decoding sublayer may represent a primary and a secondary residual image information, respectively, from which the primary and secondary image information is reconstructed iteratively, respectively, in such a way that:
at the initial iteration, the reconstructed primary and secondary image information correspond to the primary and secondary residual image information, respectively, and/or
at each of the subsequent iterations, the reconstructed primary and secondary image information are obtained from the primary and secondary decoded residual image information and the previously reconstructed image information, respectively.

In accordance to an aspect, at least one primary sublayer and/or at least one secondary sublayer is configured to iteratively generate the current output by mapping:
at least the state (e.g. initialization state) onto a current state, through at least a state-to-state parameter applied to the state (e.g. initialization state), at the first iteration;
a current input and/or at least the state of the preceding iteration onto a current state through an input-to-state parameter applied to the current input and the state-to-state parameter applied to the preceding state, at any subsequent iteration;
at least the preceding state or at least the current state onto a current output through at least one state-to-output parameter applied to the preceding state or at least the current state.

In accordance to an aspect, at least one of the input-to-state parameter, the state-to-state parameter, and the state-to-output parameter may be a learnable parameter.

In accordance to an aspect, the image decoder may have pre-defined default values for the state (e.g. initialization state) of the at least one secondary sublayer, the transformation block being configured to evaluate occlusion probabilities of entries of the primary image information and/or of entries of the secondary image information, so as to generate initialization values of entries of the state (e.g. initialization state) of the at least one secondary sublayer in such a way that the entries with higher occlusion probability have values closer to the pre-defined default values than entries with lower occlusion probability, which have values closer to the estimate of the state (e.g. initialization state) of the at least one secondary sublayer.

In accordance to an aspect, the transformation block may be configured to transform the current state of the at least one primary sublayer onto the estimate of the state (e.g. initialization state) of the at least one secondary sublayer through an association of entries in the estimate of the state (e.g. initialization state) of the at least one secondary sublayer with entries in the current state of the at least one primary sublayer by using the correspondence information between the primary image information and the secondary image information.

In accordance to an aspect, the image decoder may process the correspondence information in form of disparity between the entries of the primary image information and the entries of the secondary image information.

In accordance to an aspect, the image decoder apply similarity metrics between the primary image information, or a processed version thereof, and the secondary image information, or a processed version thereof, to thereby process correspondence information in form of flow vector values or motion vector values between the entries of the primary image information and the entries of the secondary image information.

In accordance to an aspect, the primary image information may include primary image information which is a reference image information, wherein the secondary image information includes:
a first secondary image information including visual information on a first secondary image, and
a second secondary image information including visual information on a second secondary image,
wherein the primary block is instantiated to iteratively obtain the encoded version of the primary image information from an encoded version of the primary image information,
wherein the secondary block may be instantiated by:
a first secondary block instantiation for iteratively obtaining, from an encoded version of the first secondary image information, the decoded version of the first secondary image information through at least one first secondary sublayer; and
a second secondary block instantiation for obtaining, from an encoded version of the second secondary image information, the decoded version of the second secondary image information through at least one second secondary sublayer;

wherein the transformation block may be instantiated by:

a first transformation block instantiation to transform, through correspondence information between the primary image information and the first secondary image information, a state of the at least one primary sublayer onto an estimate of the state (e.g. initialization state) of the at least one first secondary sublayer;

a second transformation block instantiation to transform, through correspondence information between the primary image information and the second secondary image information, a state of the at least one primary sublayer onto a first estimate of an state (e.g. initialization state) of the at least one second secondary sublayer;

a third transformation block instantiation to transform, through correspondence information between the first secondary image information and the second secondary image information, a state of the at least one first secondary sublayer onto a second estimate of the state (e.g. initialization state) of the at least one second secondary sublayer, the image decoder further comprising a merging layer configured to merge the first estimate of the state (e.g. initialization state) of the at least one second secondary sublayer with the second estimate of the state (e.g. initialization state) of the at least one second secondary sublayer, to obtain the estimate of the state (e.g. initialization state) of the at least one second secondary sublayer.

In accordance to an aspect, the at least one primary sublayer and/or at least one secondary sublayer may be a learnable layer.

In accordance to an aspect, there is provided an image encoder for encoding, in a bitstream, a plurality of images represented by at least:

primary image information on a subject along a first dimension, a second dimension, and a number of channels equal to or greater than 1, secondary image information on the same subject along a first dimension, a second dimension, and a number of channels equal to or greater than 1, wherein the secondary image information and the primary image information are associated with each other through correspondence information, the image encoder comprising:

a primary block configured to obtain an encoded version of the primary image information, or processed version thereof, by iteratively applying a primary layer which includes at least one primary sublayer;

a secondary block configured to obtain an encoded version of the secondary image information, or processed version thereof, by iteratively applying a secondary layer which includes at least one secondary sublayer, wherein at each iteration each of at least one primary sublayer and at least one secondary sublayer has a current input, a current output and a current state, so that, at an initial iteration, each of the at least one primary sublayer and of the at least one secondary sublayer generates the current state based on at least the state (e.g. initialization state), and at each iteration subsequent to the initial iteration, each of the at least one primary sublayer and at least one secondary sublayer provides the current output based at least on the current state or the preceding state, and updates the current state based on at least the preceding state and on the current input, wherein the initialization state for the at least one primary sublayer is a default state, wherein the image encoder further comprises a transformation block for transforming, through a transformation based on the correspondence information, a current state of at least one primary sublayer onto an estimate of an state (e.g. initialization state) of the at least one secondary sublayer, so as to obtain the state (e.g. initialization state) of the at least one secondary sublayer, wherein the image encoder further comprises a bitstream writer configured to write, in the bitstream, the encoded version of the primary image information, or processed version thereof, and the encoded version of the secondary image information, or processed version thereof.

In accordance to an aspect, the at least one primary sublayer may include:

at least one primary information encoding sublayer iteratively outputting intermediate encoded versions of the primary image information, or processed version thereof; and at least one primary information decoding sublayer, iteratively outputting intermediate decoded versions of the encoded versions of the primary image information, or processed version thereof, wherein the at least one secondary sublayer include at least one secondary information encoding sublayer iteratively outputting intermediate encoded versions of the secondary image information, or processed version thereof; and at least one secondary information decoding sublayer, iteratively outputting intermediate decoded versions of the encoded versions of the secondary image information, or processed version thereof.

In accordance to an aspect, the primary block may include a primary comparison block configured to iteratively compare the primary image information with the intermediate decoded versions, or processed versions thereof, to obtain a primary residual, thereby inputting, to the at least one primary sublayer, the primary residual or a processed version thereof, and/or the secondary block may include a secondary comparison block configured to iteratively compare the secondary image information with the intermediate decoded versions, or processed versions thereof, to obtain a secondary residual, thereby inputting, in the at least one secondary sublayer, the secondary residual or a processed version thereof.

In accordance to an aspect, the primary block may include, interposed between the at least one primary information encoding sublayer and the at least one primary information decoding sublayer, a primary quantizer to iteratively provide quantized versions of the intermediate encoded versions of the primary image information so that the quantized versions of the intermediate encoded versions of the primary image information, or processed versions thereof, are represented in binary, wherein the at least one primary image decoding sublayer is iteratively inputted with the quantized versions, or processed versions thereof, of the intermediate encoded versions of the primary image information, or processed versions thereof; and/or the secondary block may include, between the at least one secondary information encoding sublayer and the at least one secondary information decoding sublayer, a secondary quantizer to iteratively provide quantized versions of the intermediate encoded versions of the secondary image information, or processed versions thereof, so that the quantized versions of the intermediate encoded versions of the secondary image information, or processed versions thereof, are represented in binary, wherein the at least one secondary information decoding sublayer is iteratively inputted with the quantized versions, or processed versions thereof, of the intermediate encoded versions of the secondary image information, or processed versions thereof.

In accordance to an aspect, at least one of the primary quantizer and the secondary quantizer may be a convolutional sublayer without state.

In accordance to an aspect, at least one primary information encoding sublayer and/or at least one secondary information encoding sublayer is configured to generate the current output which has the first and second dimensions downsampled, but with a greater number of channels, with respect to the current input, or is connected to at least one downsample sublayer configured to perform a downsampling which reduces the extension of the first and second dimensions but increases the number of channels; and/or at least one primary information decoding sublayer and/or at least one secondary information decoding sublayer is configured to generate the current output which has the first and second dimensions upsampled, but with a smaller number of channels, with respect to the current input, or is connected to at least one upsample sublayer configured to perform an upsampling which increases the extension of the first and second dimensions but decreases the number of channels.

In accordance to an aspect, at least one primary sublayer and/or at least one secondary sublayer may be configured to iteratively generate the current output by mapping:

at least the state (e.g. initialization state) onto a current state, through at least a state-to-state parameter applied to the state (e.g. initialization state), at the initial iteration;

a current input and/or at least the state of the preceding iteration onto a current state through an input-to-state parameter applied to the current input and the state-to-state parameter applied to the preceding state, at any subsequent iteration;

at least the preceding state or at least the current state onto a current output through at least one state-to-output parameter applied to the preceding state or at least the current state.

In accordance to an aspect, at least one of the input-to-state parameter, the state-to-state parameter, and the state-to-output parameter may be a learnable parameter.

In accordance to an aspect, the image encoder may have pre-defined default values for the state (e.g. initialization state) of the at least one secondary sublayer, the image encoder being configured to evaluate occlusion probabilities of entries of the primary image information and/or of entries of the secondary image information, so as to generate initialization values of entries of the state (e.g. initialization state) of the at least one secondary sublayer in such a way that entries with higher occlusion probability have values closer to the pre-defined default values than entries with lower occlusion probability, which have values closer to the estimate of the state (e.g. initialization state) of the at least one secondary sublayer.

In accordance to an aspect, the transformation block may be configured to transform the current state of the at least one primary sublayer onto the estimate through at least an association of entries in the estimate of the state (e.g. initialization state) of the at least one secondary sublayer with entries in the current state of the at least one primary sublayer by using correspondence information between the primary image information and the secondary image information.

In accordance to an aspect, the image encoder may be configured to apply similarity metrics between the primary image information or a processed version thereof, and the secondary image information or a processed version thereof, to thereby process correspondence information in form of disparity values between at least the entries of the primary image information and the entries of at least the secondary image information or a processed version thereof.

In accordance to an aspect, the image encoder may be configured to apply similarity metrics between the primary image information or a processed version thereof, and the secondary image information or a processed version thereof, to thereby process correspondence information in form of flow vector values or motion vector values between the entries of at least the primary image information and the entries of at least the secondary image information.

In accordance to an aspect, the primary image information, or a processed version thereof, may provide information on a primary image, and the secondary image information, or a processed version thereof, provides information on a secondary image of the some subject.

In accordance to an aspect, the primary image information may include primary image information which is a reference image information, wherein the secondary image information may include:

a first secondary image information including visual information on a first secondary image, and a second secondary image information including visual information on a second secondary image, wherein the primary block is instantiated to iteratively obtain the encoded version of the primary image information, wherein the secondary block is instantiated by:

a first secondary block instantiation for iteratively obtaining the encoded version of the first secondary image information through at least one first secondary sublayer; and a second secondary block instantiation for obtaining the encoded version of the second secondary image information through at least one second secondary sublayer;

wherein the transformation block is instantiated by:

a first transformation block instantiation to transform, through correspondence information between the primary image information and the first secondary image information, a state of the at least one primary sublayer onto an estimate of the state (e.g. initialization state) of the at least one first secondary sublayer;

a second transformation block instantiation to transform, through correspondence information between the primary image information and the second secondary image information, a state of the at least one primary sublayer onto a first estimate of an state (e.g. initialization state) of the at least one second secondary sublayer;

a third transformation block instantiation to transform, through correspondence information between the first secondary image information and the second secondary image information, a state of the at least one first secondary sublayer onto a second estimate of the state (e.g. initialization state) of the at least one second secondary sublayer, the image decoder further comprising a merging layer configured to merge the first estimate of the state (e.g. initialization state) of the at least one second secondary sublayer with the second estimate of the state (e.g. initialization state) of the at least one second secondary sublayer, to obtain the estimate of the state (e.g. initialization state) of the at least one second secondary sublayer.

In accordance to an aspect, there may be obtained a estimated version of the secondary image information which keeps into account the correspondence information between the entries in the primary image information and the entries in the secondary image information, wherein the secondary block includes a secondary comparison block configured to iteratively compare the secondary image information with the intermediate decoded versions to obtain a residual, wherein, at the initial iteration, the secondary comparison block is inputted with the estimated version of the secondary image information, so as to obtain an initial residual which is obtained from the comparison between the secondary image information and the estimated version of the secondary image information.

In accordance to an aspect, the secondary block may be configured so that the entries of the estimated version of the version of the secondary image information, or a processed version thereof, are conditioned by occlusion probabilities, in such a way that entries with comparatively high occlusion probability have values closer to a default value than entries with comparatively low occlusion probability.

In accordance to an aspect, the at least one primary sublayer and/or at least one secondary sublayer is a learnable sublayer.

In accordance to an aspect, each of the decoded version of the primary image information, or a processed version thereof, at the output of the at least one primary decoding sublayer and the decoded version of the secondary image information, or a processed version thereof, at the output of the at least one secondary decoding sublayer represents at least one image, the at least one primary sublayer and the at least secondary sublayer being applied to iteratively reconstruct the at least one image.

In accordance to an aspect, there is provided an image encoding method for encoding, into a bitstream, a plurality of images represented by at least:

primary image information on a subject along a first dimension, a second dimension, and a number of channels equal to or greater than 1, secondary image information on the subject along a first dimension, a second dimension, and a number of channels equal to or greater than 1, wherein the secondary image information and the primary image information are associated with each other through correspondence information, the method comprising:

obtaining an encoded version of the primary image information, or processed version thereof, by iteratively applying a primary layer which includes at least one primary sublayer;

obtaining an encoded version of the secondary image information, or processed version thereof, by iteratively applying a secondary layer which includes at least one secondary sublayer, wherein at each iteration each of at least one primary sublayer and at least one secondary sublayer has a current input, a current output and a current state, so that, at an initial iteration, each of the at least one primary sublayer and of the at least one secondary sublayer generates the current state based on at least the state (e.g. initialization state), and at each iteration subsequent to the initial iteration, each of the at least one primary sublayer and at least one secondary sublayer provides the current output based at least on the current state or the preceding state, and updates the current state based on at least the preceding state and on the current input, wherein the state (e.g. initialization state) of the at least one primary sublayer is a default state, wherein the method further comprises transforming, through a transformation based on the correspondence information, a current state of at least one primary sublayer onto an estimate of an state (e.g. initialization state) of the at least one secondary sublayer, so as to obtain the state (e.g. initialization state) of the at least one secondary sublayer, wherein method further comprises writing, into the bitstream, the encoded version of the primary image information, or processed version thereof, and the encoded version of the secondary image information, or processed version thereof.

In accordance to an aspect, there is provided an image decoding method for decoding, from a bitstream, a plurality of images represented by at least:

encoded primary image information on a subject along a first dimension, a second dimension, and a number of channels equal to or greater than 1, secondary image information on the subject along a first dimension, a second dimension, and a number of channels equal to or greater than 1, wherein the secondary image information and the primary image information are associated with each other through correspondence information, wherein the method comprises:

reading from a bitstream the encoded primary image information and the encoded secondary image information, obtaining a decoded version of the primary image information by iteratively applying, to the encoded primary image information, a primary layer which includes at least one primary sublayer;

obtaining a decoded version of the secondary image information by iteratively applying, to the encoded secondary image, a secondary layer which includes at least one secondary sublayer, wherein at each iteration each of at least one primary sublayer and at least one secondary sublayer has an input, an output 144) and a state, so that at the initial iteration each of the at least one primary sublayer and of the at least one secondary sublayer generates the state based on at least the state (e.g. initialization state), and at each iteration subsequent to the initial iteration, each of the at least one primary sublayer and at least one secondary sublayer provides the current output based on at least the current state or the preceding state, and updates the current state based on at least the preceding state and on the current input, wherein the initialization state for the at least one primary sublayer is a default state, wherein the method further comprises transforming, through a transformation based on the correspondence information, a state of at least one primary sublayer onto an estimate of an state (e.g. initialization state) of the at least one secondary sublayer, for obtaining the state (e.g. initialization state) of the at least one secondary sublayer.

In accordance to an aspect, there is provided a non-transitory storage unit storing instruction which, when executed by a processor, cause the processor to perform an image encoding method for encoding, into a bitstream, a plurality of images represented by at least:

primary image information on a subject along a first dimension, a second dimension, and a number of channels equal to or greater than 1, secondary image information on the subject along a first dimension, a second dimension, and a number of channels equal to or greater than 1, wherein the secondary image information and the primary image information are associated with each other through correspondence information, the method comprising:

obtaining an encoded version of the primary image information, or processed version thereof, by iteratively applying a primary layer which includes at least one primary sublayer;

obtaining an encoded version of the secondary image information, or processed version thereof, by iteratively applying a secondary layer which includes at least one secondary sublayer, wherein at each iteration each of at least one primary sublayer and at least one secondary sublayer has a current input, a current output and a current state, so that, at an initial iteration, each of the at least one primary sublayer and of the at least one secondary sublayer generates the current state based on at least the state (e.g. initialization state), and at each iteration subsequent to the initial iteration, each of the at least one primary sublayer and at least one secondary sublayer provides the current output based at least on the current state or the preceding state, and updates the current state based on at least the preceding state and on the current input, wherein the state (e.g. initialization state) of the at least one primary sublayer is a default state, wherein the method further comprises transforming, through a transformation based on the correspondence information, a current state of at least one primary sublayer onto an estimate of an state (e.g. initialization state) of the at least one secondary sublayer, so as to obtain the state (e.g. initialization state) of the at least one secondary sublayer, wherein method further comprises writing, into the bitstream, the encoded version of the primary image information, or processed version thereof, and the encoded version of the secondary image information, or processed version thereof.

In accordance to an aspect, there is provided a non-transitory storage unit storing instruction which, when executed by a processor, cause the processor to perform an image decoding method for decoding, from a bitstream, a plurality of images represented by at least:

encoded primary image information on a subject along a first dimension, a second dimension, and a number of channels equal to or greater than 1, secondary image information on the subject along a first dimension, a second dimension, and a number of channels equal to or greater than 1, wherein the secondary image information and the primary image information are associated with each other through correspondence information, wherein the method comprises:

reading from a bitstream the encoded primary image information and the encoded secondary image information, obtaining a decoded version of the primary image information by iteratively applying, to the encoded primary image information, a primary layer which includes at least one primary sublayer;

obtaining a decoded version of the secondary image information by iteratively applying, to the encoded secondary image, a secondary layer which includes at least one secondary sublayer, wherein at each iteration each of at least one primary sublayer and at least one secondary sublayer has an input, an output 144) and a state, so that at the initial iteration each of the at least one primary sublayer and of the at least one secondary sublayer generates the state based on at least the initialization state (e.g. initialization state), and at each iteration subsequent to the initial iteration, each of the at least one primary sublayer and at least one secondary sublayer provides the current output based on at least the current state or the preceding state, and updates the current state based on at least the preceding state and on the current input, wherein the initialization state of the at least one primary sublayer is a default state, wherein the method further comprises transforming, through a transformation based on the correspondence information, a state of at least one primary sublayer onto an estimate of an state (e.g. initialization state) of the at least one secondary sublayer, for obtaining the state (e.g. initialization state) of the at least one secondary sublayer.

FIGURES

FIG. 1*a* shows an image encoder according to an example.

FIG. 1*b* shows an image decoder according to an example.

FIG. 2 shows a pseudocode according to an example.

FIG. 3*a* shows an element of an image encoder (e.g., the image encoder of FIG. 1*a*).

FIG. 3*b* shows an element of an image decoder (e.g., the image decoder of FIG. 1*b*).

FIG. 4*a*, 4*b*, 4*c* show examples of recurrent learnable layers.

FIGS. 7*a*-7*d* show different examples with different occlusion techniques.

Figure 8A:
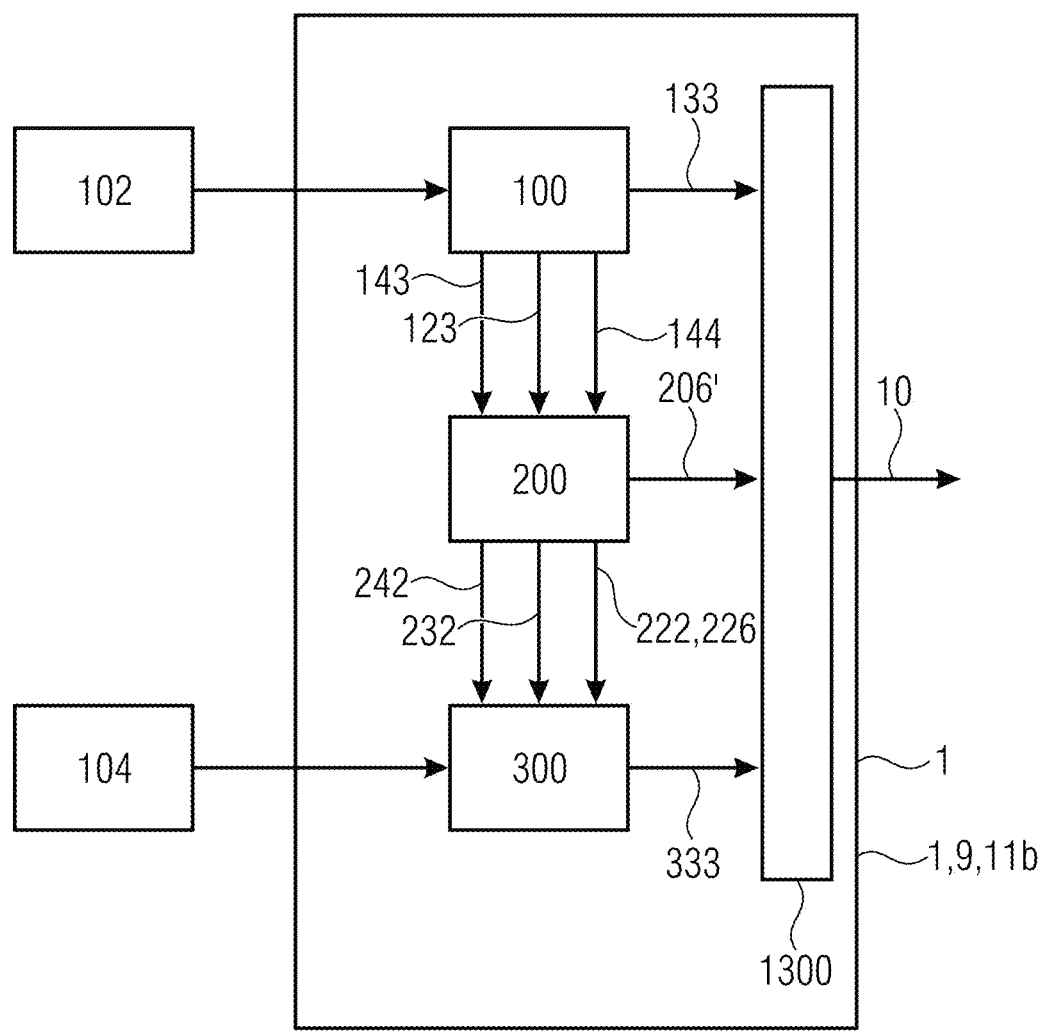

FIG. 8*a* shows an example of image encoder.

Figure 8B:
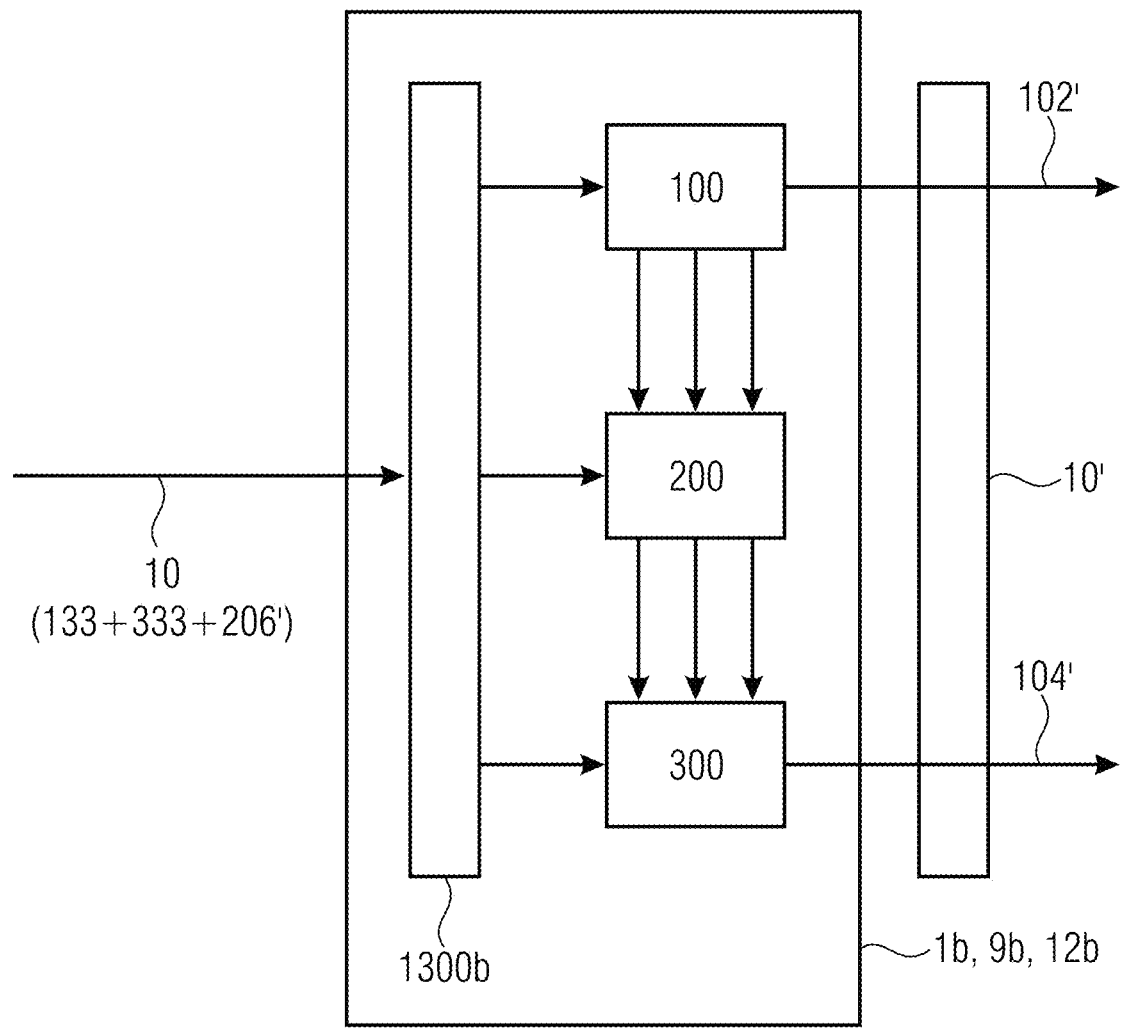

FIG. 8*b* shows an example of image decoder.

FIG. 9*a* shows an image encoder according to an example.

Figure 9B:
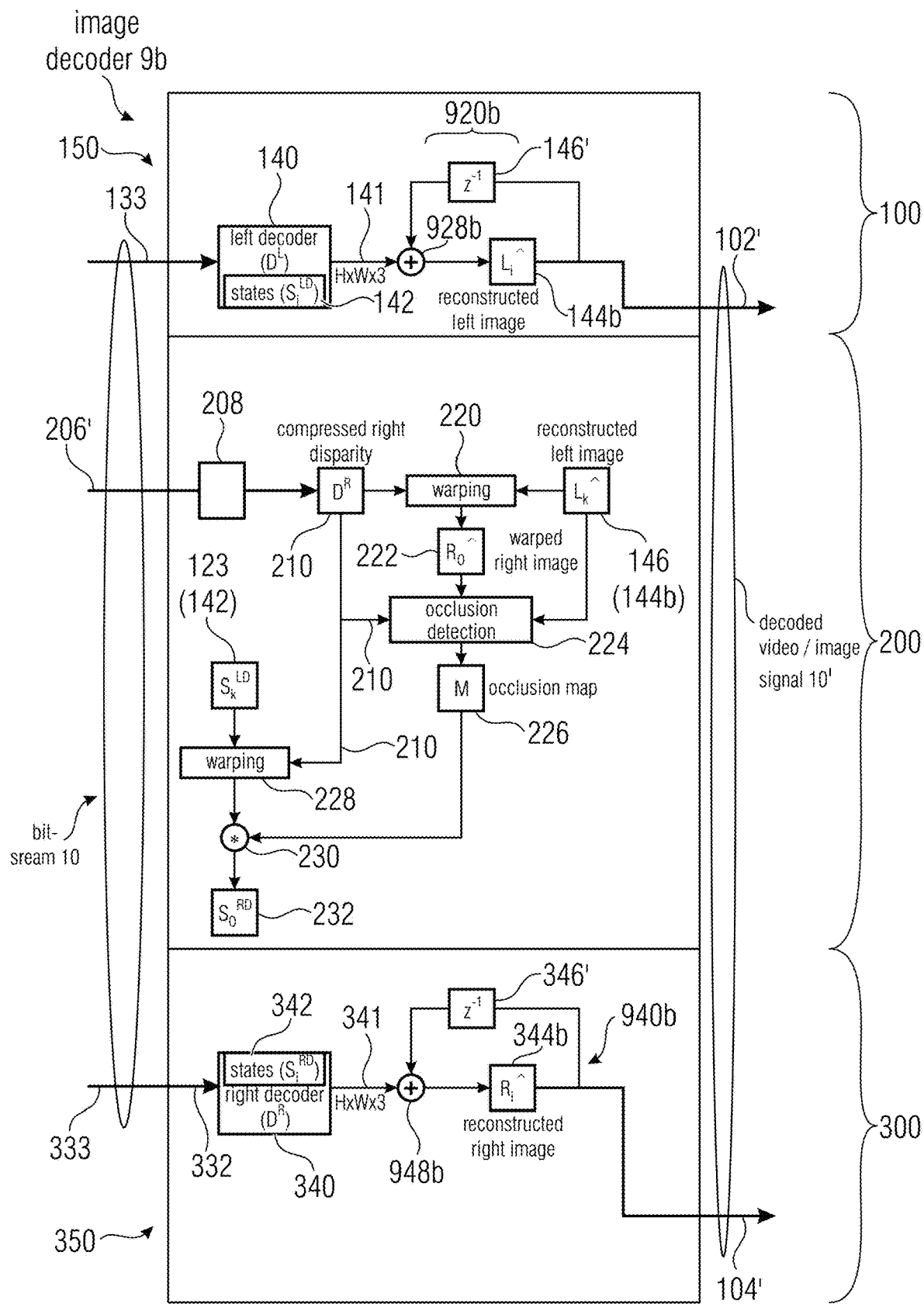

FIG. 9*b* shows an image decoder according to an example.

Figure 9C:
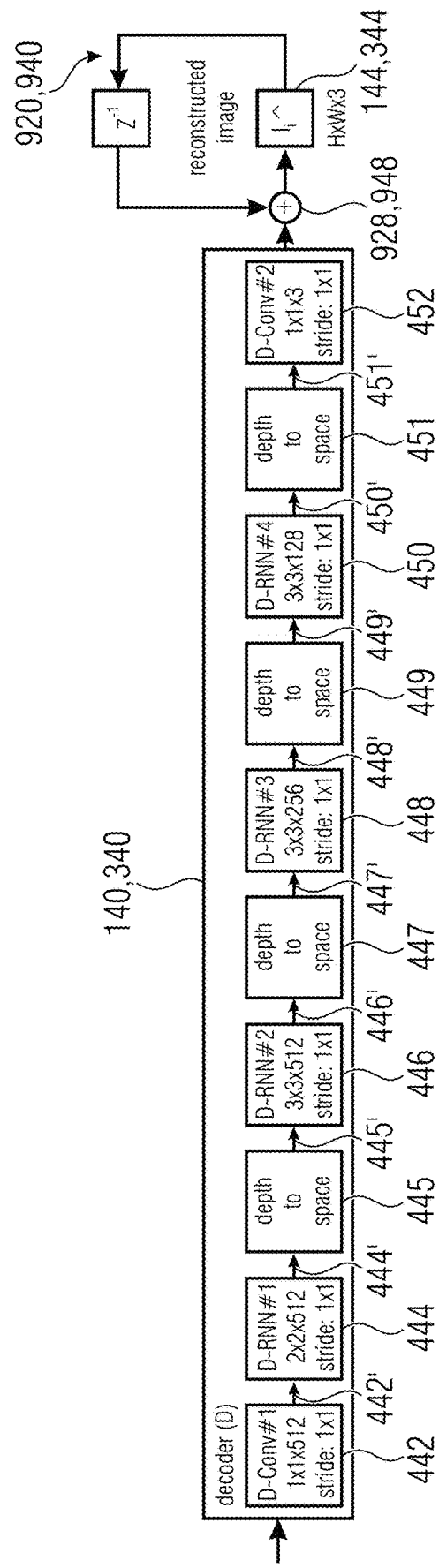

FIG. 9*c* shows an element of an image decoder (e.g., the image decoder of FIG. 9*b*).

FIGS. 11*a*-11*d* show an image encoder (e.g. video encoder) according to an example.

FIGS. 10 and 12*a*-12*d* show an image decoder (e.g. video decoder) according to an example.

EXAMPLES

Here below, reference is often made to "learnable layers", "learnable sublayers", "learnable parameters", etc. This is however an example, because in principle the examples here below may be obtained through deterministic layers, even though it is believed the use of learnable layers (e.g., neural networks) to be extremely promising.

FIG. 1a shows an image encoder 1 according to an example (FIG. 2 shows a pseudocode 2 associated to the example 1 of FIG. 1a). The image encoder 1 may encode a bitstream 10. The bitstream 10 may include an encoded version of a plurality of images which are provided in input to the image encoder 1. Each of the images (e.g., as inputted into the image encoder 1) may be for example originally described by a bitmap and/or may have a plurality of pixels or other picture elements. Instead of pixels or picture elements, a more general word "entries" is used. Each entry may provide visual information. Each image may be defined in a first dimension (e.g. height) and a second dimension (e.g. width) which, e.g. in a coordinate-like fashion, may describe visual characteristics associated with each pixel (or picture element, which may be a plurality of adjacent pixels). In examples each pixel (e.g. when the image is monochromatic or in scale of greys) may have a value indicated either "white" (e.g. 0) or "black" (e.g. 255) or an intermediate value "grey" (1 . . . 254), just to give an example. In examples, each image may have a plurality of channels, which provide features of each entry (pixel, picture element). An example can be values of red (R), green (G), and blue (B) in RGB channels: for example, for each channel, the entry (picture element) may have a value associated to the intensity of each color component R, G, B. Accordingly, the image may have a plurality of channels, e.g. each providing a characteristic in a particular coordinate (component). In some examples, instead of RGB channels, it is possible to have different (e.g. CMYK or parametric values, such as chroma/luma, etc.). In general terms, therefore, each image in input to the image encoder 1 may have a first dimension (e.g. height), a second dimension (e.g. width) and a number of channels (e.g. RGB) equal or greater than 1. More in general, what is encoded is not necessarily images as such, but more in general image information: in some examples, the image information may include differential (residual) visual information and/or predicted visual information. Also hierarchical encoding may be used, e.g. for a video encoding (where different frames may be provided as primary image information and secondary image information). In examples below, an input primary image 102 and an input secondary image 104 are often referred to with the more general expressions primary image information 102 and secondary image information 104, and the primary image information 102 and the secondary image information 104 may be generalized to other kind of information (e.g., other kind of visual information).

In general terms, both the primary and secondary image information, the states, the parameters, the outputs, the bitstream, etc. may be imagined as being tensors, generally in multiple dimensions. E.g., the primary/secondary image information may have dimension 3 (first/second dimension, number of channels). It is not strictly necessary that the number of dimensions is the same for the first and second image information (e.g., when the first image information 102 is a color image and the second image information 104 is a grey-scaled image, then the first image information 102 has three channels and the second image information 104 has one single channel).

Therefore, reference is here often made to a primary image information 102 and a secondary image information 104, and may be understood as information (e.g. visual information) 102 on a primary image (or from a frame associated to an image) and information (e.g. visual information) 104 on a secondary image (or from another frame associated to another image), but the same result can be generalized between a greater number of images. The plurality of image information (e.g. 102, 104) may be (e.g. in stereo encoding) different images representing a same subject according to mutual spatial relationships, or more in general spatially-related mutual relationship information, or even more in general correspondence information which provides correspondences between the first image information 102 and the second image information 104 (or between entries of the first image information 102 and entries of the second image information 104). The plurality of input images (e.g. from which image information 102, 104 is obtained) may represent the same subject, e.g. as acquired by different cameras. For example, the plurality of cameras may be two cameras in a three dimensional (stereo) video recording system, so that the two cameras simultaneously acquire two different images (e.g. from which primary and secondary image information 102, 104 may be obtained) in a predetermined mutual spatial relationship (spatially-related mutual relationship information). In other examples, the simultaneousness of the acquisition of the two images (e.g. 102, 104) is not necessary, e.g. provided that a same subject is imaged. In some examples, the primary and secondary images (e.g. 102, 104) could also be acquired by the same camera, but at different time instances, provided that the spatially-related mutual relationship information between the primary image and the secondary image are known (or at least that the mutual spatial relationships can be estimated). In some examples, at least one of the primary and secondary images (102, 104) may be a virtual, or more in general a synthesized image (e.g. an augmented reality image, or a processed image), but the spatial relationships between the primary and secondary images (102, 104) can be estimated or is known. However, the primary and secondary images (102, 104) may have in common that they are images of a same subject, despite the fact that the subject (by being represented from two different points of view) can have some elements which are represented in the primary image 102 but not represented in the secondary image 104, and/or vice versa. In examples, only a portion of the primary image is also represented in the secondary image 104 or vice versa, but this is in general not a problem, since the present techniques are also valid for at least the entries (pixel, picture elements) which are represented both in the primary image and the secondary image (or at least that have some correspondence in the first and second images). The primary image 102 can be considered in the present description as the left image "L" (left) of a multi-camera image, while the secondary image 104 can be considered the right image "R" (right) of a multi-camera stereo system. The choice between left and right images can be totally arbitrary and made only for the sake of simplicity. Therefore, the secondary image information 104 may be encoded by relying on information obtained by processing the encoding of the primary image information 102.

As explained above, it is also possible to generalize the concept of primary and secondary image information (102, 104), in a video environment (which may even transcend of stereo imaging) and it is possible to encode a secondary image information 104 based on primary image information 102. E.g., if the primary image information 102 provides visual information on a primary frame of a video sequence, and the secondary image information 104 provides visual information on a secondary frame which precedes or follows the primary frame in the video sequence, then the secondary image 104 may be encoded by relying on (at least) an encoded version of the primary image 102, e.g. by relying on information obtained by processing the encoding of the primary image information 102.

It is noted that here below reference is often made to "correspondence information". The correspondence information may be understood as providing relationships between the primary image information 102 and the secondary image information 104, either globally or locally. Global correspondence information may include, for example, information which is the same for all the entries (e.g. pixels) of the primary image information 102 and the secondary image information 104. Local correspondence information may include, for example, information which in principle differs between the entries (e.g. pixels) of the primary image information 102 and the entries of the secondary image information 104. It may be understood that in at least some examples the "correspondence information" may be information that "goes beyond" the mere visual information on how the images are to be reproduced, but provides additional information which sets some associations between the primary image information 102 and the entries of the secondary image information 104. Hence, the "correspondence information" may be understood as information which is not simply visual information as acquired by the camera(s), but may also provide additional information either obtained by processing together the primary image information 102 and the secondary image information 104, or by external inputs (e.g., positional sensors, radars, lidars, etc.).

In some cases, the correspondence information may provide some spatial correspondences between the subject as imaged through the first image (or first image information) 102 and the subject as imaged through the second image (or second image information) 104, and in this case it may be named "spatially-related mutual relationship information". More in particular, the "spatially-related mutual relationship information" may be information which associates with each other the primary image information 102 with the second image information 104 in the spatial domain. The spatially-related mutual relationship information may either be global (in the sense that provides visual information valid for all the entries of the primary image information 102 and the second image information 104) or be local (in the sense that there is an entry-by-entry relationship between the entries of the primary image information 102 and those of the second image information 104). Examples of spatially-related mutual relationship global information may encompass intrinsic and/or extrinsic camera parameters. Examples of spatially-related mutual relationship global information may encompass the (relative or absolute) location in space where the images have been captured, the (relative or absolute) orientations of the camera(s) during capture of the first and/or second image, and camera parameters such as focal length, pixel size, etc. In this case, the spatially-related mutual relationship global information may be independent from the primary and/or secondary image information (102, 104), and provides information on the positional relationships between all the entries. In other examples, the spatially-related mutual relationship local information may be obtained from the primary and/or secondary image information (102, 104), e.g. by analyzing a primary input image and a secondary input image and inferring the relative orientation (e.g., through similarity metrics). Examples of spatially-related mutual relationship local information may encompass, for example, disparity information (e.g., a disparity map), which associates a relative position of each pixel (or more in general entry) of the primary image information 102 (e.g., the primary image) with respect to at least one pixel (or more in general entry) of the secondary image information 104 (e.g., the secondary image). This may be obtained, for example, by adopting similarity metrics (e.g., at the disparity estimation 202) which compare the primary image information 102 and the secondary image information 104. For example, it is possible to obtain the relative position of each pixel (or more in general entry) by processing the primary and secondary image information (102, 104), e.g. by taking into account similarity metrics between the primary and secondary image information (102, 104) and/or spatially-related mutual relationship global information (e.g. at least one of location in space, orientations of the camera(s), and camera parameters such as focal length, pixel size, etc.). It will be understood that the disparity information may be substituted, in some examples, by other correspondence information, such as flow information (flow vectors, motion vectors, etc.), e.g. in the case of hierarchical encoding. Method based on similarity metrics for obtaining disparity information or other correspondence information are known. These methods (which may be based, for example, on epi-polar geometry), may find correspondences between the primary and the secondary image information (in particular when they are images). Method based on similarity metrics may compute for every possible correspondence some matching costs (similarity metrics). In other words, every pixel (entry) (and possibly its neighbor pixels or 2D representation elements) on an epi-polar line in the primary image 102 is compared with a reference pixel (entry) (and possibly its neighbor pixels) in the secondary image 102. Such a comparison can for instance be done by computing a sum of absolute differences or the hamming distance of a census transform. The remaining difference may then be considered (in examples) as a matching cost or similarity metric, and larger costs indicate a worse match. Depth estimation hence comes back to choosing for every pixel a depth candidate such that the matching costs are minimized. This minimization can be performed independently for every pixel (entry), or by performing a global optimization over the whole primary and secondary images 102 and 104. These methods may be used at disparity estimation layer 202. A disparity encoder 206 may encode the obtained disparities and may encode them in signalling 206'.

In other cases (e.g., in some cases in which the primary image information 102 and the secondary image information 104 are frames in one single video sequence, even without stereo imaging), the "correspondence information" may include, for example, "temporally-related mutual information". The "temporally-related mutual information" may include, for example, information on the flow of visive information between the primary image information 102 (e.g., primary frame) and the secondary image information 104 (e.g., secondary frame).

Here reference is often made by referring to the "correspondence information" between a primary image information 102 (e.g., primary frame, left image, etc.) and the secondary image information 104 (e.g., secondary frame, right image, etc.). However, also this concept may be generalized, and refer to more than two images (e.g., three images to be fused together for a stereo synthesis, and/or three frames in the video sequence).

The bitstream 10 as generated by the encoder 1 may be understood as being intended to have, encoded therein, both an encoded version 133 of the primary image information 102 and a encoded version 333 of the secondary image information 104. These encoded versions 133 and 333 may basically form a compressed version of a multi-image information formed by the inputted primary and secondary images.

The image encoder 1 may include a primary block 100 which may obtain the encoded version 133 of the primary image information 102 by iteratively applying a primary learnable layer 150, which is here explained as being repeated k times through a primary iteration cycle 151. The primary learnable layer 150 may include at least one primary learnable sublayer (which, in one of the examples below, will be represented by at least one of the layers indicated by numerals 120, 140, and may also be represented, in some instances, by any of blocks 424, 426, 428, 444, 446, 448, 450, 500; see below). A secondary learnable layer 350 at the secondary block 300 may iteratively apply at least one secondary learnable sublayer (e.g., any of 320, 340, and may represented, in some instances, by any of blocks 424, 426, 428, 444, 446, 448, 450, 500), which is here explained as being repeated m times through a secondary iteration cycle 351. It will be understood that the primary block 100 may, through the primary learnable layer 150, obtain the encoded version 133 of the primary image information 102. In its turn, the secondary block 300 may, through the secondary learnable layer 350, obtain the encoded version 333 of the secondary image information 104. It will be shown that the secondary block 300 (and in particular the secondary learnable layer 350 involving particularly, at least one secondary learnable layer 320, 340, 424, 426, 428, 444, 446, 448, 450, 500) may make use of information obtained from the primary block 100 (e.g. from the primary learnable layer 150, e.g. from the at least one primary learnable sublayer 120, 140, 424, 426, 428, 444, 446, 448, 450, 500). In general terms, the primary iterations 151 at the primary block 100 are not the same as the secondary iterations 351 at the secondary block 300. In particular, it may imagined that the iterations at the primary block 100 are for i from 1 to k ($1 \le i \le k$), while the iterations at the secondary block 300 are for j from 1 to m ($1 \le j \le m$). It can be in general imagined that, at parity of resolution and complexity, in general $m \ll k$, since many iterations at the secondary block 300 can be avoided by virtue of the use of information obtained at primary block 100, thereby reducing computational power and overall bits required for compression.

As explained above, the primary learnable layer 150 may include primary learnable sublayer(s) 120 or 140 (e.g. instantiated by any of, or any series of, the sublayers 424, 426, 428, 444, 446, 448, 450, 500). It will be shown that there can be a plurality of primary learnable sublayers, at least one of which (in particular sublayers which will be indicated with 120, 424, 426, 428 and often indicated as primary encoding sublayers) may directly participate to the encoding (compression) of the primary image information 102, while at least one of the primary learnable sublayers (in particular the primary decoding learnable sublayers indicated with 140, 444, 446, 448, 450) may be used for reconstructing a decoded version 144 of the encoded image information 102 (e.g. for simulating the operations at the decoder). Accordingly, it will be possible to evaluate the quality of the compression of the primary image 102.

Figure 3A:
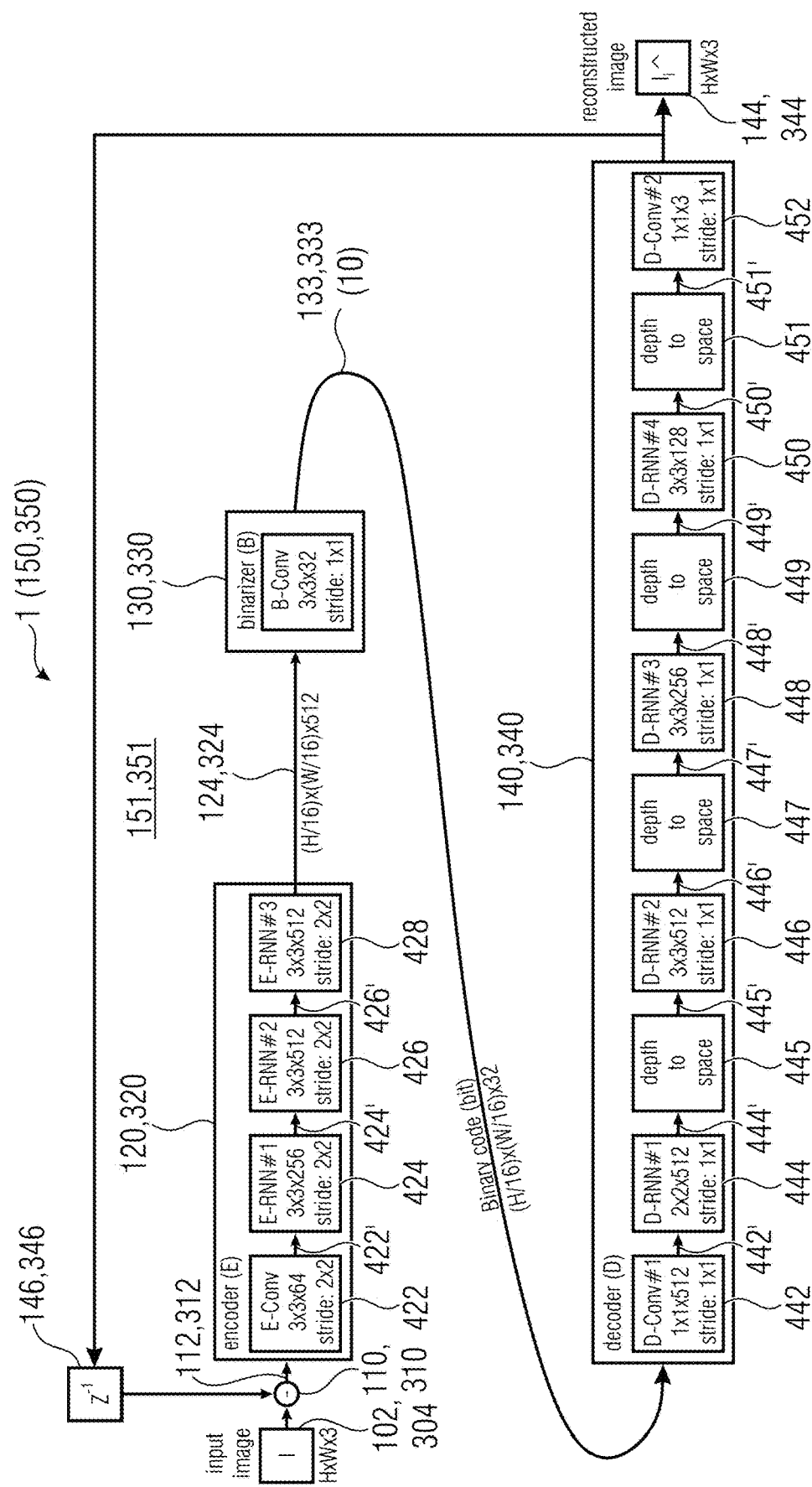

FIG. 1a shows one primary encoding learnable sublayer 120 (which, however, in the example of FIG. 3a can be instantiated by a series comprising a plurality of at least primary encoding learnable sublayers 424, 426, 428, with the possible addition of other learnable layers, such as a convolutional learnable layer 422); one primary decoding learnable sublayer 140 (which, however, in the example of FIG. 3a can be instantiated by a series comprising a plurality of at least secondary decoding learnable sublayers, 444, 446, 448, 450, and may also include at least one or a plurality of other layers 442, 447, 449, 451, 452)

In particular, FIG. 1a shows that, at each primary iteration 151 (e.g., at the generic primary iteration i>1), the primary image information 102 may be compared (e.g. at a primary comparison block 110) with a previously obtained intermediate decoded version 148 (which comes from a previously reconstructed version 144 or $L_{i-1}{}^\wedge$ of the primary image 102) of the primary image, as reconstructed by the at least one primary decoding learnable sublayer (140). The symbol $z^{-1}$ of block 146 refers to the fact that the intermediate decoded version 144 of the previous iteration (e.g., as obtained at the iteration i−1) is used as the version 148 to be compared with the primary image 102 (at the iteration i). At the initial iteration (i=1), the comparison may be deactivated (or the comparison may be made with a default value, e.g. 0). A residual (primary residual) $r_i$ (112) may therefore be obtained (the residual may be understood as a processed version of the primary image information 102). In general terms, at the generic i-th iteration with i>1, the previously reconstructed intermediate decoded version (144, $L_{i-1}{}^\wedge$) (e.g. reconstructed at iteration i−1) may have the same dimensions of the original input image 102. Once the primary residual $r_i$, 112 is obtained (at iteration i), the iterative encoding may be performed by the at least one primary encoding learnable sublayer 120. Accordingly, an intermediate encoded version 124 ($e_i$) of the primary image 102 may be obtained. The intermediate encoded version 124 ($e_i$) may have a different dimensionality with respect to the primary image 102. For example, the first dimension (e.g. height) and/or the second dimension (e.g. width) of the encoded version 124 may be downsampled with respect to the primary image information 102 (and also the primary residual 112), so that the first dimension and/or the second dimension of the intermediate encoded version 124 ($e_i$) is less extended than the first dimension and/or the second dimension of the primary image 102, respectively. Therefore, the at least one primary learnable sublayer 120 (and in particular any of the sublayers 424, 426, 428) may reduce the extension of the first dimension (e.g. height) and/or the second dimension (e.g. width). In addition, or in alternative, however, the at least one learnable sublayer 150 (e.g. in particular, at least one of the at least one primary decoding learnable sublayer 140 and in particular one of the primary learnable sublayers 424, 426 and 428) may increase the number of channels for the intermediate encoded version 124 ($e_i$) with respect to the primary image information 102. In examples, the extension of the first dimension (e.g. height) may be divided (or integer-divided) by 16 or another number (e.g. a power of 2), the extension of the second dimension (e.g. width) may be divided by 16 (or its integer version) but the number of channels may be greatly increased (e.g. from 3 to 512 or another number greater than 64 in some example). The intermediate encoded version 124 ($e_i$) may be binarized (or more in general quantized) at a primary binarizer (quantizer) 130, to thereby obtain a binarized (quantized) version 132 thereof. The primary binarizer (quantizer) 130 may provide a binarized (quantized) version of the intermediate encoded version 124, $e_i$. The intermediate binarized version 132 of the intermediate encoded version 124 of the primary image information 102 may be understood as a version in which all the values of each entry of the intermediate encoded version 124 are represented by a binary notation e.g. with only (with only "+1s" and "−1s", or only "1s" and "0s"). The intermediate binarized version 132 of the intermediate encoded version 124 may therefore be written in the bitstream 10. In addition or alternatively, the intermediate binarized (quantized) version 132 may be a version of the intermediate encoded version 124 ($e_i$) where each output element is represented by a fixed number of bits or possible values. In this case, the fixed number may be one single binary value for each element of the vector. It is noted that in some examples the binarization may be directly performed by the at least one primary encoding learnable sublayer 120 (i.e. the primary binarizer 130 may be enclosed in sublayer 120).

In each of the primary iterations 151 (e.g. at the iteration), there may be present at least one primary decoding learnable sublayer 140 which re-decodes the binarized version 132 of the intermediate encoded version 124 of the primary image information 102 so as to substantially simulate the operations that will be carried out at the image decoder (e.g., 1b in FIG. 1b) for decoding the bitstream 10. Accordingly, an intermediate decoded version 144 ($L_i\hat{}$) may be obtained at the iteration i≥1. In general, the intermediate decoded version 144 ($L_i\hat{}$) may be subjected to the comparison at the primary comparison block 110 at the subsequent iteration i+1, thereby evaluating the quality of the encoding and/or binarization performed at the iteration i. The binarized representation 132 can be reconverted into floating point or other representations before being injected into the at least one primary decoding learnable sublayer 140 through a conversion layer (not shown).

As explained above, the secondary learnable layer 350 of the secondary block 300 may include secondary learnable sublayer(s) 320 or 340 (e.g. instantiated by any of, or any series of, the sublayers 424, 426, 428, 444, 446, 448, 450, 500). It will be shown that there can be a plurality of secondary learnable sublayers, at least one of which (in particular sublayers which will be indicated with 320, 424, 426, 428 and often indicated as primary image encoding sublayers) may directly participate to the encoding (compression) of the secondary image information 104, while at least one of the secondary learnable sublayers (in particular the primary decoding learnable sublayers indicated with 340, 444, 446, 448, 450) may be used for reconstructing a decoded version 344 of the secondary encoded image information 104 (e.g. for simulating the operations at the decoder). Accordingly, it will be possible to evaluate the quality of the compression of the secondary image 104.

FIG. 2a also shows one secondary encoding learnable sublayer 320 (which, however, in the example of FIG. 3a can be instantiated by a series comprising a plurality of at least primary encoding learnable sublayers 424, 426, 428, with the possible addition of other learnable layers, such as a convolutional learnable layer 422); one secondary decoding learnable sublayer 340 (which, however, in the example of FIG. 3a can be instantiated by a series comprising a plurality of at least secondary decoding learnable sublayers, 444, 446, 448, 450, and may also include at least one or a plurality of other layers 442, 447, 449, 451, 452)

In particular, FIG. 1a shows that, at each secondary iteration 351 (e.g., at the generic secondary iteration j>1), the secondary image information 104 may be compared (e.g. at a secondary comparison block 310) with a previously obtained intermediate decoded version 348 (which comes from a previously reconstructed version 344 or $R_{j-1}\hat{}$ of the secondary image 104) of the secondary image information 104, as reconstructed by the at least one secondary decoding learnable sublayer 340). The symbol $z^{-1}$ of block 346 refers to the fact that the intermediate decoded version 344 of the previous secondary iteration (e.g., as obtained at the iteration j−1) is used as the version 348 to be compared with the secondary image 104 (at the iteration j). At the initial iteration (j=1), as indicated by selector 221, the comparison can also not be deactivated, but may be performed using a warped (predicted, estimated) version 222 of the second image information 104 (see below) (e.g. as obtained by applying disparity information, or more in general correspondence information, to the reconstructed primary image information 102, see below). A residual (secondary residual) $r_j$ (312) may therefore be obtained. Notably, for j=1 (initial secondary iteration) the residual $r_0$ is in general not the same of the secondary image information 104, and this is another technique for exploiting information obtained at the first block 100 also for the second image information 104 (i.e., for j=1 it is in general $r_1 \neq R$, while at the first block, for i=1, it is $r_1 = L$). In general terms, the previously reconstructed intermediate decoded version (344, $R_i\hat{}$) (e.g. reconstructed at secondary iteration j−1) may have the same dimensions of the original secondary input image information 104. Once the secondary residual $r_j$, 112 is obtained (at iteration j), the iterative encoding may be performed by the at least one secondary encoding learnable sublayer 320. Accordingly, an intermediate encoded version 324 ($e_j$) of the secondary image information 104 may be obtained. The intermediate encoded version 324 ($e_j$) may have a different dimensionality with respect to the secondary image information 102. For example, the first dimension (e.g. height) and/or the second dimension (e.g. width) of the encoded version 324 may be downsampled with respect to the secondary image information 104 (and also the secondary residual 312), so that the first dimension and/or the second dimension of the intermediate encoded version 324 ($e_j$) is less extended than the first dimension and/or the second dimension of the secondary image 104, respectively. Therefore, the at least one secondary learnable sublayer 320 (and in particular any of the sublayers 424, 426, 428) may reduce the extension of the first dimension (e.g. height) or the second dimension (e.g. width). In addition, or in alternative, however, the at least one learnable sublayer 350 (e.g. in particular, at least one of the at least one secondary encoding learnable sublayer 340 and in particular one of the secondary learnable sublayers 424, 426 and 428) may increase the number of channels for the intermediate encoded version 324 ($e_j$) with respect to the secondary image information 104. In examples, the extension of the first dimension (e.g. height) may be divided (or integer-divided) by 16 or another number (e.g. a power of 2), the extension of the second dimension (e.g. width) may be divided by 16 (or its integer version) but the number of channels may be greatly increased (e.g. from 3 to 512 or another number greater than 64 in some example). The intermediate encoder version 324 ($e_j$) may be binarized (e.g. quantized) at a secondary binarizer 330, to thereby obtain a binarized version 332 thereof. The secondary binarizer 330 may provide a binarized version of the intermediate encoded version 324, $e_j$. The intermediate binarized version 332 of the intermediate encoded version 124 of the primary image information 102 may be understood as a version in which all the values of each entry of the intermediate encoded version 324 are represented by a binary notation e.g. with only (with only "+1s" and "−1s", or only "1s" and "0s"). The intermediate binarized version 332 of the intermediate encoded version 324 may therefore be written in the bitstream 10. In some examples the binarization (quantization) may be directly performed by the at least one secondary encoding learnable sublayer 320 (i.e. the secondary binarizer 330 may be enclosed in sublayer 320).

In each of the secondary iterations 351 (e.g. at the iteration j≥1), there may be present at least one secondary encoding learnable sublayer 340 which re-decodes the binarized version 332 of the intermediate encoded version 324 of the secondary image information 104 so as to substantially simulate the operations that will be carried out at the image decoder (e.g., 1b) for decoding the bitstream 10. Accordingly, an intermediate decoded version 344 ($R_j\hat{}$) may be obtained at the iteration j≥1. In general, the intermediate decoded version 344 ($R_i\hat{}$) may be subjected to the comparison at the secondary comparison block 310 at the subsequent iteration j+1, thereby evaluating the quality of the encoding and/or binarization performed at the iteration j. The binarized representation 332 can be reconverted into floating point or other representations before being injected into the at least one primary decoding learnable sublayer 340 through a conversion layer (not shown).

FIG. 3a shows an example of an instance of the at least one primary image learnable sublayer 120, 140 and of an instance of the at least one secondary learnable sublayer 320, 340. As explained above, there may be a primary encoding learnable sublayer 120 or 320 which may include at least one or a plurality of learnable sublayers (each in the series of learnable sublayers 424, 426 and 428, each of them providing an intermediate output 424', 426', and 124 or 324). Previous to the series of learnable sublayers 424, 426, and 428 with state may be provided a convolutional learnable sublayer 422 without state and providing an output 422' applied to the series of learnable sublayers with state 424, 426, and 428. As can be seen, the convolutional sublayer 422 without state may have a 3×3 filter mapping the input onto 64 channels. Learnable sublayers 424, 426, and 428 may have a 3×3 filter (or a different filter, which may be either square or rectangular), but learnable sublayers 424 may map its input 422' onto an output 424' with 256 channels; the learnable sublayer 426 may map its input 424' onto an output 426' with 512 channels; and the learnable sublayer 428 may map its input 426' onto the same number of channels. The number of channels may change in different examples, and also the extension of the filters, but in most examples, the number of channels is increased in the encoding sublayer 120, while the first and second dimensions are reduced. In general terms, we may obtain that the output 124, 324 (an intermediate encoded version) may have the first dimension (e.g. height) which is progressively reduced (downsampled) e.g. with a downsampling ratio of 16 (e.g. each of the learnable sublayers 422, 424, 426, and 428 may have a downsample ratio of 2). A similar downsampling may be provided to the second dimension (e.g. width), whose extension may be downsampled (e.g. by 16, in such a way that each of the learnable sublayers 422, 424, 426, 428 reduces the extension of the second dimension by a downsample ratio of 2). The number of channels (third dimension) may, notwithstanding be increased from e.g. 3 channels (e.g. according to the RGB representation) onto 512 channels. The binarizer 130, 330, may include a convolutional learnable sublayer without state, with filter which may be 3×3. The binarizer may map the 512 channels onto 32 channels, so that the binarized version 133, 333 of the primary or secondary image information may have only 32 channels. Accordingly, the encoded version of the primary or secondary image information 133, 333 as encoded in the bitstream 10 will have a compressed shape in which the channels are upsampled with respect to the original primary or secondary image information according to an upsample ratio (32/3 which is less than the product of the downsample ratio (16) of the first dimension and the downsample ratio (16) of the second dimension). A compression may therefore be performed.

The at least one decoding learnable sublayer 140, 340 may be obtained for iteratively reconstructing a decoded version ($L_i\hat{}$, $R_j\hat{}$, 144, 344, generally referred to with $I_i\hat{}$) of the intermediate (processed) encoded version 133, 333 of the primary or secondary image information 102 or 104. As can be seen, the at least one first or secondary decoding learnable sublayer 140, 340 may include a series of learnable sublayers with state, known learnable sublayers, and learnable sublayers without state. Here, a convolutional learnable sublayer 442 without a state is inputted with the intermediate encoded version 133, 333 of the primary or secondary image information 102, 104 and provides the output 442' which may have an increased number of channels with respect to the input 133, 333. The output 442' may be inputted onto a learnable sublayer 444 with a state, which may provide an output 444' to a depth to space sublayer 445 which is a non-learnable sublayer. Depth to space sublayer 445 may provide an output 445' in which the first and second dimensions are upsampled, while the number of channels may be downsampled. The output 445' may be provided to a learnable sublayer 446 with a state which provides an output 446'. The output 446' may have the same number of channels and the same dimensions. The output 446' may be inputted onto a depth to space non-learnable sublayer 447. The output 447' of the sublayer 447 may be an output 447' in which the first and second dimensions are upsampled, but the number of channels (third dimension) are downsampled. The output 447' may be inputted onto a learnable sublayer 448 with a state. The learnable sublayer 448 may provide an output 448'. It is not here strictly necessary to downsample or upsample. The output 448' may be inputted onto a depth to space sublayer 449. The depth to space sublayer 449 may upsample the first and second dimensions, but downsample the number of channels. The output 449' of the depth to space sublayer 449 may be inputted on to a learnable sublayer 450 with a state, which may provide an output 450'. The learnable sublayer 450 does not necessarily upsample or downsample any dimension. The output 450' of the learnable sublayer 450 may be provided to a depth to space sublayer 451, which may upsample the first and second dimensions, and downsample the number of channels. The output 451' of the depth to space block 451 may be provided to a convolutional learnable sublayer 452 without a state. The output of the convolutional learnable sublayer 452 may be used as intermediate decoded image information ($L_i\hat{}$, $R_j\hat{}$, 144, 344, $I_i\hat{}$) to be provided to the comparison block 110, 310, at the subsequent iteration i+1 or j+1.

It has been understood that, at the primary block 100, one of the primary encoding learnable sublayers 120, 424, 426, 428 and/or at least of the secondary encoding learnable sublayers 140, 444, 446, 448, 450, may be a learnable layer having a state (e.g. recurrent learnable layer, e.g. recurrent neural network). The same applies to at least one primary decoding learnable sublayer 140, 424, 426, 428 and/or at least one secondary decoding learnable sublayer 340, 444, 446, 448, 450 may also be a learnable layer with a state. A learnable layer with a state may be a learnable layer for which, at each iteration i (or j), the state is inherited from the iteration i−1 (or j−1) (e.g., through a transformation which also involves a state-to-sate parameter, see below).

The "learnable layer with a state" may in some examples be described, according to some definitions, as a recurrent learnable layer and/or may be instantiated by a recurrent neural network (RNN). The states may be, for example, hidden states. A learnable layer with a state may be distinguished from a learnable layer without state (e.g. combinatorial learnable layer, e.g. combinatorial neural network, such as a convolutional learnable layer or convolutional neural network, CNN) by the fact that, in the combinatorial learnable layer there is not the state inherited from one previous iteration i–1 to a current iteration i. It is also possible that one of the learnable sublayers 320, 340 includes at least one (or a plurality of) learnable sublayer(s) each having a state (e.g. 424, 426, 428, 444, 446, 448, 450) and, optionally, at least one combinatorial learnable layer without state (e.g. 422, 442, 452, and so on). Since it is at least one state that is to be used for having a learnable layer with a state, even if series connection between a learnable layer with a state and a learnable layer with a combinatorial learnable layer without the state may become a learnable layer with a state (e.g. a recurrent neural network (RNN)).

A state may be stored at each iteration and may be subsequently used at the following iteration, but may be used to obtain the current output at the same iteration. An example may be (in these general examples reference is always made to the index "i", which may notwithstanding be generalized to the index "j" used for the secondary iterations 351) that provided by formula (2), or (2a), and (1) (see FIG. 4*b*):

$$S_i = f(U \odot x_i + W \odot S_{i-1}) \qquad (1)$$

where:
  $S_i$ is the current state of the learnable sublayer at the current iteration i
  U is an input-to-state parameter mapping a current input $x_i$ onto a component of the current state $S_i$, apart from an optional activation function f( . . . ), (the entries of U can be all zero in some cases, but in this case the input plays a role to the generation of the output only at the subsequent iteration)
  W is a state-to-state parameter mapping the preceding state $S_{i-1}$ onto a component of the current state $S_i$, apart from an optional activation function f( . . . ), (in some examples it is in general not admitted that both W=U=0, but in some examples it may be admitted that W≠U=0 and/or that U≠W=0)
  ⊙ is the entry-wise multiplication (point-wise multiplication).

$$O_i = f(V \odot S_i) \qquad (2)$$

(or also $O_i = f(H \odot x_i + V \odot S_i)$) (2a)

where:
  $S_i$ is the current state of the learnable sublayer at the current iteration i (e.g. calculated as in formula (1), see below)
  $O_i$ is the general current output of the learnable sublayer
  V is a state-to-output parameter mapping the current state $S_i$ onto a current output $O_i$, or a component thereof (in particular when H is not identically zero), apart from an activation function f( . . . )
  ⊙ is the entry-wise multiplication (point-wise multiplication).
    the optional parameter H is an optional input-to-output parameter mapping a current input $x_i$ onto a component of the current output $O_i$, apart from an optional activation function f( . . . ).

In examples, at each iteration, formula (2) or (2a) may be sequentially processed after formula (1).

According to a variant (shown in FIG. 4*c*) the current output is obtained from the previous state: formula (1) is maintained unchanged, but formula (2) becomes $O_i = f(H \odot x_i + V \odot S_{i-1})$. In the following, the variant of FIG. 4*c* is mainly not discussed to the advantage of the variant of FIG. 4*b*.

It is possible to have, in some examples, activation functions downstream to a linear combination (ReLu, TanH, softmax, etc.), which may be different in accordance to the intended effect. ReLu may map the maximum between 0 and the value obtained at the convolution (in practice, it maintains the same value if it is positive, and outputs 0 in case of negative value). Leaky ReLu may output f(x)=x if x>0, and 0.1*x if x≤0, x being the argument of the activation function (instead of 0.1 another value, such as a predetermined value within 0.1±0.05, may be used in some examples). TanH may provide the hyperbolic tangent of the value obtained at the convolution, e.g. $TanH(x) = (e^x - e^{-x})/(e^x + e^{-x})$. Softmax may apply the exponential to each element of the elements of the result, and normalize it by dividing by the sum of the exponentials. The activation function may squeeze the result of a linear combination between [a,b], with a<b.

It will be shown that these relationships also apply to the initial iteration (i=1, j=1), where an initialization state $S_0$ takes the role that the "preceding state of the preceding iteration" has for the subsequent iterations.

Notably, inputs, outputs, states, and parameters are in general tensors (e.g., with one first dimensions, such as height, one second dimension, such as width, and one third dimension, such as channels). Formulas (2), (2a), and (1) may have no bias.

It is to be noted that the learnable parameters U, V, W, and (if present) H are in general different for different learnable sublayers. Moreover, the learnable parameters U, V, W, and (if present) H are in general different between the primary block 100 and the secondary block 300, and also the learnable parameters for the at least one encoding sublayer 120 (or 320, respectively) and of the corresponding at least one decoding sublayer 140 (or 340, respectively), are different from each other. Therefore, in the examples in which the sublayers of FIG. 3*a* are integrated in the sublayers of FIG. 1, there may be (the parameters are not shown in FIG. 3*a*):

1) parameters $U_{422}^{LE}$, $V_{422}^{LE}$, $W_{422}^{LE}$ (optionally $H_{422}^{LE}$), $U_{424}^{LE}$, $V_{424}^{LE}$, $W_{424}^{LE}$ (optionally $H_{424}^{LE}$), $U_{426}^{LE}$, $V_{426}^{LE}$, $W_{426}^{LE}$ (optionally $H_{426}^{LE}$) for the instances 422, 424, 426 of the encoding sublayer 120 in the primary block 100 (these parameters may be collectively referred to as learnable parameters of the at least one primary encoding learnable sublayer 120);

2) parameters $U_{444}^{DE}$, $V_{444}^{DE}$, $W_{444}^{DE}$ (optionally $H_{444}^{DE}$), $H_{446}^{DE}$, $V_{446}^{DE}$, $W_{446}^{DE}$ (optionally $H_{446}^{DE}$), $U_{448}^{DE}$, $V_{448}^{DE}$, $W_{448}^{DE}$ (optionally $H_{448}^{DE}$), $U_{450}^{DE}$, $V_{450}^{DE}$, $W_{450}^{DE}$ (optionally $H_{450}^{DE}$) for the instances 444, 446, 448, 450 of the decoding sublayer 140 in the secondary block 300 (these parameters may be collectively referred to as learnable parameters of the at least one primary decoding learnable sublayer 140);

3) parameters $U_{422}^{RE}$, $V_{422}^{RE}$, $W_{422}^{RE}$ (optionally $H_{422}^{RE}$), $U_{424}^{RE}$, $V_{424}^{RE}$, $W_{424}^{RE}$ (optionally $H_{424}^{RE}$), $U_{424}^{RE}$, $V_{426}^{RE}$, $W_{426}^{RE}$ (optionally $H_{426}^{RE}$) for the instances 422, 424, 426 of the encoding sublayer 120 in the secondary block 300 (these parameters may be collectively referred to as learnable parameters of the at least one secondary encoding learnable sublayer 320);

4) parameters $U_{444}^{RD}$, $V_{444}^{RD}$, $W_{444}^{RD}$ (optionally $H_{444}^{RD}$), $U_{446}^{RD}$, $V_{446}^{RD}$, $W_{446}^{RD}$ (optionally $H_{448}^{RD}$), $U_{448}^{RD}$, $V_{448}^{RD}$, $W_{448}^{RD}$ (optionally $H_{448}^{RD}$), $U_{450}^{RD}$, $V_{450}^{RD}$, $W_{450}^{RD}$ (optionally $H_{450}^{RD}$), for the instances 444, 446, 448, 450 of the decoding sublayer 140 in the secondary block 300 (these parameters may be collectively referred to as learnable parameters of the at least one secondary decoding learnable sublayer 340).

In general terms, no mathematical formula (e.g. representable in closed form) is in principle believed to exist between any of $U_{422}^{LE}$, $V_{422}^{LE}$, $W_{422}^{LE}$, $H_{422}^{LE}$, $U_{424}^{LE}$, $V_{424}^{LE}$, $W_{424}^{LE}$, $H_{424}^{LE}$, $U_{424}^{LE}$, $V_{424}^{LE}$, $W_{424}^{LE}$, $U_{444}^{DE}$, $U_{446}^{DE}$, $V_{446}^{DE}$, $W_{446}^{DE}$, $H_{446}^{DE}$, $U_{448}^{DE}$, $V_{448}^{DE}$, $W_{448}^{DE}$, $H_{448}^{DE}$, $U_{450}^{DE}$, $V_{450}^{DE}$, $W_{450}^{DE}$, $H_{450}^{DE}$, $U_{424}^{RE}$, $V_{424}^{RE}$, $W_{424}^{RE}$, $H_{424}^{RE}$, $U_{424}^{RE}$, $V_{426}^{RE}$, $W_{426}^{RE}$, $H_{426}^{RE}$, $U_{444}^{RD}$, $V_{444}^{RD}$, $W_{444}^{RD}$, $H_{444}^{RD}$, $U_{446}^{RD}$, $V_{446}^{RD}$, $W_{446}^{RD}$, $H_{446}^{RD}$, $U_{448}^{RD}$, $V_{448}^{RD}$, $W_{448}^{RD}$, $H_{448}^{RD}$, $U_{450}^{RD}$, $V_{450}^{RD}$, $W_{450}^{RD}$, $H_{450}^{RD}$, but all of them can be calculated using the present technique. Also the number of parameters may vary for different sublayers.

Analogous considerations apply to the states. In general terms, for the at least one learnable encoding sublayer 120:

1) at each iteration i>1 of the primary iteration cycle 151, current states $S_{422,i}^{LE}$, $S_{424,i}^{LE}$, $S_{426,i}^{LE}$ for the instances 422, 424, 426 of the encoding sublayer 120 in the primary block 100 may be respectively obtained from the previous states $S_{422,i-1}^{LE}$, $S_{424,i-1}^{LE}$, $S_{426,i-1}^{LE}$ e.g. adopting the formula (1) (these parameters may be collectively referred to as learnable parameters of the at least one primary encoding learnable sublayer 120);

2) at each iteration i>1 of the primary iteration cycle 151, current states $S_{444,i}^{LD}$, $S_{446,i}^{LD}$, $S_{448,i}^{LD}$, $S_{450,i}^{LD}$ for the instances 444, 446, 448, 450 of the secondary decoding sublayer 140 in the primary block 100 may be respectively obtained from the previous states $S_{444,i-1}^{LD}$, $S_{446,i-1}^{LD}$, $S_{448,i-1}^{LD}$, $S_{450,i-1}^{LD}$ e.g. adopting the formula (1) (these parameters may be collectively referred to as learnable parameters of the at least one primary decoding learnable sublayer 140);

3) at each iteration j>1 of the secondary iteration cycle 351, current states $S_{422,j}^{RE}$, $S_{424,j}^{RE}$, $S_{426,j}^{RE}$ for the instances 422, 424, 426 of the encoding sublayer 120 in the primary block 100 may be respectively obtained from the previous states $S_{422,j-1}^{RE}$, $S_{424,j-1}^{RE}$, $S_{426,j-1}^{RE}$ e.g. adopting the formula (1) (these parameters may be collectively referred to as learnable parameters of the at least one secondary encoding learnable sublayer 320);

4) at each iteration j>1 of the secondary iteration cycle 351, current states $S_{444,j}^{RD}$, $S_{446,j}^{RD}$, $S_{448,j-1}^{RD}$, $S_{450,j-1}^{RD}$ for the instances 444, 446, 448, 450 of the secondary decoding sublayer 140 in the secondary block 300 may be respectively obtained from the previous states $S_{444,i-1}^{RD}$, $S_{444,i-1}^{RD}$, $S_{444,i-1}^{RD}$, $S_{450,j-1}^{RD}$ e.g. adopting the formula (1) (these parameters may be collectively referred to as learnable parameters of the at least one secondary decoding learnable sublayer 340).

Notably, different inputs and outputs are provided to each learnable sublayer of the sublayer instances 422, 424, 426, 444, 446, 448, 450 at the primary or secondary block. For example, the learnable sublayer 424 has an input 422' which plays the role of the current input $x_i$ in formula (2) and (2a) and an output 424' which plays the role of the current output $O_i$ in formulas (2) and (2a).

In particular, for the primary encoding sublayer 120, we may have:

1) sublayer instance 424 with an input 422' ($x_{422,i}$) and an output 424' ($O_{424,i}$), thereby instantiating the formulas $O_{424,i} = f(V_{422}^{LE} \odot S_{422,i}^{LE})$ or $O_{424,i} = f(H_{422}^{LE} \odot x_{422,i} + V_{422}^{LE} \odot S_{422,i}^{LE})$ and $S_{422,i}^{LE} = f(U_{422}^{LE} \odot x_{422,i} + W_{422}^{LE} \odot S_{422,i-1}^{LE})$ 2) sublayer instance 426 with an input 424' ($x_{426,i}$) and an output 426' ($O_{426,i}$), thereby instantiating the formulas $O_{426,i} = f(V_{426}^{LE} \odot S_{426,i}^{LE})$ or $O_{426,i} = f(H_{426}^{LE} \odot X_{426,i} + V_{426}^{LE} \odot S_{426,i}^{LE})$ and $S_{426,i}^{LE} = f(U_{426}^{LE} \odot x_{426,i} + W_{426}^{LE} \odot S_{426,i-1}^{LE})$ 3) sublayer instance 428 with an input 426' ($x_{428,i}$) and an output 124 ($O_{428,i}$), thereby instantiating the formulas $O_{428,i} = f(V_{428}^{LE} \odot S_{428,i}^{LE})$ or $O_{428,i} = f(H_{428}^{LE} \odot x_{428,i} + V_{428}^{LE} \odot S_{428,i}^{LE})$ and $S_{428,i}^{LE} = f(U_{428}^{LE} \odot x_{428,i} + W_{428}^{LE} \odot S_{428,i-1}^{LE})$.

Any of outputs $O_{424,i}$, $O_{426,i}$, $O_{428,i}$ may represent an intermediate encoded version of the primary image 102, but $O_{428,i}$ may be used for the encoded version 133 of the primary image information 102 into the bitstream 10. Subsequently, instead of $O_{428,i}$, a different notation like $e_i$ can be used. Also the operations carried out by primary encoding sublayer 120 may be understood as being obtained through an operator $E^L(r_i, S_{i-1}^{LE})$, where $r_i$ is the primary residual (e.g., as obtained at the primary comparator 110) and $S_{i-1}^{LE}$ includes all the states $S_{422,i-1}^{LE}$, $S_{426,i-1}^{LE}$, $S_{428,i-1}^{LE}$.

At each sublayer the state $S_i$ (e.g. $S_i^{LE}$, $S_i^{RE}$, $S_i^{LD}$, $S_i^{LD}$, or any of $S_{422,j}^{LE}$, $S_{424,j}^{LE}$, $S_{426,j}^{LE}$, $S_{444,j}^{LD}$, $S_{444,j}^{LD}$, $S_{444,i}^{LD}$, $S_{422,j}^{RE}$, $S_{424,j}^{RE}$, $S_{426,j}^{RE}$, $S_{444,j}^{RD}$, $S_{446,j-1}^{RD}$, $S_{448,j-1}^{RD}$, $S_{450,j-1}^{RD}$) may therefore, participate in the processing of the output through formula (2) or (2a).

All this discussion on the states has been carried out for the sublayer 120. However, the same discussion would be valid (only with new indexes) for the sublayers 140, 320, and 340, and is here not repeated (the same will also be carried out for the decoder). States of the at least one primary encoding/decoding sublayer 120/140 may therefore be used for initializing the states of the at least one secondary encoding/decoding sublayer 320/340, and in particular that states of corresponding sublayers (424, 426, 428, 444, 446, 448, 450) of the at least one primary encoding/decoding sublayer 120/140 may be used for initializing the states of corresponding sublayers (424, 426, 428, 444, 446, 448, 450) of the at least one secondary encoding/decoding sublayer 320/340. For example:

the state $S_{424,k}^{LE}$ of the encoding sublayer 424 of the at least one primary encoding sublayer 120 may be processed to obtain (through the processing at block 200, see below, e.g. through a transformation) the estimate of the initialization state for $S_{424,0}^{RE}$ of the at least one secondary encoding sublayer 320 the state $S_{426,k}^{LE}$ of the encoding sublayer 426 of the at least one primary encoding sublayer 120 may be processed to obtain (through the processing at block 200, e.g. through the transformation) the estimate of the initialization state for $S_{426,0}^{RE}$ of the at least one secondary encoding sublayer 320 the state $S_{428,k}^{LE}$ of the encoding sublayer 426 of the at least one primary encoding sublayer 120 may be processed to obtain (through the processing at block 200, e.g. through the transformation) the estimate of the initialization state for $S_{428,0}^{RE}$ of the at least one secondary encoding sublayer 320 the state $S_{444,k}^{LD}$ of the decoding sublayer 444 of the at least one primary decoding sublayer 140 may be processed to obtain (through the processing at block 200, e.g. through the transformation) the estimate of the initialization state for $S_{444,0}^{RD}$ of the at least one secondary decoding sublayer 340 the state $S_{446,k}^{LD}$ of the decoding sublayer 446 of the at least one primary decoding sublayer 140 may be processed to obtain (through the processing at block 200, e.g. through the transformation) the estimate of the initialization state for $S_{446,0}^{RD}$ of the at least one secondary decoding sublayer 340 the state $S_{448,k}^{LD}$ of the decoding sublayer 448 of the at least one primary decoding sublayer 140 may be processed to obtain (through the processing at block 200, e.g. through the transformation) the estimate of the initialization state for $S_{448,0}^{RD}$ of the at least one secondary decoding sublayer 340 the state $S_{450,k}^{LD}$ of the decoding sublayer 450 of the at least one primary decoding sublayer 140 may be processed to obtain (through the processing at block 200, e.g. through the transformation) the estimate of the initialization state for $S_{450,0}^{RD}$ of the at least one secondary decoding sublayer 340.

More in general, in case the series of sublayers (424, 426, 428, 444, 446, 448, 450) of the at least one primary learnable sublayer (120, 140) and the series of sublayers (424, 426, 428, 444, 446, 448, 450) of the at least one secondary learnable sublayer (320, 340) have corresponding sublayers (e.g., corresponding, different instances of sublayers), then the initialization state of at least one (or each) of the sublayers (424, 426, 428, 444, 446, 448, 450) of the at least one secondary sublayer (320, 340) is obtained from the state of the corresponding sublayer (424, 426, 428, 444, 446, 448, 450) of the primary learnable sublayer (120, 140), e.g. at the conclusive iteration (e.g., at the final, k-th iteration or at one of the final iterations, see also below).

Figure 4A:
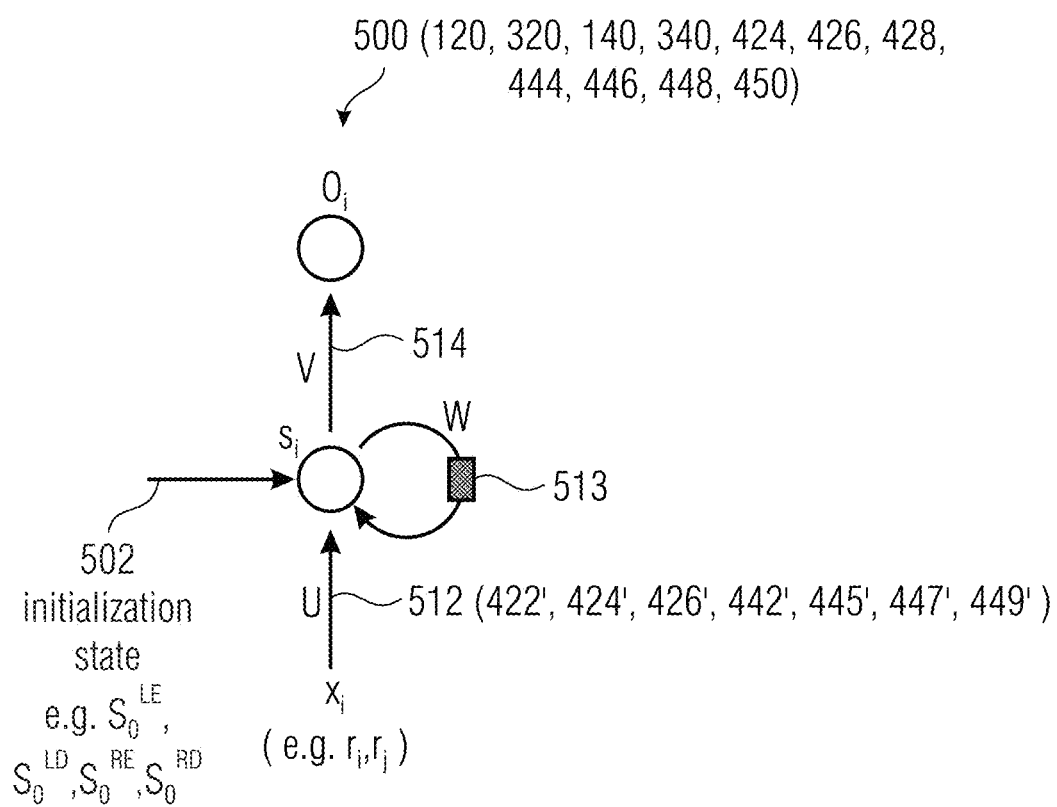
Figure 4B:
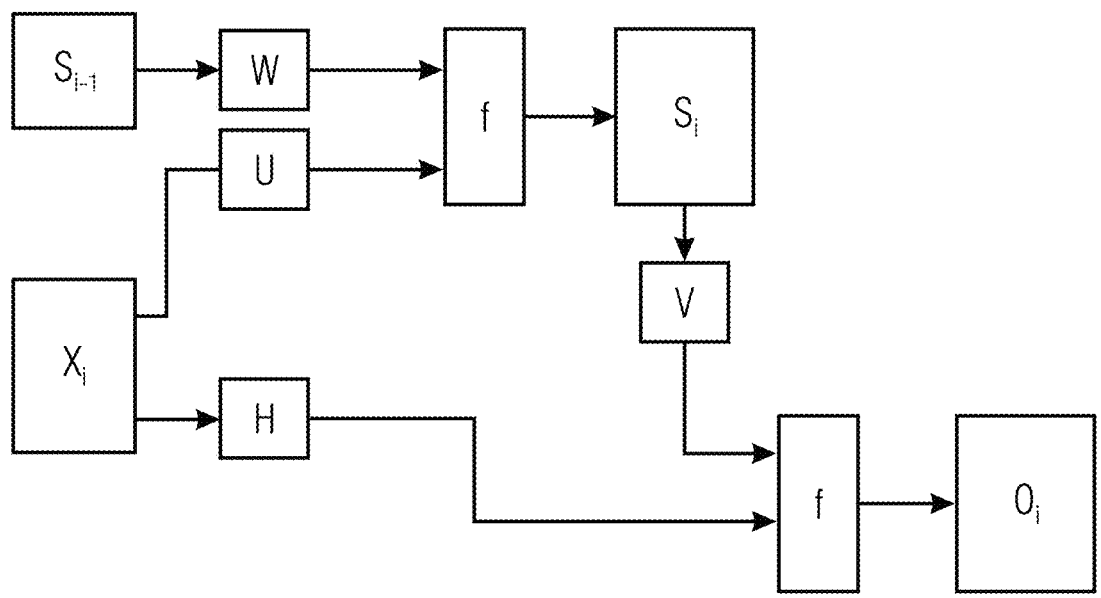
Figure 4C:
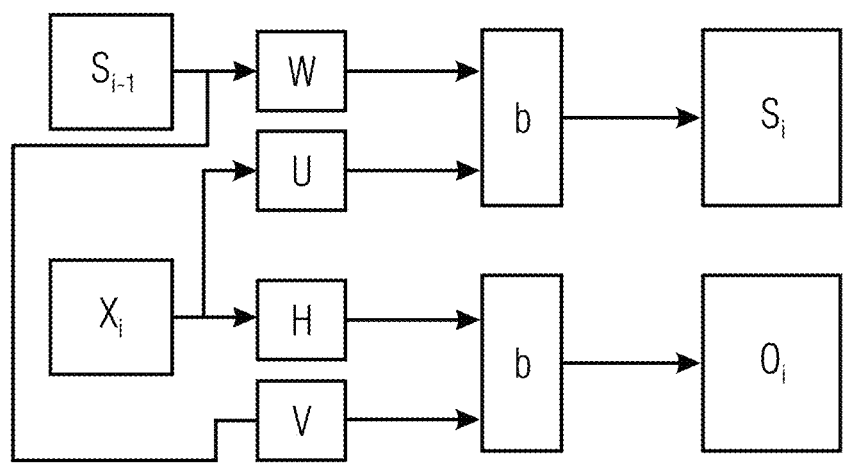

FIG. 4a shows an example of a general learnable layer 500 with a state. An input $x_i$ may be mapped onto the current state $S_i$, or onto a component forming the current state $S_i$, (apart from an optional activation function), and the state $S_i$ may be mapped onto the output $O_i$ through the state-to-output parameter, while a previous state $S_{i-1}$ may also be used for obtaining the current state $S_i$ through the state-to-state parameter. In FIG. 4a it is shown that the state is indicated with 513, while FIG. 1a shows the at least one primary (or secondary) image encoding (or decoding) learnable sublayer 120 (or 140, 320, 340) has a state 122; the secondary encoding learnable sublayer 320 has the state 322, the secondary decoding learnable sublayer 340 has state 342.

The initial iteration i=1 (or j=1) may be subjected to a initialization state 502 (FIG. 4a). This is because at the initial iteration i=1 (or j=1) there is not a previous iteration for which the state $S_1$ can be obtained. However, the general formula $O_i = f(V \odot S_i)$ for i=1 does is valid as $O_1 = f(V \odot S_0)$ provided that $S_0$ is an initialization state, which is not defined by a preceding (inexistent) iteration. Therefore, at the initial iteration i=1 (or j=1), there may be defined that $S_1 = f(U \odot x_1 + W \odot S_0)$ and $O_1 = f(V \odot S_1)$, where $S_0$ is the initialization state. It is shown that at the primary block 100, the initialization state ($S_0^{LE}$) for the primary encoding learnable sublayer 120 and the initialization state ($S_0^{LD}$) for the primary decoding learnable sublayer 140 may be a default value (e.g. a tensor having all the entries equal to 0). Contrary thereto, in the secondary block 300, the initialization state ($S_0^{RE}$) for the secondary encoding learnable sublayer 320 can in general also not be a default value, but may be obtained (at least partially, e.g. at least for some of its entries and/or at least for one component) from an estimate of the initial state of the at least one secondary encoding learnable sublayer 320 by applying a transformation based on the correspondence information (e.g. mutual spatial relationship, or temporal- or spatial-related mutual relationship information) between the primary image 102 and the secondary image 104 (the transformation may be applied to the conclusive state $S_k^{LE}$ of the encoding sublayer 120, which, at the kth iteration at which the encoded version 133 of the primary image 102 is chosen, happens to be the current state $S_k^{LD}$). In addition or alternatively, the initialization state ($S_0^{RD}$) for the secondary decoding sublayer 340 may be an estimate of an initial state of the at least one secondary decoding learnable sublayer 340 by applying a transformation based on the correspondence information (e.g. mutual spatial relationship, or temporal- or spatial-related mutual relationship information) between the primary image 102 and the secondary image 104 (the transformation may be applied to the conclusive state $S_k^{LD}$ of the decoding sublayer 140, which, at the kth iteration at which the encoded version 133 of the primary image 102 is chosen, happens to be the current state $S_k^{LD}$). Therefore, accordingly, in the secondary block 300 from an initial knowledge on the imaged subject is obtained based on correspondences between the first image information 102 and the second image information 103, and the secondary iterations 351 will in general be less in number than the primary iterations 151 (or, at least, the secondary iterations 351 will benefit from the conclusive states $S_k^{LD}$ and $S_k^{LE}$, which represent preferable starting points for estimating the initialization states $S_0^{RD}$ and $S_0^{RE}$.

As explained above, the initialization values $S_0^{RE}$ and $S_0^{RD}$ for the at least one secondary encoding learnable layer 320 and at least one secondary decoding learnable layer 340 may be obtained by applying a transformation based on the correspondence information (e.g. mutual spatial relationship, or temporal- or spatial-related mutual relationship information) between the primary image information 102 and the secondary image information 104. Further, at least initial comparison at the secondary comparison block 310 may be performed between the secondary image 104 and a warped (predicted, estimated) version 222 of the primary image 104.

In particular for obtaining the initialization states $S_0^{RE}$ and $S_0^{RD}$ for the secondary learnable sublayers 320 and 340, the conclusive state ($S_k^{LE}$, $S_k^{LD}$) of one of the primary learnable sublayers 120, 140 may be taken into account and transformed through the transformation based on the spatially-related mutual relationship information between the primary image information 102 and the secondary image information 104. For a conclusive state $S_k^{LE}$ and $S_k^{LD}$ we may refer to the current state at the state in which the preferred encoded version 124 of the primary image 102 (in particular in its binarized version 132) implies ($r_t$), but in some examples to one of the states of the last iterations (e.g., $S_{k-b1}^{LE}$ and $S_{k-b2}^{LD}$ with b1<10 and b2<10, and/or b1<k/2 and b2<k/2 (or in some examples, b1<k/4 and/or b2<k/4, or in some examples b1<k/8 and/or b2<k/8), where b1 may be equal to or different from b2). Therefore, a bitstream 10 obtains, encoded therein, together with the encoded version 133 of the primary image 102, the encoded version 333 of the secondary image 104 obtained from the secondary block 300 by keeping into account amount of information already obtained from the primary block 100, e.g. conclusive states $S_k^{LE}$, $S_k^{LD}$ and/or a warped (predicted, estimated) version 222 of the secondary image 104 as obtained through a reconstructing process (see below) which keeps into account also the primary image 102.

It is now explained how to transform, at transformation block 200, the conclusive states ($S_k^{LE}$, $S_k^{LD}$, or more in particular $S_{424,k}^{LE}$, $S_{426,k}^{LE}$, $S_{428,k}^{LE}$, $S_{444,k}^{LD}$, $S_{446,k}^{LD}$, $S_{448,k}^{LD}$, $S_{450,k}^{LD}$, or more in particular $S_{424,k-b1}^{LE}$, $S_{426,k-b1}^{LE}$, $S_{428,k-b1}^{LE}$, $S_{444,k-b2}^{LD}$, $S_{446,k-b2}^{LD}$, $S_{448,k-b2}^{LD}$, $S_{450,k-b2}{}^{LD}$) onto estimates of the initialization states ($S_0{}^{RE}$, $S_0{}^{RD}$, or more in particular $S_{424,0}{}^{RE}$, $S_{426,0}{}^{RE}$, $S_{428,0}{}^{RE}$, $S_{444,0}{}^{RD}$, $S_{446,0}{}^{RD}$, $S_{448,0}{}^{RD}$, $S_{450,0}{}^{RD}$) at the secondary block 300. FIG. 1a shows an example of transformation block 200. It will be shown that the block 200 may apply a transformation to the states 122 (e.g. $S_k{}^{LE}$, or more in particular $S_{424,k}{}^{LE}$, $S_{426,k}{}^{LE}$, $S_{428,k}{}^{LE}$) and 142 (e.g. $S_k{}^{LD}$, or more in particular $S_{444,k}{}^{LD}$, $S_{446,k}{}^{LD}$, $S_{448,k}{}^{LD}$, $S_{450,k}{}^{LD}$) as obtained in the conclusive iteration at which the encoded and binarized version 133 of the primary image information 102 is encoded in the bitstream 10. As can be seen, the state $S_k{}^{LE}$ is indicated with 143 and is processed so as to obtain an estimate 242 of the initialization state SORE to be used at the secondary block 300 for obtaining the secondary encoded version 333 of the secondary image information 104 to be written in the bitstream 10. Analogously, the state $S_k{}^{LD}$ (123) of the at least one primary decoding learnable sublayer 140 may be processed to obtain an estimate 232 ($S_0{}^{RD}$) of the initialization state 342 of the secondary decoding learnable sublayer 340 to be used at secondary block 300, also for obtaining the encoded version 333 of the secondary image information 104 to be encoded in the bitstream 10. In order to process the states 143 and 123 to obtain the estimates 242 and 232, there may be applied a transformation based on an association between the entries of the primary image information 102 with the entries of the secondary image information 104. This association may be, for example, based on correspondences between entries of the primary image information 102 with entries the entries of the secondary image information 104, such as spatially- or temporally-related mutual information. An example of spatially-related mutual information may be a disparity, which may provide information on the difference in position between the visualized element of the represented subject by the first primary image information 102 and the same element of the same subject as represented by the secondary image information 104. The disparity (or more in general the correspondence information) may be either obtained (e.g., by applying similarity metrics) or may be otherwise provided (e.g., by an external input). The disparity may be an example of spatially-related mutual relationship information (or more in general as correspondence information) between the first image information 102 and the second image information 104. In some examples the disparity may be a same value (e.g., bias), identically provided to all the entries of the secondary image information 104 to be aligned with the same elements in the primary image information 102, such as in the example of a translation of a secondary image with respect to the primary image. In other examples (e.g., in the case of a rotation of 90 degrees), the entries of a column of the secondary image information 104 may be associated to the elements of a raw of a first primary image 102, and the elements of a raw of the primary image information 104 may be associated with elements of a column of the first primary image information 102. Some entries of the secondary image information 104 may be transformed to be aligned with corresponding entries of the primary image information 102 (e.g. representing the same visual element of the same imaged subject). It has been understood that the entries of the states 122 ($S_k{}^{LE}$, $S_{424,k}{}^{LE}$, $S_{426,k}{}^{LE}$, $S_{428,k}{}^{LE}$) of the primary encoding learnable sublayer 120 and the states 142 ($S_k{}^{LD}$, $S_{444,k}{}^{LD}$, $S_{446,k}{}^{LD}$, $S_{448,k}{}^{LD}$, $S_{450,k}{}^{LD}$) Of the at least one primary decoding learnable sublayer 140 may be subjected to a transformation based on the alignment provided by the disparity information between the primary and secondary image information 102 and 104, or by other kinds of associations between the primary image information 102 and the secondary image information 104 based on correspondence information providing correspondences (e.g., entry-by-entry correspondences) between the primary image information 102 and the secondary image information 104 (e.g., flow vector, motion vector, etc.; see below).

As will also be shown in the subsequent passages, it is not always strictly necessary to have a disparity map, but it is more in general possible to have a rule (e.g. based on correspondence information) that aligns each entry of the secondary image information 104 to each entry of the primary image information 102 (or otherwise provides correspondences, such as entry-by-entry correspondences, between the primary image information 102 and the secondary image information 104). This mapping may therefore be reported in mapping the states 143 onto states 242 and states 123 onto states 232, respectively (apart from possible other processing, which is also discussed, such as the occlusion mapping). In some cases, the dimensions of the primary image information 102 and/or of the secondary image information 104 may be different from the dimensions of the states 143, 123, 242, and 232. In that case, it is simply possible to apply a downsampling and/or upsampling (e.g. using entry-by-entry interpolations) to the transformation aligning the secondary image information 104 with the primary image information 102, so as to arrive at a transformation which transforms each entry of the states 143 ($S_k{}^{LE}$) and 123 ($S_k{}^{LD}$) onto entries of the estimates 242 ($S_0{}^{RE}$) and 232 ($S_0{}^{RD}$). In examples, the mapping may be obtained through a linear transformation. The transformation at layers 238 and 228 may be therefore performed through layers (e.g. non-learnable layers) which align (or otherwise provides correspondences on) entries of the states 143 and 123 to the estimates 242 and 232 by replicating the mapping of the secondary image information 104 onto the version 222 aligned with the primary image information 102. We may simply start from the spatially related mutual relationship information in the form of disparity indicated with 210 in FIG. 1a, for obtaining the estimates 242 and 232 of the initialization states for the sublayers 320 and 340 at layers 238 and 228. Notwithstanding, it is also possible to perform an alignment (or otherwise find out correspondences) between the secondary image information 104 and a primary image information 102 at layer 220 to obtain a warped version 222 (predicted version, estimated version) of the secondary image information 104. The warped version (predicted version, estimated version) 222 may be understood as providing a gross estimate (or otherwise a prediction) of the secondary image information 104 based on a reconstructed version 144 of the primary image information 102 and the correspondence information (e.g., disparity map 206 or 210 and/or other temporal- or spatial-related mutual information) between the primary image information 102 and the secondary image information 104. The warped version 222 (predicted version, estimated version) of the secondary image information 104 will be used at the secondary block 300 to iteratively encode in the bitstream 10 (333) the secondary image information 104. The reconstructed version 144 of the primary image information 102 may be understood as the conclusive re-decoded version 144 as output by the at least one decoding learnable sublayer 142 at the last k-th primary iteration 151. In the case in which the conclusive states are obtained at the $(k-b1)^{th}$ and/or $(k-b2)^{th}$ iteration, the reconstructed version 144 of the primary image information 102 may be understood as the version $\hat{L}_{k-b2}$ or $\hat{L}_{k-b1}$, for example.

The warping layer 220 may be a deterministic layer without learnable layers and/or may share the input of the disparity (or other spatially related mutual relationship information) as input with the warping layers 238 and 228. Basically, the warping layer 220 may align the secondary image information 104 with the primary image information 102, but in the way by taking into consideration the disparity 210 (for the secondary image information 104) and the reconstructed version 144 of the primary image information 102, through the primary decoding learnable sublayer 140. Accordingly, by applying the disparity 210 of the secondary image information 104 onto the reconstructed primary image 144, a warped version of the secondary image information 104 may be obtained. As explained above, the warping layer(s) 220, 238, 228 may therefore be understood as aligning entries of the inputs (e.g., pixels or other representation entries for layer 220, and states 143 and 123 in the case of layers 238 and 228, respectively) so as to obtain an aligned (warped) version of the output. Below, there will be discussed, in particular, by taking into account FIG. 5, different techniques for performing the warping transformation at layers 220, 238, 228 as in FIG. 1a, the disparity information 206' may also be encoded and signaled as signaling 206' the bitstream 10. This may be an example of signaling spatially related mutual relationship information, even though there may be other examples of encoding spatially related mutual relationship information.

Figure 6:
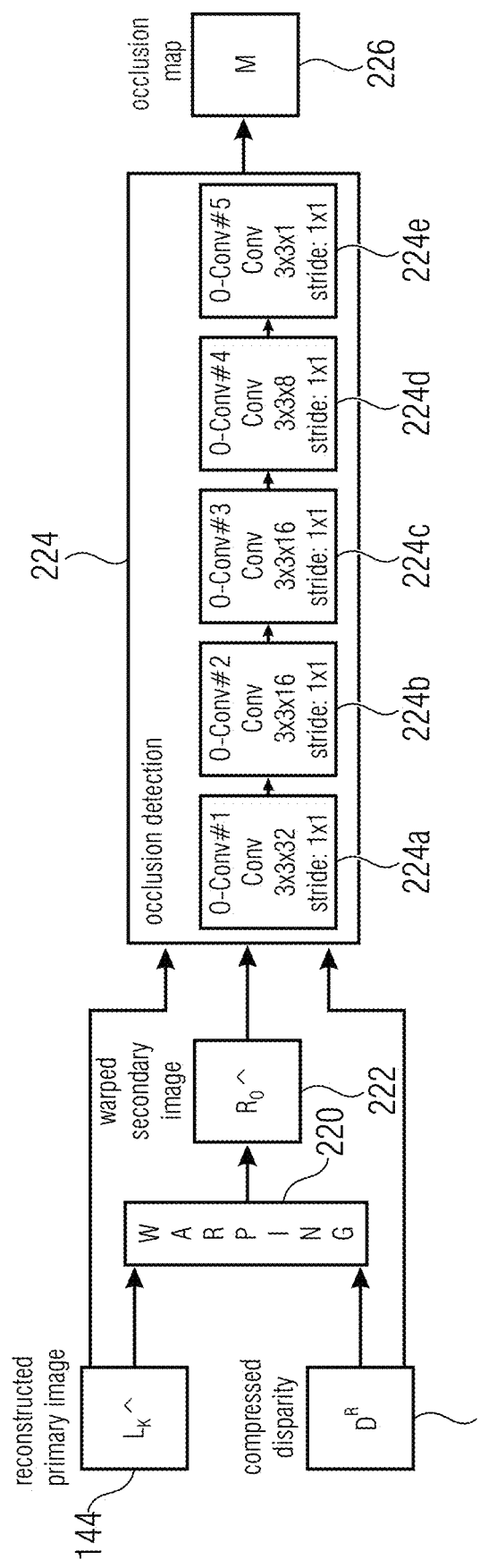
FIG. 6 shows an example of an element of an image encoder and/or decoder.
Figures 7A, 7B, 7C, 7D:
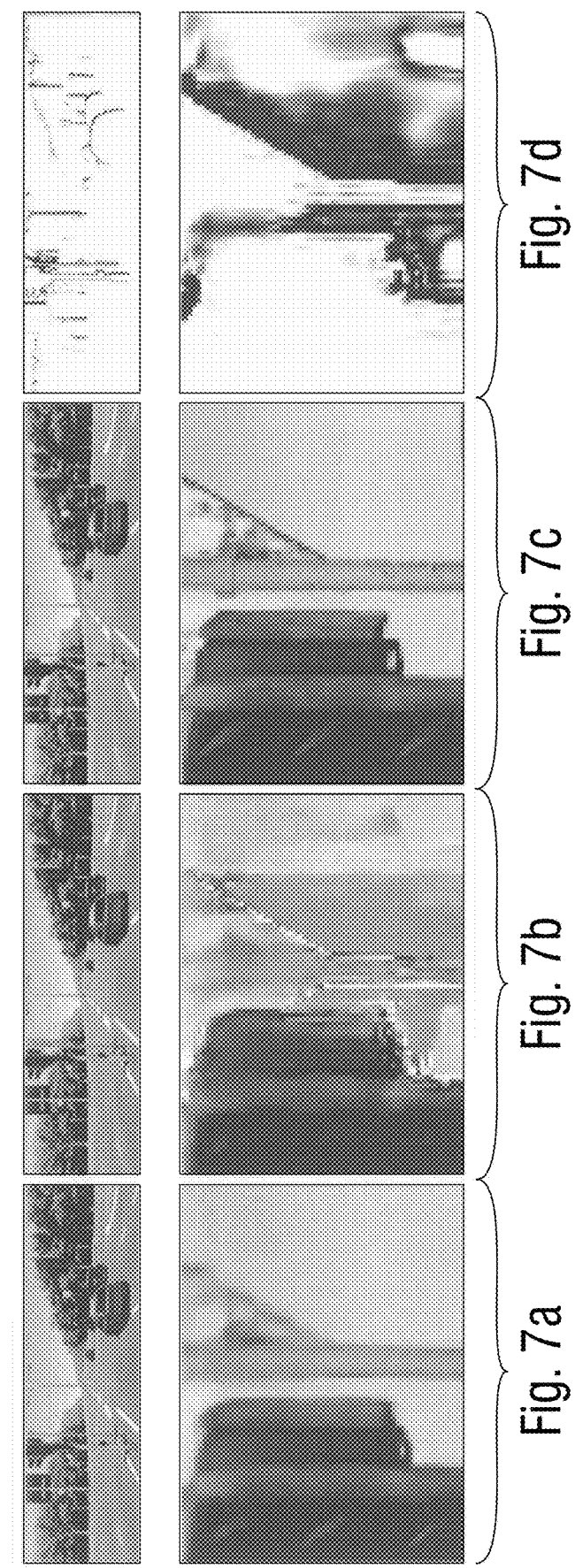

FIG. 6 shows an example of how to obtain occlusion information (e.g. occlusion map) 226 by an occlusion detection layer 224. Reference is made prevalently to the block 222 of FIG. 1a and to FIG. 6, which shows some blocks of FIG. 1a with optional additional details. The sense of the occlusion information 226 may be dealing with the unwanted fact the transformations at warping layers 238 and 228 could lead to incorrect values in the case of an obstruction. In general terms, we have no advantage in transforming (warping) a conclusive state 143 ($S_k^{LE}$) or 123 ($S_k^{LD}$) onto an estimate of the initialization state ($S_0^{RE}$, $S_0^{DE}$) if there is an occlusion, and the occluded entries are in general associated to no valuable correspondence information. Therefore, we want to avoid that the initialization state ($S_0^{RE}$, $S_0^{RD}$) of the at least one secondary learnable sublayer 350 (320, 340), has, in the entries corresponding to the obstructions, values obtained from the warping layer (238, 228), which would be incorrect. Accordingly, it may be preferable that the entries of the initialization state $S_0^{RE}$, $S_0^{RD}$ which correspond to the obstructed entries in the primary and/or secondary image information (102, 104) have values default values (e.g., 0). The occlusion map 226 may associate, to each entry (or at least a region of more entries) of at least one of the primary image information 102, secondary image information 104, and/or any of the conclusive state 143 ($S_k^{LE}$) or 123 ($S_k^{LD}$) of the at least one primary sublayer 150 (120, 140), an occlusion probability, which may be used as a weight. For example, there may be a probability information for each entry (or each region comprising a plurality of adjacent entries) in such a way that there is provided information (e.g., probabilistic information) whether the entry is occluded or not. In some examples, for each entry there may be provided not only a binary value (e.g. "occluded"/"non-occluded") but a scale of probabilities (e.g. a value intermediated between a "0"="certainly occluded" vs "1"="certainly non-occluded", and scaled intermediate values for intermediate probabilities), so that entries (or regions of entries) with higher occlusion probability have a value closer to 0 (or another default value), while entries or regions of entries with lower probabilities of occlusion may be closer to 1 (this operation is represented by layers 240 and 230, which are here shown as they were scalers or multipliers, but they can more in general be occlusion insertion layers).

In order to obtain the occlusion map 226 (or at least the occlusion probabilities), mutual spatial information between the primary image 102 and the secondary image 104 is taken into account, together with a reconstructed primary image 144 ($L_k^{[<]BEGINITALm}$) (obtained by subjecting the encoded version 133 of the primary image 102 to the at least one primary decoder 140). Further, the positional information (mutual spatial relationship, or more in general correspondence information) may also be used after being processed, for example by using a disparity map 208 or a compressed disparity map 210 (which may provide the disparity values of the entries or groups of adjacent entries), which keep into account the disparity (or other correspondence information) between the entries in the primary image information 102 and the secondary image information 104. As explained above, through warping operation 220, a warped (estimated, predicted) secondary image 222 ($R_0^{\hat{}}$) can be obtained. From the reconstructed primary image 144 ($L_k$), the compressed secondary image disparity $D^R$, 210 (or the map 208), and the warped secondary image $R_0^{\hat{}}$ (222), it is possible to ingest all this information onto an occlusion detection layer 224 (FIG. 6). The occlusion detection layer 224 may be, for example, a convolutional learnable layer (e.g. a convolutional neural network) which may be a learnable layer without a state. As can be seen, the learnable layer 224 may include a plurality of learnable layers without a state (here, there are represented five learnable layer 224a, 224b, 224c, 224d, 224e) which are here according to this example, connected in series to each other. Each of the convolutional learnable sublayers 224a-224e may have a filter which may be, for example, a 3×3 filter along the first and second directions, and may have a progressively reduced extension in the number of channels. The occlusion detection sublayers 224a-224e may, in fact, obtain an occlusion map 226 in one single channel and they can therefore progressively reduce the number of channels. On the other side, the occlusion detection learnable sublayers 224a-224e may progressively increase the first dimension and the second dimension, thereby performing an upsampling operation. Basically, the disparity map may operate as a weight tensor which weights (at blocks 230 and 240) the outputs of the warping layers 228 and 238, so as to process the estimate of the initialization states $S_0^{RE}$, $S_0^{RD}$ to be used at the encoding sublayer(s) 320 and a the decoding sublayer(s) 340.

Notably, the occlusion map 226 may also be used, at the initial iteration j=1 at the secondary block 300 (to obtain the initial residual). FIG. 1a shown the scaler 300' which applies the occlusion probabilities 226 onto the estimated version 222 ($R_0^{\hat{}}$) of the secondary image information 104 (e.g. the output 312 of comparison block 310, instead of $r_1=R-R_0^{\hat{}}$ may be $r_1=R-R_0^{\hat{}}*M$). Accordingly, the initial iteration j=1 at the secondary block 300 is advantageously started not only by relying on information already obtained (such as $R_0^{\hat{}}$) from the correspondence information, but also on the occlusion probability 226, which permits to exclude occluded (or probably occluded) entries of $R_0^{\hat{}}$ which otherwise would carry no valuable information.

Figure 1B:
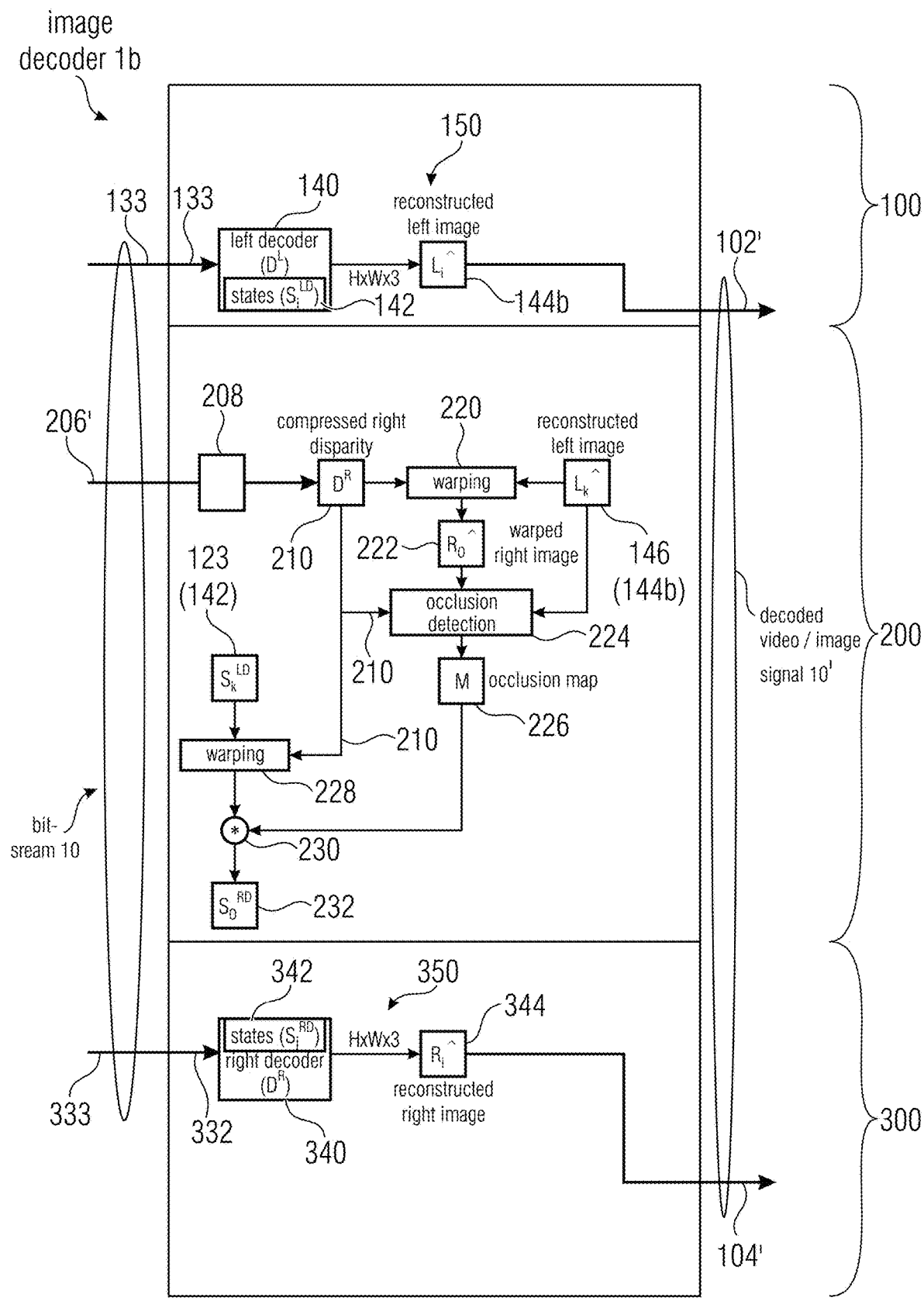
Figure 3B:
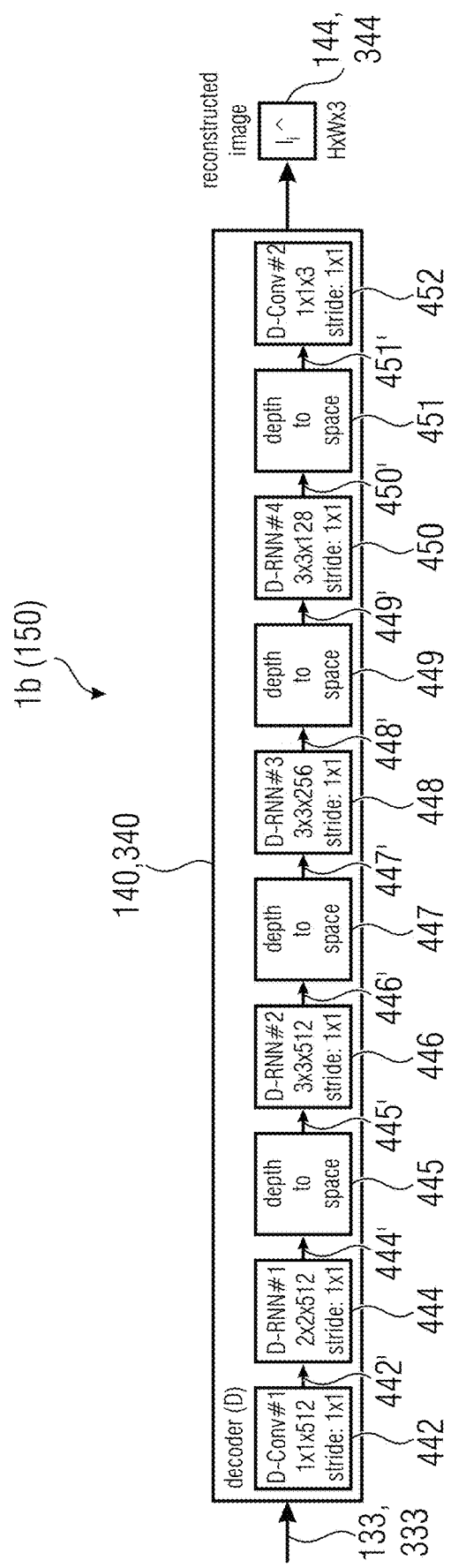

FIG. 1b shows an example of an image decoder 1b which may output a decoded image signal 10' from a bitstream 10 (which may be the bitstream 10 encoded by the image encoder 1), the decoded signal 10' including a decoded version 102' of the primary image 102 and a decoded version 104' of the secondary image 104. The bitstream 10 may include the primary image information in encoded version 133, the secondary image information (in encoded version 333), and, in case, signaling including, a spatially-related mutual relationship information (or more in general correspondence information) which is here indicated with 206', since it may be imagined to be the disparity map obtained at block 205 (but, in other examples could be other different correspondence information, such as other spatially-related mutual relationship information). The encoding of the spatially-related mutual relationship information 206' is not always strictly necessary, since it may be that in some cases the spatially-related mutual relationship information is not encoded if the signaling of the bitstream 10 (e.g., in some cases it may be provided, for example, from an input from a user, or in other example may be obtained from a similarity metrics). In examples, the primary image information (in encoded version 133) may be subjected to an iteration in which at least one learnable sublayer 140 (e.g. at least one primary decoding learnable sublayer 140) may be iteratively applied to obtain a reconstructed version of the image 144b, which may be directly used, in some examples, as a first component 102' of decoded video signal 10' in order to have the second component 104' of the decoded video signal 10', a secondary block 300 may be applied through iteration to the secondary image information (in encoded version 333) from the bitstream 10. Here, at least one secondary decoding learnable sublayer 340 may be applied to the secondary image information (in encoded version 333), to obtain a reconstructed version 334 of the secondary image information 104 (e.g. a secondary image). Basically, the elements of the image decoder 1b may substantially be analogous to the elements of the right half decoding subsection of the image encoder 1 of FIG. 1a. Hence, the repetition of the description of each block is here not carried out, and analogous blocks are identified with the same reference numerals or by adding the letter "b". As can be seen, therefore, the at least one decoding learnable sublayer 140 of block 100 of the image decoder 1b is substantially equivalent to the primary decoding learnable sublayer 140 of the primary block 100 of the image encoder 1 of FIG. 1a, and iteratively obtains decoded versions of the primary image information 102 through the at least one decoding learnable layer 140 which has states Sim (142) which are updated at each iteration. The functioning of the at least one primary decoding learnable sublayer 140 of the image decoder 1b is substantially the same of the at least one primary decoding sublayer 140 of the image encoder 1 of FIG. 1a. However, it is to be noted that the learnable parameters obtained through training may not the same between these two sublayers (but, after learning, the at least one primary decoding learnable sublayer 140 of the image decoder 1b finally has the same parameters of the at least one primary decoding sublayer 140 of the image encoder 1 of FIG. 1a). Analogously, for at least one secondary decoding learnable sublayer 340 and its state 342 (VD) the same may be said with respect to at least one secondary decoding sublayer 340 and its state 342 (VD). The reconstructed secondary image information 344 of the secondary image information 104 may therefore be provided as the second component (decoded secondary image information) 104' of the decoded video signal 10'. As for the discussion between the states of the encoding sublayers 120, 140 at the primary block 100 and the states 222 and 242 at the learnable sublayers 320 and 340 at the secondary block 300 for the image encoder 1 of FIG. 1a, the same can be said for the image decoder 1b. The states 142 may be transformed from the version $S_k^{LD}$ (123) onto $S_0^{RD}$ (232), which is the estimation of the initialization state $S_0^{RD}$ for the at least one secondary decoding learnable layer 340 of block 300. All the considerations discussed above for the states and for the learnable layers (which may be, for example, recurrent learnable layers, such as recurrent neural networks) are substantially valid, even though the states at 123 of FIG. 1b are in general not the same of the states 123 of the image encoder 1 of FIG. 1a. FIG. 1b shows a disparity decoding layer 208 which, in this case, obtains the signaled spatially relating mutual relationship information in the form of disparity information (e.g. disparity map) as encoded by block 200 of the image encoder 1. Element 210 is a compressed disparity information 210 ($D^R$) which may be understood as a replica of the analogous layer 210 of the image encoder 1 of FIG. 1a. A warping layer 220 (which basically replicates the warping layer 220 of the image encoder 1 of FIG. 1a) provides a warped (estimated, predicted) version 222 ($R_0^{[<]BEGINITALm}$) of the secondary image information 104 as obtained by applying the disparity information 206' (obtained from the signaling in the bitstream 10) to the reconstructed primary image information 146 (144b) as obtained from the at least one primary decoding sublayer 140 at block 100 of the image decoder 1b. An occlusion detection layer 224 may be inputted by the inputs 210, 222 and 146 in a similar way of the occlusion detection layer 224 of the image encoder 1 of FIG. 1a. In examples, the same implementation of FIG. 6 can be used. The transformation layer 228 at the image decoder 1b may be analogous to the transformation layer 228 of FIG. 1a. Similarly to the transformation at the image encoder 1, also the transformation at layer 228 may apply the transformation based on the spatially-related mutual relationship information (correspondence information), mapping the conclusive state 123 ($S_k^{LD}$) onto estimates 222 ($S_0^{RD}$) for the at least one decoding learnable layer 340 of the image decoder 1b of FIG. 1b. As above, also the occlusion map 226 may be applied at block 230 to obtain the final version of the visualization states 232 ($S_0^{RD}$) for the secondary sublayer. FIG. 3b shows an example of the sublayers in FIG. 1b. As can be seen, the at least one decoding learnable layer 140, 340 (either primary or secondary) may be the same of the at least one primary or secondary learnable layer 140, 430 of FIG. 3a and, therefore, no additional indication is necessary. All the discussion above for the learnable layers with a state may be valid for the at least one learnable sublayers 140 and 340 (including all the sublayers shown in FIG. 3b) at the image decoder 1b. The sublayers shown in FIG. 3b may be applied iteratively individually.

FIGS. 1a and 1b mostly relate to "one-shot" encoding and decoding, in which two images are encoded and decoded at the primary and secondary blocks 100 and 300. In FIG. 1a, the residual 112 (312) is iteratively generated at each iteration i (j), to the point that more and more accurate information is iteratively written in the bitstream 10 (133, 333). Therefore, at the encoder 1, a primary image 102 and a secondary image 104 may be encoded through the residuals (112, 312) in each iteration i (j), but the decoder 1b will decode the images 102' (from 133) and 104' (from 333) in full at each iteration. Therefore, the examples of FIGS. 1a and 1b can be considered as "one-shot "encoders/decoders".

FIG. 9a shows that the output 141 (341) of the primary decoding sublayer 140 (secondary decoding sublayer 340) (which is obtained by processing the residual 112 (312) obtained at block 110 (310) through layers 120, 130, 140 (320, 330, 340)) is a reconstructed/decoded version of the residual 112 (312). The decoded primary image information (144, $L_i\hat{}$, 344, $R_j\hat{}$) for a current iteration i>1 (j>1) may be achieved by adding the reconstructed residual 141 to a previously reconstructed decoded primary (or secondary) image information (144, $L_{i-1}\hat{\ }$, 344, $R_{j-1}\hat{\ }$) obtained at the previous iteration i−1 (j−1) (for the initial iteration, a default value 0 may be considered to be added). This is why FIG. 9a shows the symbol $z^{-1}$ in blocks 146' and 346'.

The primary and secondary decoded versions (141, 341) of the primary and secondary image information (102, 104) at the output of the at least one primary and secondary decoding sublayer (140, 340) represent a primary and a secondary residual image information, respectively, from which the reconstructed version of the first and second image information is reconstructed iteratively (e.g. at cycles 920, 940). Therefore:

1) at the initial iteration (i=1, j=1), initially reconstructed primary and secondary image information ($L_1\hat{\ }$, $R_1\hat{\ }$) are obtained, which correspond to the primary and secondary residual image information (102, 104), respectively;
2) at each of the subsequent iterations (i>1, j>1), the iteratively reconstructed primary and secondary image information (144, $L_i\hat{\ }$, 344, $R_j\hat{\ }$) is obtained from the primary and secondary decoded residual image information (141, 341) and the previously reconstructed image information ($L_{i-1}\hat{\ }$, $R_{j-1}\hat{\ }$), respectively (e.g. by addition of the previously reconstructed image information ($L_{i-1}\hat{\ }$, $R_{j-1}\hat{\ }$) to the primary and secondary decoded residual image information (141, 341) at the addition layer 928b, 948b).

Notably, in the encoder 9 of FIG. 9a, the reconstructed version ($L_k\hat{\ }$) of the primary image the one used by the transformation block 200 to obtain the warped (predicted, estimated) version 222 ($R_0\hat{\ }$) of the secondary image information.

FIG. 9b shows that the output 141 (341) of the primary decoding sublayer 140 (secondary decoding sublayer 340) is a reconstructed/decoded version of the residual 112 (312) generated at the image encoder 1b. The decoded primary image information (144b, $L_i\hat{\ }$, 344b, $R_j\hat{\ }$) for a current iteration i>1 (j>1) may be obtained by adding the reconstructed residual 141 (341) to a previously reconstructed decoded primary (or secondary) image information 144b, $L_{i-1}\hat{\ }$ (344b, $R_{j-1}\hat{\ }$) obtained at the previous iteration i−1 (j−1) (for the initial iteration i=0, j=0, a default value 0 may be considered to be added). This is why FIG. 9b show the symbol $z^{-1}$ in blocks 146' and 346'.

The primary and secondary decoded versions (141, 341) of the primary and secondary image information (102, 104) at the output of the at least one primary and secondary decoding sublayer (140, 340) represent a primary and a secondary residual image information, respectively, from which the primary and secondary image information (102', 104') to be outputted is reconstructed iteratively (e.g. at cycles 920, 940). Therefore:

1) at the initial iteration (i=1, j=1), initially reconstructed primary and secondary image information ($L_1\hat{\ }$, $R_1\hat{\ }$) are obtained, which correspond to the primary and secondary residual image information (102, 104), respectively,
2) at each of the subsequent iterations (i>1, j>1), the iteratively reconstructed primary and secondary image information (144b, $L_i\hat{\ }$, 344b, $R_j\hat{\ }$) is obtained from the primary and secondary decoded residual image information (141, 341) and the previously reconstructed image information ($L_{i-1}\hat{\ }$, $R_{j-1}\hat{\ }$), respectively (e.g. by addition of the previously reconstructed image information ($L_{i-1}\hat{\ }$, $R_{j-1}\hat{\ }$) to the primary and secondary decoded residual image information (141, 341) at the addition layer 928b, 948b).

Notably, in the decoder 9b of FIG. 9b, the reconstructed version ($L_k\hat{\ }$) of the primary image is the one used by the transformation block 200 to obtain the warped (predicted, estimated) version 222 ($R_0\hat{\ }$) of the secondary image information.

A major difference of the residual encoding/decoding at FIGS. 9a and 9b with respect to the one-shot encoder/decoder of FIGS. 1a and 1b is that in the residual encoding/decoding (FIGS. 9a and 9b) the output 141 (341) of decoding sublayer 140 (340) in each iteration i>1 (j>1) is the reconstructed residual information of input 112, while in one-shot encoding/decoding (FIGS. 1a and 1b) the output ($L_i\hat{\ }$, $R_j\hat{\ }$) of the decoder sublayer 140 in each iteration i≥1 (j≥1) is complete reconstructed primary image information ($L_i\hat{\ }$, $R_i\hat{\ }$).

With particular reference to the residual decoder 9b of FIG. 9b, the decoded versions (141, 341) of the primary and secondary image information at the output of the at least one primary and secondary decoding sublayer (140, 340) represent a primary and a secondary residual image information, respectively, from which the primary and secondary image information (102', 104') is reconstructed iteratively (e.g. at cycles 920b, 940b). Therefore:

at the initial iteration, the initially reconstructed primary and secondary image information corresponds to the primary and secondary residual image information, respectively,
at each of the subsequent iterations, the iteratively reconstructed primary and secondary image information (144b, 344b) is obtained from the primary and secondary decoded residual image information (141, 341) and the previously reconstructed image information, respectively (e.g. by addition of the previously reconstructed image information to the primary and secondary decoded residual image information (141, 341) at the addition layer 928b, 948b).

FIG. 9c shows an example of the at least one primary/secondary learnable sublayer 140, 340, with the residualization block 920b, 940b.

Different examples of encoding/decoding are provided in FIGS. 10-12d. An example of an image encoder 11b (which may be a video encoder) is shown in FIGS. 11a-11d. This example may be embody, for example, the case of hierarchical encoding video encoding, and may transcend from the presence of stereo imaging. Anyway, the example may also relate to the case of stereo imaging in the presence of three images.

Here, the image information inputted onto the encoder 11b may comprise:
a first primary image information 102, which may be a reference image (I-frame),
a first secondary image information 104 which may be a first secondary image (P-frame), and
a second secondary image information which may be a secondary image 104b (B-frame).

The images 102, 104a, 104b may be part of a group of images (e.g., 10 images), one of which is a primary image (e.g., the first one), or I-frame (102), and the other images are secondary images (104a, 104b), some of which are first secondary images (e.g., P-frames), and other are second secondary images (e.g., B-frames). It will be shown that, by instantiating multiple time at least some of blocks like blocks 100, 200, 300 of FIG. 1a, it is possible to encode, in the bitstream 10, an encoded version 333 (I-frame) of the primary image information 102, an encoded version 333a of the first secondary image information 104a (P-frame), and an encoded version 333b of the second secondary image information 104b (B-frame). Correspondence information (which in the case of the hierarchical video may be in the form of flow vector or motion vectors, but in the case of stereo imaging could be also in the form of disparities) may be at least partially obtained by the encoder 11b (e.g. through similarity metrics) or otherwise provided (e.g., from an external input). The correspondence information may be global or local information indicating correspondences between entries of the three image information 102, 104a, 104b. As shown by FIGS. 11a-11d:

A first instantiation 100 of the primary block iteratively obtaining the encoded version 133 of the primary image 102

A first instantiation 300a of the secondary block iteratively obtaining the encoded version 333a of the first secondary image 104a (P-frame)

A second instantiation 300c of the secondary block iteratively obtaining the encoded version 333b of the second secondary image 104b (B-frame)

A first instantiation 200a of the transformation block obtaining the estimates (242a, 232a) of the initialization states ($S_0^{PE}$, $S_0^{PD}$) for the first instantiation 300a of the secondary block 300 (and, in case, signalling correspondence information 206a between the primary image information and the first secondary image information)

A second instantiation 200b of the transformation block obtaining first estimates (242b, 232b, $S_0^{BE'}$, $S_0^{BD'}$) of the initialization states ($S_0^{BE}$, $S_0^{BD}$, 232d, 242d) for the second instantiation 300c of the secondary block 300 (and, in case, signalling correspondence information 206b between the primary image information and the second secondary image information)

A third instantiation 200c of the transformation block obtaining second estimates (242c, 232c, $S_0^{BE''}$, $S_0^{BD''}$) of the initialization states ($S_0^{BE}$, $S_0^{BD}$, 232d, 242d) for the second instantiation 300c of the secondary block 300 (and, in case, signalling correspondence information 206c between the first secondary image information and the second secondary image information)

A merging block 400 for merging the estimates (242b, 232b, $S_0^{BE'}$, $S_0^{BD'}$, 242c, 232c, $S_0^{BE''}$, $S_0^{BD''}$) obtained at the second and third instantiations 200b and 200c of the transformation block 200

As can be seen in FIG. 11a, at the primary block instance 100 of the primary block the primary image information 102 may be processed in the same way as in the primary block 100 of FIG. 1a, thereby obtaining the encoded version 133 of the primary image information 102 and encoding it in the bitstream 10.

At the first instantiation 200a of the transformation block, from the primary image information 102 and the first secondary image information 104a (and/or correspondence information between the image information 103 and 104a) there are obtained the initialization states 242a ($S_0^{PE}$) and 232a ($S_0^{PD}$), which are the estimates of the initialization state for the instantiation 200a of the secondary block 200 for obtaining the first secondary image information 104a. The instantiation 200a of the secondary block operates in the same way as the transformation block 200 of FIG. 1a, and, therefore, the same elements are mostly indicated with the same reference numerals with the addition of "a". It is only to be noted that layers 202a, 205a, 208a and 210a do not necessarily refer to "disparity" (as correspondence information) but (e.g., in the case of hierarchical video encoding) they may indicate correspondence information like "flow vectors" and/or "motion vectors" (which is also correspondence information). It is noted that the correspondence information (e.g. as obtained at layer 202a and/or layer 205a) may be signaled (encoded) as signaling 206a in the bitstream 10. Accordingly, some amount of correspondences is signaled in the bitstream 10.

Subsequently, a first instantiation 300a of the secondary block 300 may be used to iteratively obtain an encoded version 333a of the first secondary image information 104a. This may be substantially operate like the secondary block 300 of FIG. 1 and, accordingly, the same reference numerals are mostly provided with the addition of "a". It has been noted that, accordingly, it is possible to iteratively obtain the encoded version 333a of the first secondary image information 104a, by using, as initialization states, estimates obtained from the states at the first instantiation 100 of the primary block 100.

After having obtained the encoded version 133 of the primary image information 102 (I-frame) and the encoded version 333a of the first secondary image 104a (P-frame), it is now possible to obtain the encoded version 333b of the second secondary image 104b (B-frame). Basically, the transformation block instantiations 200b and 200c repeat the same of the transformation block 200 of FIG. 1a with different inputs. The elements of block instantiations 200b and 200c are referred to with reference signs which are the same, apart from the last letter indicating "b" for block instantiation 200b and "c" for block instantiation 200c. Basically, the transformation block 200b may simply consider the second secondary image information 104b like the secondary information 104 in FIG. 1a. The same applies to the third instantiation 200c of the transformation block 200, in which the role of the primary image information is taken by the secondary image information 104a and the role of the second image information is taken by the second secondary image information 104b.

Both the instantiations 200b and 200c of the transformation block 200 may result in obtaining correspondence information 206b and 206c (e.g., flow vectors, motion vectors, disparity, etc.) which may be signaled in the bitstream 10 and in the obtainers of estimates of the initialization state for obtaining the second secondary image information 104b. However, there are two different estimates 242b and 242c, since one first estimate (242b) is obtained by taking into account (at 200b) a warping (transformation) between the first image information 102 and the second secondary information 104b, while the other (242c) is obtained by taking into account (at 200c) a warping (transformation) between the first secondary image information 104a and the second secondary information 104b. The same applies to the occlusion information: there is an occlusion information between the primary image information 102 and the second secondary image information 104b (which is the occlusion map M', 226b) and there is an occlusion information (occlusion map M'', 226c) between the first secondary image 104a and a second secondary image information 104b. The merging block 400 may therefore merge together information obtained at the other block instantiations 100, 200a, 300c, 300a, 200b. For example, the estimate 242b of the initialization state for the second secondary image information 104b as obtained from the state of the at least one primary encoding learnable sublayer 120 for the primary image information 102 may be merged together, at layer 480 (state merging block), with the estimate 242c of the initialization state for the at least one encoding learnable sublayer 320c for the second secondary image information 104b as obtained from the state of the first secondary encoding learnable sublayer 320a at the first secondary block 300a analogously. Occlusion information 226b and 226c (as respectively obtained at the occlusion detection layers 224b and 224c (respectively of transformation block 200b and 200c) may be used for the merging. As explained above, a probability related information regarding occlusions may also be included in the occlusion information 226b and 226c. By merging the estimates 242b and 242c (e.g. by using the occlusion information 226b and 226c) the initialization state 242b for block 300c (and for iteratively obtaining the encoding version 333b of the second secondary image information 104b to iterations 151c) may be carried out. The same operations carried out at the state merging block 480 for merging the information 226b, 242b, 242c, 226c may be performed at layer 482 (state merging block) between the information 226b, 232b, 232c and 226c. In particular, at the layer 482 it is possible to merge the estimate 232b of the initialization state for the at least one decoding learnable layer 340c as obtained at block 200b by taking into account the state of the primary image with the second secondary image 104b) and the estimate 232c of the initialization state for the at least one second secondary decoding layer 340c as estimated in block 200c by taking into account the state obtained at block 300a for the first secondary image information 104a warped with the correspondence information of the second secondary image information 104b. At layer 484, it is possible to obtain the reconstructed (warped, estimated) version 222d of the second secondary image information 104b by merging:

a warped (estimated, predicted) version 222b' of the second secondary image information 104b as obtained at warping 220b in block instantiation 200b with a warped (estimated, predicted) version 222b" of the second secondary image information 104b as obtained at warping 220c in block instantiation 200c.

Layer 486 may be used for merging the occlusion information 226b (M') and 226c (M"), thereby obtaining a merged occlusion map (information) 226d. The merged occlusion information 226d may be used (e.g., at scaler 300d') to weight the reconstructed (warped, estimated) version 222d of the second secondary image information 104b through merged occlusion probability values obtained by merging probability values in occlusion map M' (226b) with probability values in occlusion map M" (226c).

After having obtained initialization states 242d and 232d, the reconstructed (estimated, predicted) version 222d of the second secondary image information 104b) and the occlusion map 222b from layers 480, 482, 484, and 486 of block 400, then the second secondary block 300c (encoding the second instance of the secondary block 300 of FIG. 1a) may be used, so as to obtain an encoded version 333b of the second secondary image information 104b.

Figure 10:
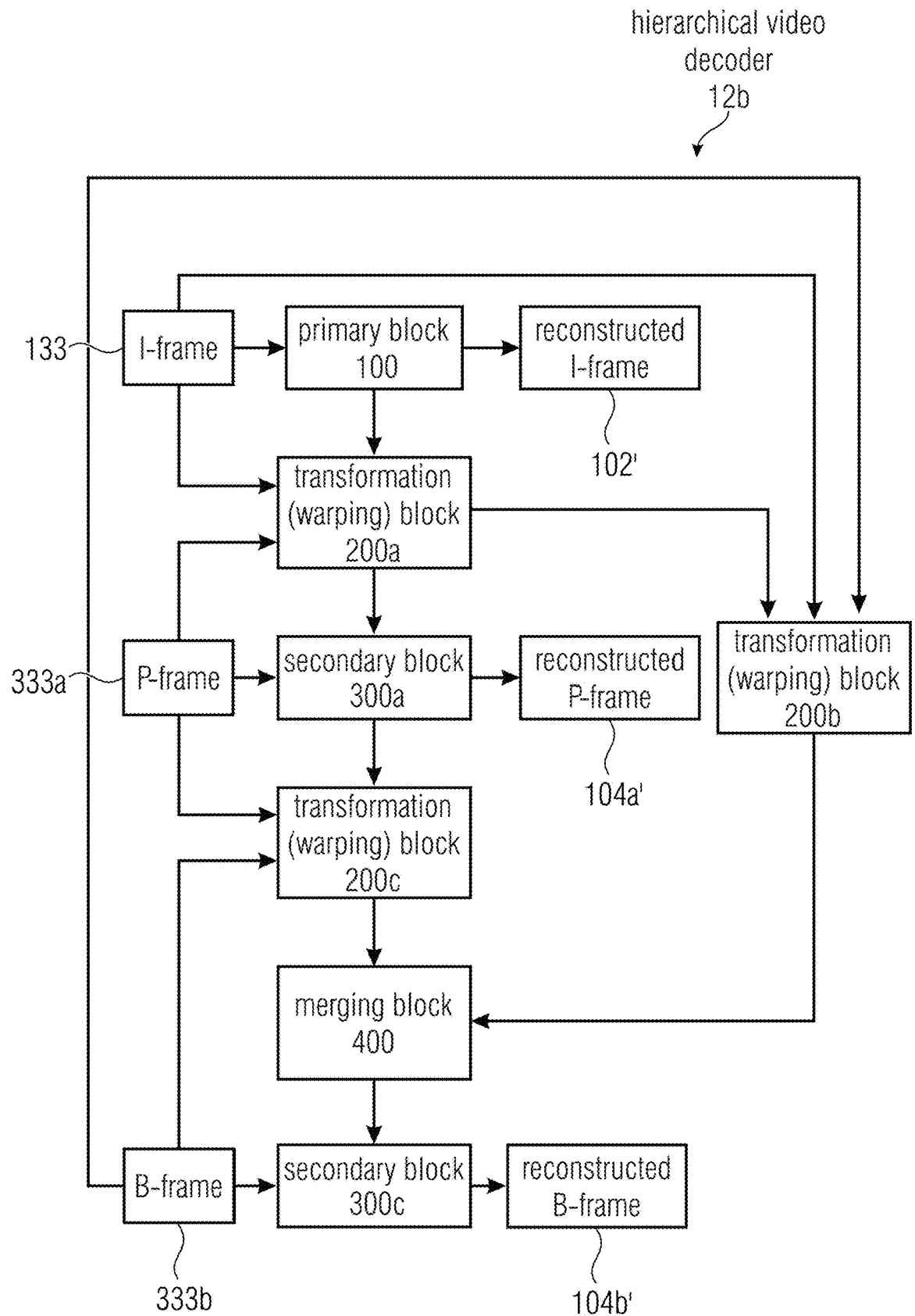
Figure 12A:
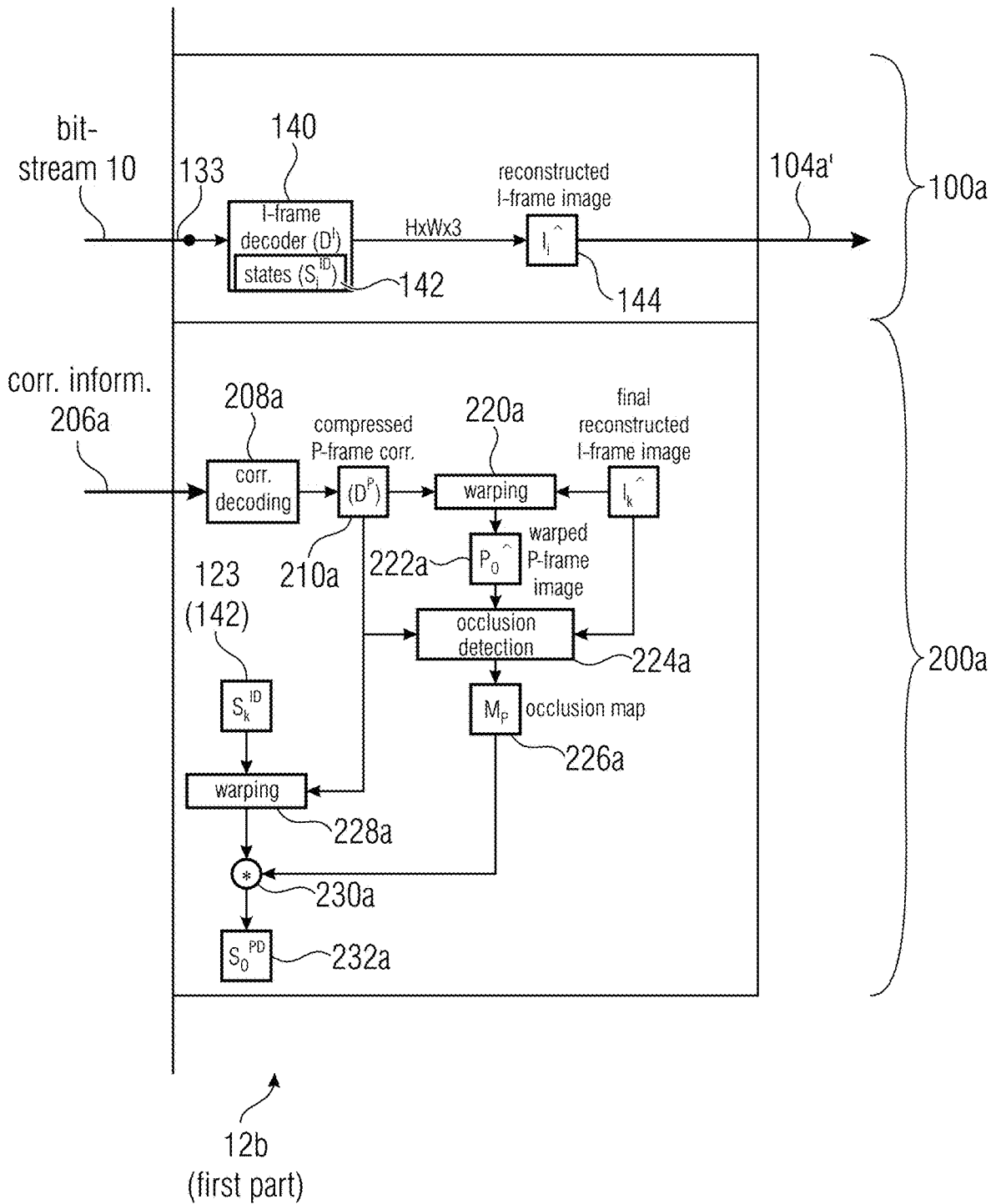
Figure 12B:
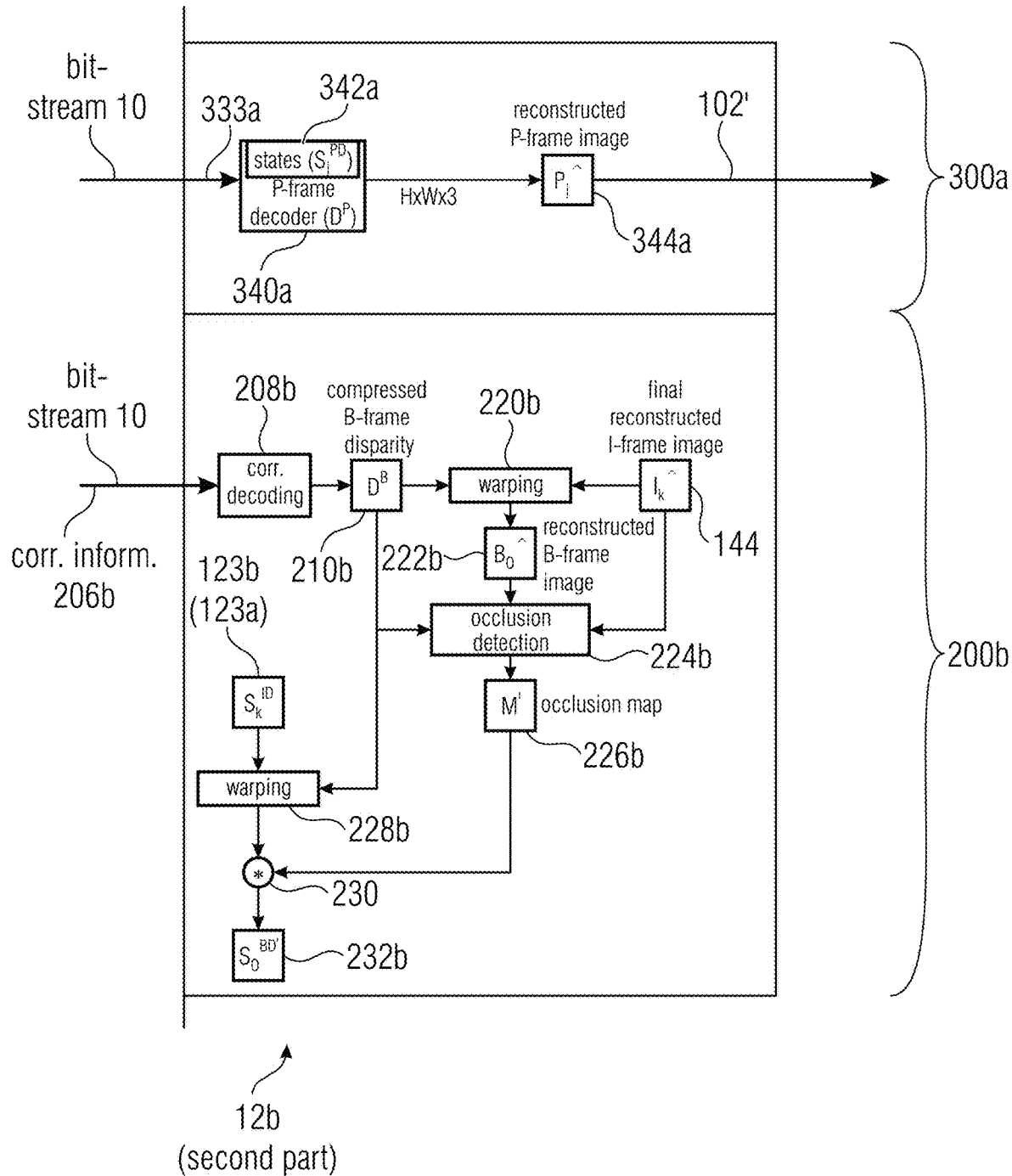
Figure 12C:
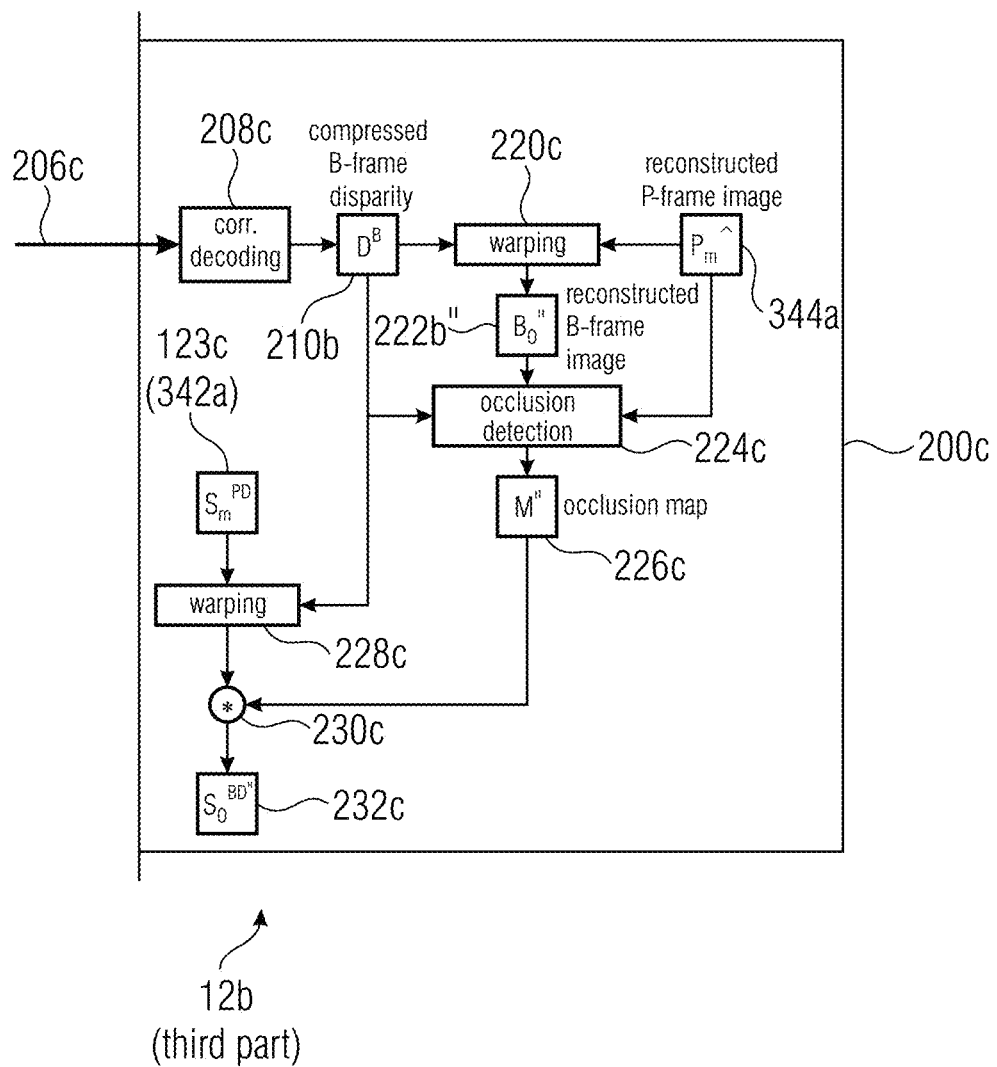
Figure 12D:
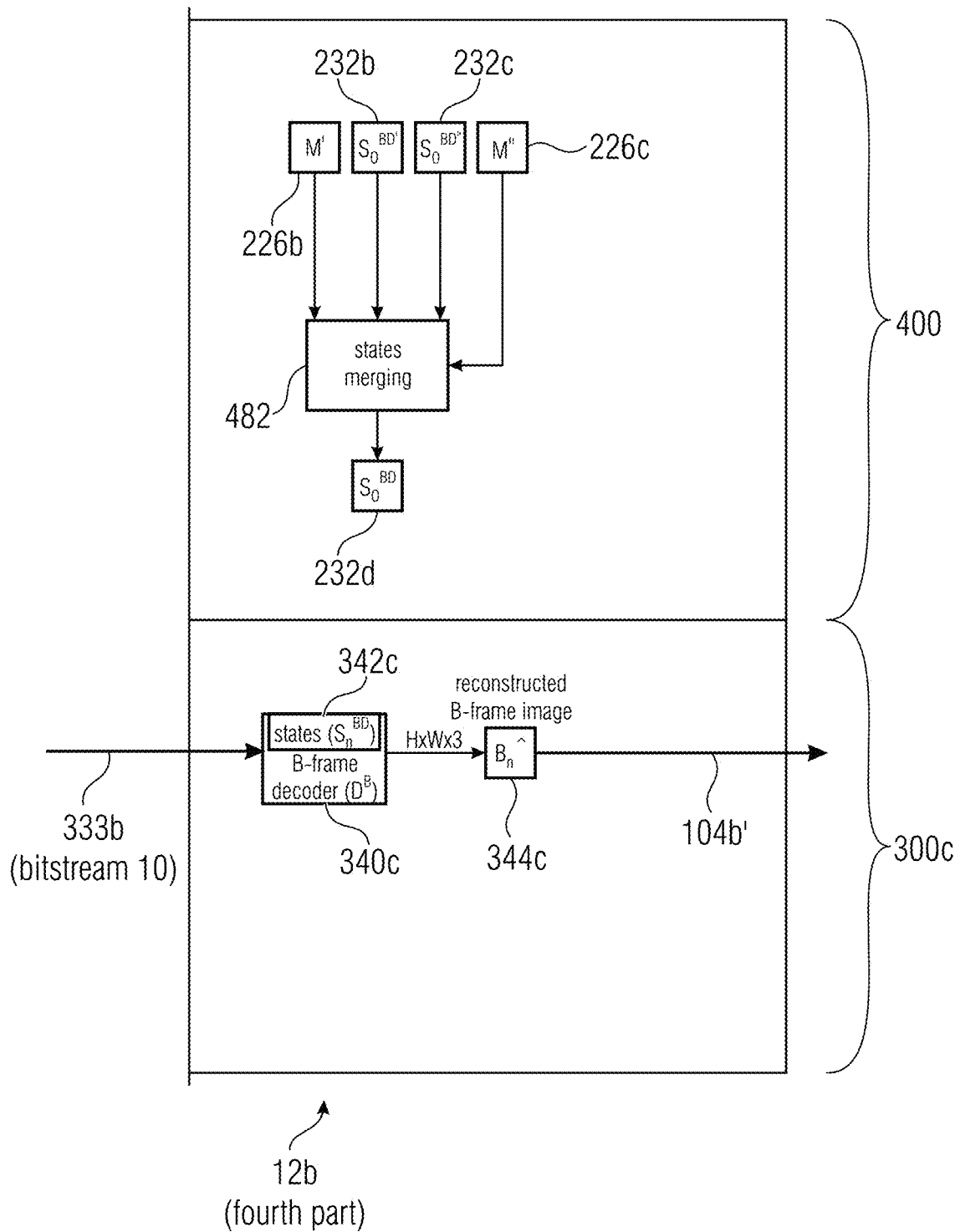

FIGS. 12a-12d show an example of decoder 12b (which is synthesized in FIG. 10). The decoder 12b may include A first instantiation 100 of the primary block iteratively obtaining, from the encoded version 133 of the primary image 102 as written in the bitstream 10, a decoded primary image information 102' (decoded I-frame)

A first instantiation 300a of the secondary block iteratively obtaining, from the encoded version 333a read from the bitstream 10, a decoded first secondary image information 104a' (decoded P-frame)

A second instantiation 300c of the secondary block iteratively obtaining, from the encoded version 333b read from the bitstream 10, a decoded second secondary image information 104b' (decoded B-frame)

A first instantiation 200a of the transformation block obtaining the estimates (232a) of the initialization states ($S_0^{PD}$) for the first instantiation 300a of the secondary block 300

A second instantiation 200b of the transformation block obtaining a first estimate (232b, $S_0^{BD'}$) of the initialization state ($S_0^{BD}$, 232d) for the second instantiation 300c of the secondary block 300

A third instantiation 200c of the transformation block obtaining a second estimate (232c, $S_0^{BD''}$) of the initialization state ($S_0^{BE}$, $S_0^{BD}$, 232d, 242d) for the second instantiation 300c of the secondary block 300

A merging block 400 for merging the estimates (232b, $S_0^{BD'}$, 232c, $S_0^{BD''}$) obtained at the second and third instantiations 200b and 200c of the transformation block 200.

Accordingly, the decoder 12b may obtain the decoded versions 102', 104a', 104b' of the primary image information 102, first secondary image information 104a, and second secondary image information 104b by taking into account, for each secondary image information, state estimations as obtained from the primary block (and, in the case of the second secondary image information, also state estimations from the instantiation 200c of the transformation block).

For the rest, the image encoder 11b may operate exactly as the image decoder 1b of FIG. 1b, and may be implemented with the features obtained for the decoding section (right part) of the image encoder 11b.

It is noted that the encoder 11b and the decoder 12b may also be of the residual type. The only necessity is for the encoder 11b to implement the cycles 920 and 940 of FIG. 9a, and for the decoder 12b to implement the cycles 920b and 940b of FIG. 9b.

In the encoders 1 (FIG. 1a), 9 (FIG. 9a), 11b (FIGS. 10-11d), the initial iteration at the secondary block 300 (or at any instantiation thereof, e.g. 300a, 300c) may perform a residual processing 310 (310a, 310c) obtaining a residual value by comparing the secondary image information 104 (or secondary image information 104a or 104b) with a warped (predicted, reconstructed) version obtained at the primary block 100 or at a preceding instantiation of a secondary block. For example, in FIG. 1a, the initial iteration (j=1) of at the secondary block 300 may imply a comparison (at 310) between the primary image information 102 and the warped (reconstructed, predicted) version 222 of the secondary image information 104 (e.g., as obtained by warping, at 220, the reconstructed version 144, $L_k\hat{}$ of the primary image information 102 by taking into account correspondence information, like the disparity). The warped (reconstructed, predicted) version 222 ($R_0\hat{}$) of the secondary image information 104 may be preventively subjected to occlusion processing for weighting the warped (reconstructed, predicted) version 222 ($R_0\hat{}$) of the secondary image information 104 through the occlusion probability values in the occlusion map 226.

The same applies to the residual image encoder 9 of FIG. 9a.

For the encoder 11b of FIGS. 10-11d:

in FIG. 11b, the initial iteration (j=1) at the first secondary block instantiation 300a may imply a comparison (at 310a') between the first secondary image information 104a (P-frame) and the warped (reconstructed, predicted) version 222a ($P_0\hat{}$) of the first secondary image information 104a (e.g., as obtained by warping, at 220a in FIG. 11a, the reconstructed version 144, $I_k\hat{}$ of the primary image information 102, I-frame, by taking into account correspondence information, like the disparity 210a). The warped (reconstructed, predicted) version 222a of the first secondary image information 104a may be preventively subjected to occlusion processing at 300a' for weighting the warped (reconstructed, predicted) version 222a of the first secondary image information 104a through the occlusion probability values in the occlusion map 226a (so that the initial residual 312a at the initial iteration j=1 in block 300 carries valuable information).

in FIG. 11d, the initial iteration (n=1) at the second secondary block instantiation 300c may imply a comparison (at 310b) between the second secondary image information 104b (B-frame) and the warped (reconstructed, predicted) version 222d ($B_0\hat{}$) of the second secondary image information 104b. The warped (reconstructed, predicted) version 222d of the second secondary image information 104b may be preventively subjected to occlusion processing at 300d' for weighting the warped (reconstructed, predicted) version 222d of the second secondary image information 104b through the occlusion probability values in the occlusion map 226d.

However, the warped (reconstructed, predicted) version 222d ($B_0\hat{}$) of the second secondary image information 104b may be obtained by merging together (e.g., at image merging block 484):
- A first warped (reconstructed, predicted) version 222b' of the second secondary image information 104b as obtained, at 222b (FIG. 11b) by warping the reconstructed version 144 ($I_k\hat{}$) of the primary image 102
- A second warped (reconstructed, predicted) version 222b'' of the second secondary image information 104b as obtained, at 222c (FIG. 11c) by warping the reconstructed version 344a ($P_m\hat{}$) of the first secondary image 104a The occlusion map 226d taken into consideration at 300d' (FIG. 11d) may be an occlusion map obtained by merging (at 484):
- a first occlusion map estimate M' (226b) obtained at occlusion detection block 224b by taking into account at least the reconstructed primary image 144a ($I_k\hat{}$) and correspondence information 210b
- a second occlusion map estimate M'' (226c) obtained at occlusion detection block 224c by taking into account at least the reconstructed first secondary image 344a ($P_m\hat{}$) and correspondence information 210c.

It is noted that in FIGS. 1b, 9b, and 12a-12d there is not shown the iterations of the sublayers 120, 140, since they are internal.

FIGS. 8a and 8b show examples of encoders and decoders as discussed above, and the bitstream writer 1300 for the encoder and the bitstream reader 1300b for the decoder are shown. The bitstream writer 1300 for the encoder and the bitstream reader 1300b may be implemented in any of the encoders and decoders disclosed above and below. The bitstream writer 1300 may, for example, store the bitstream (e.g., in a mass memory) and/or transmit the bitstream 10 (e.g., through electric signals, electromagnetic signals, optical signals, etc.). The bitstream reader 1300b may, for example, read the bitstream 10 (e.g., from a mass memory) and/or receive the bitstream 10 (e.g., through electric signals, electromagnetic signals, optical signals, etc.).

In the present examples, any "binarization" may be generalized to "quantization".

According to examples, the version of the image information (e.g., 102 and 104a, or 104b) may be encoded as the residual 112 (or its quantized version) as iteratively obtained.

Discussion

In this work, we propose an end-to-end trainable recurrent neural network for stereo image compression. Recurrent neural network allows variable compression rates without retraining the networks due to the iterative nature of the recurrent units. At least some of the proposed method leverage the fact that stereo images (e.g. 102, 104) have overlapping fields of view, i.e. mutual (correspondence) information, to reduce the overall bitrate. Each image in the stereo pair may have its separate encoder (e.g. 120 vs 320), decoder (e.g. 140 vs 340), and binarizer network. Each of the encoder (e.g. 120 vs 320) networks and decoder (e.g. 140 vs 340) networks contain a hidden state (or memory). We propose to warp the hidden state information of the left (primary) image encoder/decoder network to the right (secondary) image encoder/decoder network to share the mutual information between networks. Moreover, we also improve the quality of the shared mutual (correspondence) information by eliminating wrong information using the occlusion maps (e.g. 226).

Many applications use a stereo vision system, such as autonomous vehicles, industrial automation and 3D movies. Most of these applications acquire and store a massive amount of information, which needs a good image compression ensuring efficient use of memory. A straightforward approach would be to compress images from each camera (or camera position) separately. However, this will not exploit the condition that both cameras (or camera positions) have an overlapping field of view, which means redundant information. Hence, a higher compression rate is achievable using a compression technique utilizing the mutual (correspondence) information of the images (or more in general image information, such as primary image information 102 and secondary image information 104). Therefore, we propose a recurrent neural network-based stereo image compression technique (or more in general a learnable technique, or even more in general a technique) with variable compression rates during deployment without retraining the network (i.e., each network trained only once).

We are addressing the problem of compressing a pair of stereo images. Intuitively, the overlapping region between stereo images decreases the bitrate of the combined latent code compared to the sum of the bitrates of individually compressed stereo images.

Let us denote L and R as a pair of rectified stereo images and let H(L, R) be the entropy of the stereo pair, H(L) the entropy of the left image, and H(R) the entropy of the right image. Given that the content of the two images have correlation, $$H(L)+H(R) \geq H(L,R)$$

Based on this observation, we propose a compression method that jointly compresses the two stereo images. First, we compress one of the images independently and extract maximum information from this image to compress the second image with reduced bitrate or better quality. FIG. 1 shows the proposed algorithm block diagram. The proposed method is a two-stream deep encoder-decoder network utilizing recurrent layers (i.e., ConvLSTM or GRU). Each image in a stereo pair utilizes a separate encoder/binarizer and decoder set to get a binarized latent code and reconstruct the image back using this latent code, respectively. Pseudo code of the encoding process of the proposed stereo image compression algorithm is explained in FIG. 2.

The proposed method may use the same network for the encoder, decoder and binarizer functions presented in the recurrent neural network-based single-image compression. Recurrent neural networks (RNNs) and other recurrent layers are very effective for sequential data. In a traditional neural network, we consider all inputs (or outputs) as independent of each other. In many cases, this assumption is not valid such as for language tasks and stock predictions. However, RNNs carry out the same calculation for each input of a sequence depending on the output of the previous computations. In other words, we can say that they have a "memory/state" to keep track of the information of the past iterations.

In FIG. 4a, we present a basic RNN (vanilla RNN) unrolled for different elements of the input sequence. Here, $x_i$ is the input tensor at time step (e.g. iteration) i. $S_i$ is the hidden state at time step i. It is also called the "memory" of the network calculated using the previous hidden state and the current time step input: $S_i = f(U \odot x_i + W \odot S_{i-1})$. $o_i$ is the output of the network ($o_i = f(V \odot S_i)$). U, V and W are learnable parameters of the networks represented as tensors. $\odot$ defines the pointwise (entrywise) multiplication. The function $f$ usually is a non-linear activation function. There are many variants of RNNs, such as ConvLSTM, GRU, Residual GRU, etc.

As shown in FIG. 3a, the input images (or more in general primary/secondary image information 102/104) are first encoded using an encoder network (E) and then transformed into binary codes using a binarizer network (B); that can be stored or transmitted to the decoder. The decoder network (D) then reconstructs the input image based on the received binary codes. Since the proposed method encoder and decoder networks are built using recurrent units, the whole method is iterative in nature.

The encoder network 120, 320 may consist of (or at least comprise) one convolutional layer 422 and/or three recurrent sublayers 424, 426, 428 (different numbers of layers may be possible). The input of the encoder network may be the RGB color image (or more in general primary (/secondary image information 102/104). Each encoder sublayer 424, 426, 428 may decrease the size of the image e.g. by factor 2 (different factors may also be chosen). Therefore, the output dimensions of the encoder may result 16 times smaller than the original input image (or more in general primary/secondary image information 102/104). Similarly, the decoder network 140, 340 may consist of (or at least comprise) two (or a different number of) convolutional layers and four (or a different number of) RNN layers (or other learnable layers, or more in general layers). The output of each RNN unit (or other learnable layer, or more in general layer) in the decoder network 140, 340 may be spatially upsampled using a depth to space layer, which e.g. rearranges data from channel dimension into the spatial dimension. The final output of the decoder network (or other learnable layer, or more in general layer) 140, 340 may be the reconstructed input image 144, 344.

On the other hand, the binarizer 130, 330 may be a one-layer convolutional neural network (other techniques are possible). The task of the binarizer 130, 330 may be to first generate the required number of outputs (equals to the desired number of output bits) in the continuous interval [−1, 1]. Then, this real-valued representation may be converted into a discrete output using a differentiable rounding function (e.g. like [9], [10], but other implementations are possible) containing only two values {−1, 1}. For example, in FIG. 3a an H×W×3 image compress into an H/16×W/16×32 binarized representation per iteration. This results in $$\frac{1}{16^2} \cdot 32 = \frac{1}{8} \text{bits per pixel (bpp)}$$

for each iteration. If we only consider the initial iteration, then the compression ratio is 192:1

$$\left( \frac{\text{Input bits}}{\text{compressed bits}} = \frac{H \times W \times 3 \times 8}{\frac{H}{16} \times \frac{W}{16} \times 32} \right).$$

In each iteration, there may be provided the residual information as input to the encoder, i.e. the difference between the original image (or more in general primary/secondary image information 102/104) and the previously reconstructed image from the decoder 140, 340. With each iteration, there may be increased the total number of bits as well as improved the overall quality of the reconstructed image. Mathematically, the single iteration of the network shown in FIG. 3a is represented as:

$$b_i = B(E(r_i)), I_i^{[<]BEGINITALm} = D(b_i)$$

$$r_i = I - I_{i-1}^{[<]BEGINITALm}, r_0 = I$$

$$S_0^E = 0, S_0^D = 0$$

where E and D represent the encoder function of the sublayer 120 or 320 and the decoder function of the sublayer 140, 340 with their states $S_i^E$ and $S_i^D$ for the $i^{th}$ iteration. $b_i$ represents the binary codes for the $i^{th}$ iteration. $I_i^{[<]BEGINITALm}$ is the reconstructed input image and $r_i$ is the residual between the input image I and the reconstructed image $I_i^{[<]BEGINITALm}$. In every iteration, a binarized bit stream $b_i \in \{-1, 1\}^n$ is produced, where n is the total number of bits per iteration.

To propagate the information from the left image's encoder/decoder to the right image's encoder/decoder (or from the primary image information 102 to the secondary image information 104)), there may be proposed to use a disparity-based warping of the states (i.e., hidden states, e.g. for GRU and/or hidden and/or cell states in the case of ConvLSTM) of the recurrent components. Based on the correlation between stereo images (or more in general primary/secondary image information 102/104), warping (e.g. at block 200) is the process that transforms or shifts the pixels (or more in general entries) of an image (or more in general primary image information 102) in a certain way to align it to the pixels (or more in general entries) of the other image (or more in general secondary image information 104). In disparity-based warping, pixel location differences (disparities) between the matching pixels (or more in general entries) of the two images (or more in general primary/secondary image information 102/104) may be processed and utilized to generate the other image (or more in general secondary image information 104) using one of the images (or more in general primary image information 102). The disparities are examples of correspondence information.

Figure 5:
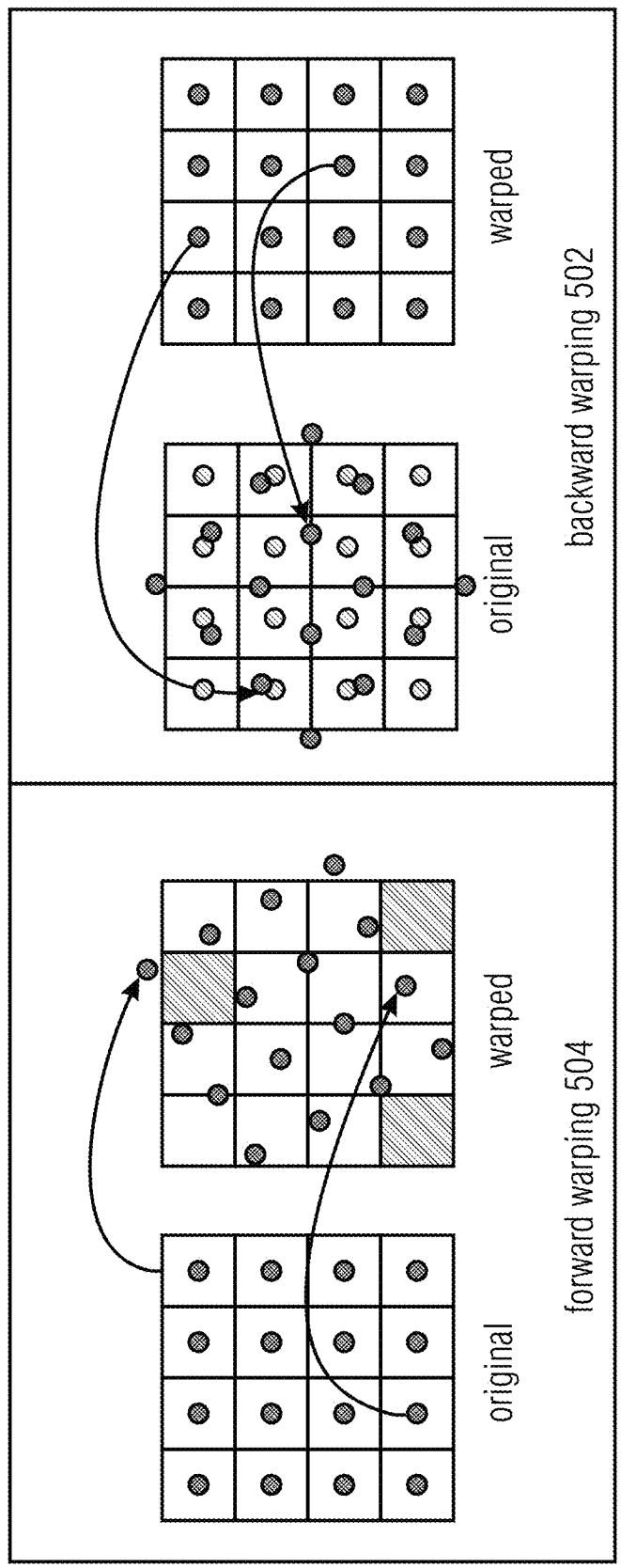
FIG. 5 shows a difference between forward warping and backward warping.

There are two principal ways to perform image warping, forward warping, and backward warping 502, shown in FIG. 5. In forward warping 504, for each pixel position of the source image, the corresponding intensity value is stored in the target image at the location equal to the sum of source pixel location and disparity. However, this operation may create holes in the warped image because not all pixels (or more in general entries) in the target image will get a value due to the discrete nature of pixel images. Moreover, some pixels can be assigned several times. On the other hand, backward warping solves this problem by finding a coordinate value in the source image for every pixel position of the target image and use its intensity values to generate the target image.

We know that the output of the recurrent unit is dependent on the state variables and the current input. We assume to utilize the correlation between the stereo pairs by sharing the states of all RNN layers of the encoder and decoder network. As a result, we decrease the joint bitrate across the stereo pair. First, we estimate the disparity of the right image (or more in general secondary image information 104) using a disparity estimation method and compress it e.g. using the JPEG2000 codec [8]. As shown in FIG. 1, after fully encoding the left image (or more in general primary image information 102), we use the compressed right image (or more in general secondary image information 104) disparity to backward warp the states of each recurrent layer in the left encoder/decoder network. Then, set it as the initialization states of the right encoder/decoder network. The states are of different sizes because of the downsampling and upsampling in the encoder and decoder network. Therefore, we may resize and scale the disparity maps accordingly using bilinear interpolation. These better-initialized hidden states (not zero-initialized, as we did for the left image, (or more in general primary image information 102, encoder/decoder network) will prove instrumental for efficient encoding and decoding of the right image (or more in general secondary image information 104). Moreover, we also warp the final left reconstructed image and use it as an initial estimation to compress the right input image, see step 2 in FIG. 1a.

In particular in stereo images, maybe some regions of the scene are only visible in one of the images. This phenomenon is known as occlusion. These occluded regions are theoretically not possible to reconstruct using the warping operation because of no correspondence. After experimentation, we figured out that the wrong information in the occluded areas because of the bilinear warping function restricts the right image networks from efficiently utilizing the mutual information. To solve this issue, it may be useful to generate an occlusion map 226 to remove the outliers from the warped information. There could be multiple ways to detect the occlusion maps. For example, we can forward warp the right disparity to compute a disparity map for the left image. Then in the backward warping, we detect occluded regions by checking that the warped disparity equals the warping disparity or not. However, it may be useful to use a convolutional neural network, as shown in FIG. 6. The input of the presented occlusion detection network is the final reconstructed left image (or more in general the reconstructed information 144), warped reconstructed right image (or more in general the warped information 222), and the compressed right image disparity (210). Since all of these inputs are available (e.g. to the decoder network), there is no need to encode or compress the occlusion maps. One can also propose to use other methods to generate the occlusion maps. We train the proposed occlusion network in conjunction with the loss of the right image network without any direct supervision. In FIG. 7, we show the effect of using the occlusion map 226 on reconstructed image quality. It is visible from the visual results that the result of the method without occlusion map weighting suffers in the occluded regions. On the other hand, the proposed method incorporated with occlusion maps generates a better result. FIG. 7 shows the reconstructed image (first row) and its zoomed-in region (bottom row) estimated using the method with (first column) and without (second column) occlusion map. Ground-truth image with its zoomed-in region is presented in the third column. The last column shows the estimated occlusion map and its zoomed-in region. Here, black regions in the occlusion map show the detected occluded areas. The bits per pixel (bpp) of each image shown here is 0.155 bpp.

Important contributions of this work include:
1—We introduce the first neural network-based technique for stereo image compression with variable compression rates without retraining the network
2—Other than warping the decoded left image (or other primary image information 102) using the right image compressed disparity, we also proposed to share the states of recurrent layers from the left image networks (or other primary image sublayer) to propagate the mutual (correspondence) information to right image networks (or other primary image sublayer).
3—We utilize a convolutional neural network (or technique) to predict occlusion maps to remove wrong information from occluded regions A design of the proposed technique is to compress images (or image information) with correlation (or overlapping field of view). A practical application is not limited to just stereo image compression. We can utilize it for video compression, multi-view image compression, and light-field compression as well. For example, we can adapt it for video compression using hierarchical coding (e.g. FIGS. 11a-11d). We start by compressing the reference frame of the video (I-frame) using the first image encoder/decoder networks. We can then encode the remaining video frames (P-frames and B-frames) using the second image encoder/decoder network initialized with the states warped from the reference frame networks. Since B-frames can refer to both past and future frames, we can merge the warped hidden states from both frame's networks. Referring to more than one frame can also provide correspondences for the occluded pixels in other images. Moreover, instead of disparity-based warping of image and state, for video compression we will require a motion estimation and compensation method to share the information.

Likewise, we can extend the method for multi-view or light-field compression as well. One possible way is to first compress the middle view of the light-field like we compress the left image in the stereo pair. We can then use its warped states with a second encoder/decoder network to encode the corner views. For each corner view, the initial state is obtained by warping it from the middle view. Similarly, we can move on to the compression of the other views in the light-field by utilizing the warped states of the already compressed views and merging multiple source views and states for a given target view. It means that we can customize the proposed method for any compression application that requires the compression of more than one image with correlation in between.

Therefore, in an image encoder (1), a primary block (100) encodes a primary image information, and a secondary block (300) encodes a secondary image information. States for the primary block are transformed onto states for the secondary block at a transformation block (200), which keeps into account correspondence information (e.g. disparity information) between the first image information and the second image information. In an image decoder (1b), a primary block (100) decodes an encoded version of a primary image information, and a secondary block (300) encodes an encoded version of a secondary image information. States for the primary block are transformed onto states for the secondary block at a transformation block (200), which keeps into account correspondence information (e.g. disparity information) between the first image information and the second image information.

Further Characterization of the Figures

FIG. 1a: A complete encoder block diagram of the proposed stereo image compression method. It consists of three major steps as shown in the figure. The components on the right side of the dotted lines separately act as a decoder block diagram.

FIG. 2: Pseudo code of the proposed RNN-Based stereo image compression method. (Encoder)

FIG. 3a: Architecture of the encoder, decoder, and binarizer network used in examples. A possible spatial extent of the input-vector convolutional kernel along with the output depth is written below the name of each layer. For example, the first layer of encoder E-Conv filter size may be 3×3, 64 is the depth of the output.

FIG. 4a: A recurrent neural network and the unfolding in time of the computation involved in its forward computation. Source: Nature FIG. 5: Forward and backward image warping. In forward warping, holes are created in the warped image, marked as gray color. Backward warping solves this problem by calculating the intensity value of the not coinciding pixel coordinates from the original image using an interpolation scheme.

FIG. 6: Occlusion detection network using the inputs available at the decoder side.

Further Examples

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer. A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are merely illustrative for the principles discussed above. It is understood that modifications and variations of the arrangements and the details described herein will be apparent. It is the intent, therefore, to be limited by the scope of the claims and not by the specific details presented by way of description and explanation of the examples herein.

Equal or equivalent elements or elements with equal or equivalent functionality are denoted in the following description by equal or equivalent reference numerals even if occurring in different figures.

The invention claimed is:

1. An image decoder circuitry for decoding, from a bitstream, a plurality of images represented by at least:
  encoded primary image information on a subject along a first primary image information dimension, a second primary image information dimension, and a number of channels equal to or greater than 1,
  secondary image information on the same subject along a first secondary image information dimension, a second secondary image information dimension, and a number of channels equal to or greater than 1,
  wherein the secondary image information and the primary image information are associated with each other through correspondence information,
  wherein the image decoder circuitry comprises a bitstream reader configured to read, from the bitstream, the encoded primary image information and the encoded secondary image information,
  the image decoder circuitry further comprising:
  a primary block circuitry configured to obtain a decoded version of the primary image information by iteratively applying, to the encoded primary image information, a primary layer which includes at least one primary sublayer;
  a secondary block circuitry configured to obtain a decoded version of the secondary image information by iteratively applying, to the encoded secondary image, a secondary layer which includes at least one secondary sublayer,
  wherein at each iteration each of at least one primary sublayer and at least one secondary sublayer has an input, an output and a state,
  so that at the initial iteration each of the at least one primary sublayer and of the at least one secondary sublayer generates the state based on at least the initialization state, and
  at each iteration subsequent to the initial iteration, each of the at least one primary sublayer and at least one secondary sublayer provides the current output based on at least the current state or the preceding state, and updates the current state based on at least the preceding state and on the current input,
  wherein the initialization state of the at least one primary sublayer is a default state, wherein the image decoder circuitry further comprises a transformation block circuitry for transforming, through a transformation based on the correspondence information, a state of at least one primary sublayer onto an estimate of a state of the at least one secondary sublayer, so as to derive a state of the at least one secondary sublayer from the estimate.

2. The image decoder of claim 1, wherein the estimate of the state of the at least one secondary sublayer is an estimate of an initialization state of the at least one secondary sublayer, so as to provide the initialization state of the at least one secondary sublayer.

3. The image decoder of claim 1, wherein the at least one primary sublayer includes:
   at least one primary decoding sublayer, iteratively outputting intermediate decoded versions of the encoded versions of the primary image information, or processed or quantized versions thereof,
   wherein the at least one secondary sublayer includes:
   at least one secondary decoding sublayer, iteratively outputting intermediate decoded versions of the encoded versions of the secondary image information, or processed and/or quantized versions thereof.

4. The image decoder of claim 3, wherein:
   at least one primary decoding sublayer is configured to generate the current output which has the first and second primary image information dimensions upsampled, but with a smaller number of channels, with respect to the current input, or is connected to at least one upsample sublayer configured to perform an upsampling which increases the extension of the first and second dimensions but decreases the number of channels, or
   at least one secondary decoding sublayer is configured to generate the current output which has the first and second secondary image information dimensions upsampled, but with a smaller number of channels, with respect to the current input, or is connected to at least one upsample sublayer configured to perform an upsampling which increases the extension of the first and second secondary image information dimensions but decreases the number of channels.

5. The image decoder of claim 3, wherein each of the decoded version of the primary image information at the output of the at least one primary decoding sublayer and the decoded version of the secondary image information at the output of the at least one secondary decoding sublayer represent at least one image, the at least one primary sublayer and the at least secondary sublayer being applied to iteratively reconstruct the at least one image.

6. The image decoder of claim 1, wherein the decoded versions of the first and second primary image information at the output of the at least one primary and secondary decoding sublayer represent a primary and a secondary residual image information, respectively, from which the primary and secondary image information is reconstructed iteratively, respectively, in such a way that:
   at the initial iteration, the reconstructed primary and secondary image information correspond to the primary and secondary residual image information, respectively,
   at each of the subsequent iterations, the reconstructed primary and secondary image information are obtained from the primary and secondary decoded residual image information and the previously reconstructed image information, respectively.

7. The image decoder of claim 1, wherein at least one primary sublayer and/or at least one secondary sublayer is configured to iteratively generate the current output by mapping:
   at least the initialization state onto a current state, through at least a state-to-state parameter applied to the initialization state, at the first iteration;
   a current input and/or at least the state of the preceding iteration onto a current state through an input-to-state parameter applied to the current input and the state-to-state parameter applied to the preceding state, at any subsequent iteration;
   at least the preceding state or at least the current state onto a current output through at least one state-to-output parameter applied to the preceding state or at least the current state.

8. The image decoder of claim 7, wherein at least one of the input-to-state parameter, the state-to-state parameter, and the state-to-output parameter is a learnable parameter.

9. The image decoder of claim 1, the image decoder having pre-defined default values for the state of the at least one secondary sublayer, the transformation block circuitry being configured to evaluate occlusion probabilities of entries of the primary image information and/or of entries of the secondary image information, so as to generate values of entries of the state of the at least one secondary sublayer in such a way that the entries with higher occlusion probability have values closer to the pre-defined default values than entries with lower occlusion probability, which have values closer to the estimate of the state of the at least one secondary sublayer.

10. The image of claim 1, wherein the transformation block circuitry is configured to transform the current state of the at least one primary sublayer onto the estimate of the state of the at least one secondary sublayer through an association of entries in the estimate of the state of the at least one secondary sublayer with entries in the current state of the at least one primary sublayer by using the correspondence information between the primary image information and the secondary image information.

11. The image decoder of claim 1, configured to process the correspondence information in form of disparity between the entries of the primary image information and the entries of the secondary image information.

12. The image decoder according claim 1, configured to process correspondence information in form of flow vector values or motion vector values between the entries of the primary image information and the entries of the secondary image information.

13. The image decoder of claim 1,
   wherein the primary image information includes primary image information which is a reference image information,
   wherein the secondary image information includes:
   a first secondary image information including visual information on a first secondary image, and
   a second secondary image information including visual information on a second secondary image,
   wherein the primary block circuitry is instantiated to iteratively obtain the encoded version of the primary image information from an encoded version of the primary image information,
   wherein the secondary block circuitry is instantiated by:
   a first secondary block circuitry instantiation for iteratively obtaining, from an encoded version of the first secondary image information, the decoded version of the first secondary image information through at least one first secondary sublayer; and a second secondary block circuitry instantiation for obtaining, from an encoded version of the second secondary image information, the decoded version of the second secondary image information through at least one second secondary sublayer;

wherein the transformation block circuitry is instantiated by:

a first transformation block circuitry instantiation to transform, through correspondence information between the primary image information and the first secondary image information, a state of the at least one primary sublayer onto an estimate of the state of the at least one first secondary sublayer;

a second transformation block circuitry instantiation to transform, through correspondence information between the primary image information and the second secondary image information, a state of the at least one primary sublayer onto a first estimate of a state of the at least one second secondary sublayer;

a third transformation block circuitry instantiation to transform, through correspondence information between the first secondary image information and the second secondary image information, a state of the at least one first secondary sublayer onto a second estimate of the state of the at least one second secondary sublayer, the image decoder further comprising a merging layer configured to merge the first estimate of the state of the at least one second secondary sublayer with the second estimate of the state of the at least one second secondary sublayer, to obtain the estimate of the state of the at least one second secondary sublayer.

14. An image encoder circuitry for encoding, in a bitstream, a plurality of images represented by at least:

primary image information on a subject along a first primary image information dimension, a second primary image information dimension, and a number of channels equal to or greater than 1, secondary image information on the same subject along a first secondary image information dimension, a second secondary image information dimension, and a number of channels equal to or greater than 1, wherein the secondary image information and the primary image information are associated with each other through correspondence information, the image encoder circuitry comprising:

a primary block circuitry configured to obtain an encoded version of the primary image information, or processed version thereof, by iteratively applying a primary layer which includes at least one primary sublayer;

a secondary block circuitry configured to obtain an encoded version of the secondary image information, or processed version thereof, by iteratively applying a secondary layer which includes at least one secondary sublayer, wherein at each iteration each of at least one primary sublayer and at least one secondary sublayer has a current input, a current output and a current state, so that, at an initial iteration, each of the at least one primary sublayer and of the at least one secondary sublayer generates the current state based on at least the initialization state, and at each iteration subsequent to the initial iteration, each of the at least one primary sublayer and at least one secondary sublayer provides the current output based at least on the current state or the preceding state, and updates the current state based on at least the preceding state and on the current input, wherein the initialization state of the at least one primary sublayer is a default state, wherein the image encoder circuitry further comprises a transformation block circuitry for transforming, through a transformation based on the correspondence information, a current state of at least one primary sublayer onto an estimate of a state of the at least one secondary sublayer, so as to obtain the state of the at least one secondary sublayer, wherein the image encoder circuitry further comprises a bitstream writer configured to write, in the bitstream, the encoded version of the primary image information, or processed version thereof, and the encoded version of the secondary image information, or processed version thereof.

15. The image encoder of claim 14, wherein the at least one primary sublayer includes:

at least one primary information encoding sublayer iteratively outputting intermediate encoded versions of the primary image information, or processed version thereof; and at least one primary information decoding sublayer, iteratively outputting intermediate decoded versions of the encoded versions of the primary image information, or processed version thereof, wherein the at least one secondary sublayer includes:

at least one secondary information encoding sublayer iteratively outputting intermediate encoded versions of the secondary image information, or processed version thereof; and at least one secondary information decoding sublayer, iteratively outputting intermediate decoded versions of the encoded versions of the secondary image information, or processed version thereof.

16. The image encoder of claim 14, wherein:

the primary block circuitry includes a primary comparison block circuitry configured to iteratively compare the primary image information with the intermediate decoded versions, or processed versions thereof, to obtain a primary residual, thereby inputting, to the at least one primary sublayer, the primary residual or a processed version thereof, and/or the secondary block circuitry includes a secondary comparison block circuitry configured to iteratively compare the secondary image information with the intermediate decoded versions, or processed versions thereof, to obtain a secondary residual, thereby inputting, in the at least one secondary sublayer, the secondary residual or a processed version thereof.

17. The image encoder of claim 15, wherein:

the primary block circuitry includes, interposed between the at least one primary information encoding sublayer and the at least one primary information decoding sublayer, a primary quantizer to iteratively provide quantized versions of the intermediate encoded versions of the primary image information so that the quantized versions of the intermediate encoded versions of the primary image information, or processed versions thereof, are represented in binary, wherein the at least one primary image decoding sublayer is iteratively inputted with the quantized versions, or processed versions thereof, of the intermediate encoded versions of the primary image information, or processed versions thereof; and/or the secondary block circuitry includes, between the at least one secondary information encoding sublayer and the at least one secondary information decoding sublayer, a secondary quantizer to iteratively provide quantized versions of the intermediate encoded versions of the secondary image information, or processed versions thereof, so that the quantized versions of the intermediate encoded versions of the secondary image information, or processed versions thereof, are represented in binary, wherein the at least one secondary information decoding sublayer is iteratively inputted with the quantized versions, or processed versions thereof, of the intermediate encoded versions of the secondary image information, or processed versions thereof.

18. The image encoder of claim 14, wherein at least one of the primary quantizer and the secondary quantizer is a convolutional sublayer without state.

19. The image encoder of claim 15, wherein:
at least one primary information encoding sublayer is configured to generate the current output which has the first and second primary image information dimensions downsampled, but with a greater number of channels, with respect to the current input, or is connected to at least one downsample sublayer configured to perform a downsampling which reduces the extension of the first and second primary image information dimensions but increases the number of channels; and/or
at least one secondary information decoding sublayer is configured to generate the current output which has the first and second secondary image information dimensions upsampled, but with a smaller number of channels, with respect to the current input, or is connected to at least one upsample sublayer configured to perform an upsampling which increases the extension of the first and second secondary image information dimensions but decreases the number of channels.

20. The image encoder of claim 14, wherein at least one primary sublayer and/or at least one secondary sublayer is configured to iteratively generate the current output by mapping:
at least the initialization state onto a current state, through at least a state-to-state parameter applied to the initialization state, at the initial iteration;
a current input and/or at least the state of the preceding iteration onto a current state through an input-to-state parameter applied to the current input and the state-to-state parameter applied to the preceding state, at any subsequent iteration;
at least the preceding state or at least the current state onto a current output through at least one state-to-output parameter applied to the preceding state or at least the current state.

21. The image encoder of claim 14, wherein at least one of the input-to-state parameter, the state-to-state parameter, and the state-to-output parameter is a learnable parameter.

22. The image encoder of claim 14, the image encoder having pre-defined default values for the state of the at least one secondary sublayer, the image encoder being configured to evaluate occlusion probabilities of entries of the primary image information and/or of entries of the secondary image information, so as to generate values of entries of the state of the at least one secondary sublayer in such a way that entries with higher occlusion probability have values closer to the pre-defined default values than entries with lower occlusion probability, which have values closer to the estimate of the state of the at least one secondary sublayer.

23. The image encoder of claim 14, wherein the transformation block circuitry is configured to transform the current state of the at least one primary sublayer onto the estimate through at least an association of entries in the estimate of the state of the at least one secondary sublayer with entries in the current state of the at least one primary sublayer by using correspondence information between the primary image information and the secondary image information.

24. The image encoder of claim 14, configured to apply similarity metrics between the primary image information or a processed version thereof, and the secondary image information or a processed version thereof, to thereby process correspondence information in form of disparity values between at least the entries of the primary image information and the entries of at least the secondary image information or a processed version thereof.

25. The image encoder of claim 14, configured to apply similarity metrics between the primary image information or a processed version thereof, and the secondary image information or a processed version thereof, to thereby process correspondence information in form of flow vector values or motion vector values between the entries of at least the primary image information and the entries of at least the secondary image information.

26. The image encoder of claim 14, wherein the primary image information, or a processed version thereof, provides information on a primary image, and the secondary image information, or a processed version thereof, provides information on a secondary image of the some subject.

27. The image encoder of claim 14,
wherein the primary image information includes primary image information which is a reference image information,
wherein the secondary image information includes:
a first secondary image information including visual information on a first secondary image, and
a second secondary image information including visual information on a second secondary image,
wherein the primary block circuitry is instantiated to iteratively obtain the encoded version of the primary image information,
wherein the secondary block circuitry is instantiated by:
a first secondary block circuitry instantiation for iteratively obtaining the encoded version of the first secondary image information through at least one first secondary sublayer; and
a second secondary block circuitry instantiation for obtaining the encoded version of the second secondary image information through at least one second secondary sublayer;
wherein the transformation block circuitry is instantiated by:
a first transformation block circuitry instantiation to transform, through correspondence information between the primary image information and the first secondary image information, a state of the at least one primary sublayer onto an estimate of the state of the at least one first secondary sublayer;
a second transformation block circuitry instantiation to transform, through correspondence information between the primary image information and the second secondary image information, a state of the at least one primary sublayer onto a first estimate of an state of the at least one second secondary sublayer;
a third transformation block circuitry instantiation to transform, through correspondence information between the first secondary image information and the second secondary image information, a state of the at least one first secondary sublayer onto a second estimate of the state of the at least one second secondary sublayer, the image decoder further comprising a merging layer configured to merge the first estimate of the state of the at least one second secondary sublayer with the second estimate of the state of the at least one second secondary sublayer, to obtain the estimate of the state of the at least one second secondary sublayer.

28. The image encoder of claim 14, configured to obtain an estimated version of the secondary image information which keeps into account the correspondence information between the entries in the primary image information and the entries in the secondary image information, wherein the secondary block circuitry includes a secondary comparison block circuitry configured to iteratively compare the secondary image information with the intermediate decoded versions to obtain a residual, wherein, at the initial iteration, the secondary comparison block circuitry is inputted with the estimated version of the secondary image information, so as to obtain an initial residual which is obtained from the comparison between the secondary image information and the estimated version of the secondary image information.

29. The image encoder of claim 14, wherein the secondary block circuitry is configured so that the entries of the estimated version of the secondary image information, or a processed version thereof, are conditioned by occlusion probabilities, in such a way that entries with comparatively high occlusion probability have values closer to a default value than entries with comparatively low occlusion probability.

30. The image encoder of claim 14, wherein the at least one primary sublayer and/or at least one secondary sublayer is a learnable sublayer.

31. The image encoder of claim 15, wherein each of the decoded version of the primary image information, or a processed version thereof, at the output of the at least one primary information decoding sublayer and the decoded version of the secondary image information, or a processed version thereof, at the output of the at least one secondary information decoding sublayer represents at least one image, the at least one primary sublayer and the at least secondary sublayer being applied to iteratively reconstruct the at least one image.

32. The image encoder of claim 14, wherein the decoded versions of the primary and secondary image information at the output of the at least one primary and secondary decoding sublayer represent a primary and a secondary residual image information, respectively, from which the primary and secondary image information is reconstructed iteratively, respectively, in such a way that:

at the initial iteration, the reconstructed primary and secondary image information correspond to the image information primary and secondary residual image information, respectively; and at each of the subsequent iterations, the reconstructed primary and secondary image information are obtained from the primary and secondary decoded residual image information and the previously reconstructed image information, respectively.

33. An image decoding method for decoding, from a bitstream, a plurality of images represented by at least:

encoded primary image information on a subject along a first primary image information dimension, a second primary image information dimension, and a number of channels equal to or greater than 1, secondary image information on the subject along a first secondary image information dimension, a second secondary image information dimension, and a number of channels equal to or greater than 1, wherein the secondary image information and the primary image information are associated with each other through correspondence information, wherein the method comprises:

reading from a bitstream the encoded primary image information and the encoded secondary image information, obtaining a decoded version of the primary image information by iteratively applying, to the encoded primary image information, a primary layer which includes at least one primary sublayer;

obtaining a decoded version of the secondary image information by iteratively applying, to the encoded secondary image, a secondary layer which includes at least one secondary sublayer, wherein at each iteration each of at least one primary sublayer and at least one secondary sublayer has an input, an output 144) and a state, so that at the initial iteration each of the at least one primary sublayer and of the at least one secondary sublayer generates the state based on at least the initialization state, and at each iteration subsequent to the initial iteration, each of the at least one primary sublayer and at least one secondary sublayer provides the current output based on at least the current state or the preceding state, and updates the current state based on at least the preceding state and on the current input, wherein the initialization state of the at least one primary sublayer is a default state, wherein the method further comprises transforming, through a transformation based on the correspondence information, a state of at least one primary sublayer onto an estimate of a state of the at least one secondary sublayer, for obtaining the state of the at least one secondary sublayer.

34. An image encoding method for encoding, into a bitstream, a plurality of images represented by at least:

primary image information on a subject along a first primary image information dimension, a second primary image information dimension, and a number of channels equal to or greater than 1, secondary image information on the subject along a first secondary image information dimension, a second secondary image information dimension, and a number of channels equal to or greater than 1, wherein the secondary image information and the primary image information are associated with each other through correspondence information, the method comprising:

obtaining an encoded version of the primary image information, or processed version thereof, by iteratively applying a primary layer which includes at least one primary sublayer;

obtaining an encoded version of the secondary image information, or processed version thereof, by iteratively applying a secondary layer which includes at least one secondary sublayer, wherein at each iteration each of at least one primary sublayer and at least one secondary sublayer has a current input, a current output and a current state, so that, at an initial iteration, each of the at least one primary sublayer and of the at least one secondary sublayer generates the current state based on at least the initialization state, and at each iteration subsequent to the initial iteration, each of the at least one primary sublayer and at least one secondary sublayer provides the current output based at least on the current state or the preceding state, and updates the current state based on at least the preceding state and on the current input, wherein the initialization state of the at least one primary sublayer is a default state, wherein the method further comprises transforming, through a transformation based on the correspondence information, a current state of at least one primary sublayer onto an estimate of a state of the at least one secondary sublayer, so as to obtain the state of the at least one secondary sublayer, wherein method further comprises writing, into the bitstream, the encoded version of the primary image information, or processed version thereof, and the encoded version of the secondary image information, or processed version thereof.

35. The image decoder of claim 1, wherein the at least one primary sublayer and/or at least one secondary sublayer is a learnable layer.

36. The image encoder of claim 14, wherein the estimate of the state of the at least one secondary sublayer is an estimate of an initialization state of the at least one secondary sublayer, so as to provide the initialization state of the at least one secondary sublayer.

\* \* \* \* \*